United States Patent
Chernyak et al.

(10) Patent No.: US 11,375,213 B2
(45) Date of Patent: Jun. 28, 2022

(54) METHOD OF EFFICIENT SIGNALLING OF CBF FLAGS

(71) Applicant: HUAWEI TECHNOLOGIES CO., LTD., Guangdong (CN)

(72) Inventors: Roman Igorevich Chernyak, Moscow (RU); Yin Zhao, Hangzhou (CN); Sergey Yurievich Ikonin, Moscow (RU); Jianle Chen, San Diego, CA (US)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/368,502

(22) Filed: Jul. 6, 2021

(65) Prior Publication Data
US 2021/0352304 A1 Nov. 11, 2021

Related U.S. Application Data

(63) Continuation of application No. PCT/RU2020/050033, filed on Mar. 2, 2020.
(Continued)

(30) Foreign Application Priority Data

May 31, 2019 (WO) .................. PCT/EP2019/064224

(51) Int. Cl.
*H04N 11/02* (2006.01)
*H04N 19/186* (2014.01)
(Continued)

(52) U.S. Cl.
CPC ......... *H04N 19/186* (2014.11); *H04N 19/176* (2014.11); *H04N 19/44* (2014.11); *H04N 19/60* (2014.11); *H04N 19/70* (2014.11)

(58) Field of Classification Search
CPC .................................................. H04N 19/186
(Continued)

(56) References Cited

U.S. PATENT DOCUMENTS

| 2013/0003824 A1* | 1/2013 | Guo | H04N 19/122 |
| | | | 375/240.03 |
| 2013/0028319 A1* | 1/2013 | Sasai | H04N 19/157 |
| | | | 375/240.12 |

(Continued)

FOREIGN PATENT DOCUMENTS

| RU | 2627119 C2 | 8/2017 |
| WO | 2018045332 A1 | 3/2018 |

OTHER PUBLICATIONS

ITU-T H.264(Apr. 2017), Series H: Audiovisual and Multimedia Systems, Infrastructure of audiovisual services—Coding of moving video, Advanced video coding for generic audiovisual services, total 812 pages.
(Continued)

*Primary Examiner* — Leron Beck
(74) *Attorney, Agent, or Firm* — Womble Bond Dickinson (US) LLP

(57) ABSTRACT

A method of coding implemented by a decoding device or encoding device, the method comprising obtaining a bitstream, the bitstream comprises a transform unit syntax; the syntax comprises at least two cbf flags for chroma blocks (in an example, transform unit syntax correspond to either transform unit or sub-transform units which include two chroma cbf flags: tu_cbf_cb and tu_cbf_cb—one flag for each chroma plane), a chroma cbf flag specifies whether certain block has residue in correspondent color plane; deriving a value of a luma cbf flag tu_cbf_luma based on one or any combination of a value of a cu_cbf flag, values of two chroma cbf flags corresponding to a current transform unit or sub-transform unit, location of the sub-transform unit within transform unit, values of luma and chroma cbf flags correspondent to previous sub-transform units in the current transform unit.

20 Claims, 11 Drawing Sheets

Related U.S. Application Data

(60) Provisional application No. 62/825,005, filed on Mar. 27, 2019, provisional application No. 62/817,498, filed on Mar. 12, 2019, provisional application No. 62/812,282, filed on Mar. 1, 2019.

(51) Int. Cl.
*H04N 19/176* (2014.01)
*H04N 19/44* (2014.01)
*H04N 19/60* (2014.01)
*H04N 19/70* (2014.01)

(58) Field of Classification Search
USPC ..................................................... 375/240.18
See application file for complete search history.

(56) References Cited

U.S. PATENT DOCUMENTS

| | | | |
|---|---|---|---|
| 2013/0051452 A1* | 2/2013 | Li | H04N 19/70 375/240.01 |
| 2013/0107970 A1* | 5/2013 | Wang | H04N 19/186 375/240.18 |
| 2015/0030067 A1 | 1/2015 | Zhao et al. | |
| 2018/0288437 A1 | 10/2018 | Hsiang | |

OTHER PUBLICATIONS

ITU-T H.265(Feb. 2018), Series H: Audiovisual and Multimedia Systems Infrastructure of audiovisual services—Coding of moving video, High efficiency video coding, total 692 pages.

Yin Zhao et al.,"CE6: Sub-block transform for inter blocks (CE6. 4.1)",Joint Video Experts Team (JVET) of ITU-T SG 16 WP 3 and ISO/IEC JTC 1/SC 291WG 11,13th Meeting: Marrakech, MA, Jan. 9-18, 2019,Document: JVET-M0140-v3, toal:18pages.

Roman Chernyak et al.,"CBF flags signalling in VVC",Joint Video Experts Team (JVET) of ITU-T SG 16 WP 3 and ISO/IEC JTC 1/SC 29/WG 11,14th Meeting: Geneva, CH, Mar. 19-27, 2019,Document: JVET-N0492-V1 ,total:6pages.

Benjamin Bross et al.,"Versatile Video Coding(draft 4)",Joint Video Experts Team (JVET) of ITU-T SG 16 WP 3 and ISO/IEC JTC 1/SC 29/WG 11,13th Meeting: Marrakech, MA, Jan. 9-18, 2019,Document: JVET-M1001-V4, Total:287Pages.

Bossen Frank et al: CABACReader.cpp UTM4.0.1 VVCSoftware_ VTM4 .0 .1/source Lib/DecoderLib Feb. 22, 2019 (Feb. 22, 2019) XP055860337,total:68pages.

Barbier Frederic et al: TypeDef.h VTM4.0.1 VVCSoftware_ UTM 4 .0.1/source Lib/Common Lib Feb. 26, 2019 (Feb. 26, 2019) XP055860340 total:33pages.

Suehring Karsten et al: UnitTools.cpp VTM4 .0 .1 Feb. 26, 2019 (Feb. 26, 2019) XP055860346 total:115pages.

\* cited by examiner

1. No split of TU (CU=TU)
2. Pipeline split

2. Pipeline

3. SBT (e.g. vertical)

METHOD OF EFFICIENT SIGNALLING OF CBF FLAGS

CROSS-REFERENCE TO RELATED APPLICATIONS

This patent application is a continuation of International Application No. PCT/RU2020/050033, filed on Mar. 2, 2020, which claims priority of U.S. Provisional Patent Application No. 62/812,282, filed Mar. 1, 2019 and U.S. Provisional Patent Application No. 62/817,498, filed Mar. 12, 2019 and U.S. Provisional Patent Application No. 62/825,005, filed Mar. 27, 2019 and International Patent Application PCT/EP2019/064224, filed May 31, 2019. The disclosures of the aforementioned applications are hereby incorporated by reference in their entireties.

TECHNICAL FIELD

Embodiments of the present application (disclosure) generally relate to the field of picture processing and more particularly to transform flags signaling. It was disclosed that coded block flags (CBF flags) which are presented in Transform Tree or Transform Unit syntax elements and can be signaled depending on each other's and other available syntax elements.

BACKGROUND

Video coding (video encoding and decoding) is used in a wide range of digital video applications, for example broadcast digital TV, video transmission over internet and mobile networks, real-time conversational applications such as video chat, video conferencing, DVD and Blu-ray discs, video content acquisition and editing systems, and camcorders of security applications.

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever-increasing demands of higher video quality, improved compression and decompression techniques that improve compression ratio with little to no sacrifice in picture quality are desirable.

SUMMARY

Embodiments of the present disclosure provide apparatuses and methods for encoding and decoding according to the independent claims.

The foregoing and other objects are achieved by the subject matter of the independent claims. Further implementation forms are apparent from the dependent claims, the description and the figures.

The method according to the first aspect of the disclosure can be performed by the apparatus according to the third aspect of the disclosure. Further features and implementation forms of the method according to the third aspect of the disclosure correspond to the features and implementation forms of the apparatus according to the first aspect of the disclosure.

The method according to the second aspect of the disclosure can be performed by the apparatus according to the fourth aspect of the disclosure. Further features and implementation forms of the method according to the fourth aspect of the disclosure correspond to the features and implementation forms of the apparatus according to the second aspect of the disclosure.

According to a fifth aspect the disclosure relates to an apparatus for decoding a video stream includes a processor and a memory. The memory is storing instructions that cause the processor to perform the method according to the first aspect.

According to a sixth aspect the disclosure relates to an apparatus for encoding a video stream includes a processor and a memory. The memory is storing instructions that cause the processor to perform the method according to the second aspect.

According to a seventh aspect, a computer-readable storage medium having stored thereon instructions that when executed cause one or more processors configured to code video data is proposed. The instructions cause the one or more processors to perform a method according to the first or second aspect or any possible embodiment of the first or second aspect.

According to an eighth aspect, the disclosure relates to a computer program comprising program code for performing the method according to the first or second aspect or any possible embodiment of the first or second aspect when executed on a computer.

In one embodiment, the present disclosure provides a method of video coding implemented by a decoding device or encoding device, the method comprising:
obtaining a bitstream, the bitstream comprising a transform unit syntax;
obtaining a bitstream, the bitstream comprising a transform unit syntax;
obtaining, according to the transform unit syntax, values of at least two chroma cbf flags (chroma coded block flags) for chroma blocks corresponding to a current transform unit or a current sub-transform unit within the current transform unit, wherein a chroma cbf flag of the at least two chroma cbf flags specifies whether a correspondent block has a residue in a correspondent color plane;
deriving a value of a luma cbf flag at least based on:
a value of a coding unit cbf flag, cu_cbf flag, and the values of the at least two chroma cbf flags.

Thus, an embodiment of the present disclosure allows improving coding efficiency and proposed a unified mechanism of cbf flags signaling. Thus a unified mechanism of cbf flags signaling is proposed.

Further, the relationships between cbf flags and sub-transform unit partitioning tools allow removing redundancy in the bitstream.

In an embodiment, the value of the luma cbf flag may be further derived based on a location of the current sub-transform unit within the current transform unit.

In an embodiment, the transform unit syntax may comprise the at least two chroma cbf flags, and the obtaining, according to the transform unit syntax, values of at least two chroma cbf flags may comprise: obtaining values of at least two chroma cbf flags from the transform unit syntax.

In an embodiment, the luma cbf flag may be a tu_cbf_luma flag.

In an embodiment, for the transform unit syntax, the transform unit syntax element may be:

signaled for a whole block, or signaled for multiple sub-transform units that are obtained by Sub-Block Transform, SBT, for inter block, or signaled in order to satisfy maximal transform unit size restrictions.

In an embodiment, the current transform unit or the current sub-transform units may include two chroma cbf flags, with one flag for each chroma plane, respectively.

In an embodiment, the value of the luma cbf flag may be derived based on the value of the cu_cbf flag and the values of the two chroma cbf flags corresponding to the current transform unit.

In an embodiment, wherein if the current transform unit is not divided to sub-transform units, the cu_cbf flag may be signaled in the bitstream and a value of the cu_cbf flag may be equal to 1, the value of tu_cbf_cb flag may be 0 and the value of the tu_cbf_cr flag may be 0, then the value of the tu_cbf_luma flag for the current transform unit may be derived to 1.

In an embodiment, wherein a transform unit syntax table corresponding to the transform unit syntax may be signaled according to following table:

| | Descriptor |
|---|---|
| transform_unit( x0, y0, tbWidth, tbHeight, treeType, subTuIndex, chType ) { | |
|   if( IntraSubPartitionsSplitType != ISP_NO_SPLIT && | |
|     treeType = = SINGLE_TREE && subTuIndex = = NumIntraSubPartitions − 1 ) { | |
|     xC = CbPosX[ chType ][ x0 ][ y0 ] | |
|     yC = CbPosY[ chType ][ x0 ][ y0 ] | |
|     wC = CbWidth[ chType ][ x0 ][ y0 ] / SubWidthC | |
|     hC = CbHeight[ chType ][ x0 ][ y0 ] / SubHeightC | |
|   } else { | |
|     xC = x0 | |
|     yC = y0 | |
|     wC = tbWidth / SubWidthC | |
|     hC = tbHeight / SubHeightC | |
|   } | |
|   chromaAvailable = treeType != DUAL_TREE_LUMA && ChromaArrayType != 0 && | |
|     ( IntraSubPartitionsSplitType = = ISP_NO_SPLIT || | |
|     ( IntraSubPartitionsSplitType != ISP_NO_SPLIT && | |
|     subTuIndex = = NumIntraSubPartitions − 1 ) ) | |
|   if( ( treeType = = SINGLE_TREE || treeType = = DUAL_TREE_CHROMA ) && | |
|     ChromaArrayType != 0 && ( IntraSubPartitionsSplitType = = ISP_NO_SPLIT && | |
|     ( ( subTuIndex = = 0 && cu_sbt_pos_flag ) || | |
|     ( subTuIndex = = 1 && !cu_sbt_pos_flag ) ) ) || | |
|     ( IntraSubPartitionsSplitType != ISP_NO_SPLIT && | |
|     ( subTuIndex = = NumIntraSubPartitions − 1 ) ) ) { | |
|     tu_cbf_cb[ xC ][ yC ] | ae(v) |
|     tu_cbf_cr[ xC ][ yC ] | ae(v) |
|   } | |
|   if( treeType = = SINGLE_TREE || treeType = = DUAL_TREE_LUMA ) { | |
|     if( ( IntraSubPartitionsSplitType = = ISP_NO_SPLIT && !( cu_sbt_flag && | |
|     ( ( subTuIndex = = 0 && cu_sbt_pos_flag ) || | |
|     ( subTuIndex = = 1 && !cu_sbt_pos_flag ) ) ) && | |
|     ( CuPredMode[ chType ][ x0 ][ y0 ] = = MODE_INTRA || | |
|     ( chromaAvailable && ( tu_cbf_cb[ xC ][ yC ] || tu_cbf_cr[ xC ][ yC ] ) ) || | |
|     CbWidth[ chType ][ x0 ][ y0 ] > MaxTbSizeY || | |
|     CbHeight[ chType ][ x0 ][ y0 ] > MaxTbSizeY ) ) || | |
|     ( IntraSubPartitionsSplitType != ISP_NO_SPLIT && | |
|     ( subTuIndex < NumIntraSubPartitions − 1 || !InferTuCbfLuma ) ) ) | |
|     tu_cbf_luma[ x0 ][ y0 ] | ae(v) |
|   ... | |
| } | |

In an embodiment, a transform unit syntax table corresponding to the transform unit syntax may be signaled according to following table:

| | Descriptor |
|---|---|
| transform_unit( x0, y0, tbWidth, tbHeight, treeType, subTuIndex ) { | |
|   if( ( treeType = = SINGLE_TREE || treeType = = DUAL_TREE_CHROMA ) { | |
|     if( ( IntraSubPartitionsSplitType = = ISP_NO_SPLIT && ) || ( | |
|     IntraSubPartitionsSplitType != ISP_NO_SPLIT && ( subTuIndex = = | |
|     NumIntraSubPartitions − 1 ) ) ) { | |
|     tu_cbf_cb[ x0 ][ y0 ] | ae(v) |
|     tu_cbf_cr[ x0 ][ y0 ] | ae(v) |
|   } | |
| } | |

| | Descriptor |
|---|---|
| `if( treeType = = SINGLE_TREE | | treeType = = DUAL_TREE_LUMA ) {`<br>  `if(IntraSubPartitionsSplitType = = ISP_NO_SPLIT){`<br>    `if ((CuPredMode[ x0 ][ y0 ] = = MODE_INTRA | | tu_cbf_cb[x0 ][ y0 ] | |`<br>      `tu_cbf_cr[ x0 ][ y0 ]) | |`<br>      `(CbWidth[ x0 ][ y0 ] > MaxTbSizeY | | CbHeight[ x0 ][ y0 ] > MaxTbSizeY )) )`<br>        `tu_cbf_luma[ x0 ][ y0 ]`<br>  `}`<br>  `else`<br>    `if ( subTuIndex < NumIntraSubPartitions − 1 | | !InferTuCbfLuma )`<br>      `tu_cbf_luma[ x0 ][ y0 ]`<br>`...`<br>`}` | <br><br><br><br><br>ae(v)<br><br><br><br>ae(v) |

In an embodiment, wherein if the current transform unit is split by Sub-Block Transform, SBT, the value of the tu_cbf_luma flag for the sub-transform unit, which allows non-zero cbf flags, may be derived according to following condition:

if the value of the cu_cbf flag is 1, and the value of the tu_cbf_cb flag is 0 and the value of the tu_cbf_cr flag is 0, then the value of the tu_cbf_luma flag for the current sub-transform unit is derived to be 1.

In an embodiment, wherein a transform unit syntax table corresponding to the transform unit syntax may be signaled according to following table:

| | Descriptor |
|---|---|
| `transform_unit( x0, y0, tbWidth, tbHeight, treeType, subTuIndex, chType) {`<br>  `if( IntraSubPartitionsSplitType != ISP_NO_SPLIT &&`<br>    `treeType = = SINGLE_TREE && subTuIndex = = NumIntraSubPartitions − 1) {`<br>    `xC = CbPosX[ chType ][ x0 ][ y0 ]`<br>    `yC = CbPosY[ chType ][ x0 ][ y0 ]`<br>    `wC = CbWidth[ chType ][ x0 ][ y0 ] / SubWidthC`<br>    `hC = CbHeight[ chType ][ x0 ][ y0 ] / SubHeightC`<br>  `} else {`<br>    `xC = x0`<br>    `yC = y0`<br>    `wC = tbWidth / SubWidthC`<br>    `hC = tbHeight / SubHeightC`<br>  `}`<br>  `chromaAvailable = treeType != DUAL_TREE_LUMA && ChromaArrayType != 0 &&`<br>    `( IntraSubPartitionsSplitType = = ISP_NO_SPLIT | |`<br>    `( IntraSubPartitionsSplitType != ISP_NO_SPLIT &&`<br>    `subTuIndex = = NumIntraSubPartitions − 1 ) )`<br>  `if( ( treeType = = SINGLE_TREE | | treeType = = DUAL_TREE_CHROMA ) &&`<br>    `ChromaArrayType != 0 && ( IntraSubPartitionsSplitType = = ISP_NO_SPLIT &&`<br>    `( ( subTuIndex = = 0 && cu_sbt_pos_flag ) | |`<br>    `( subTuIndex = = 1 && !cu_sbt_pos_flag ) ) ) | |`<br>    `( IntraSubPartitionsSplitType != ISP_NO_SPLIT &&`<br>    `( subTuIndex = = NumIntraSubPartitions − 1 ) ) ) {`<br>    `tu_cbf_cb[ xC ][ yC ]`<br>    `tu_cbf_cr[ xC ][ yC ]`<br>  `}`<br>  `if( treeType = = SINGLE_TREE | | treeType = = DUAL_TREE_LUMA ) {`<br>    `if( ( IntraSubPartitionsSplitType = = ISP_NO_SPLIT && !( cu_sbt_flag &&`<br>      `( ( subTuIndex = = 0 && cu_sbt_pos_flag ) | |`<br>      `( subTuIndex = = 1 && !cu_sbt_pos_flag ) ) ) &&`<br>      `( CuPredMode[ chType ][ x0 ][ y0 ] = = MODE_INTRA | |`<br>      `( chromaAvailable && ( tu_cbf_cb[ xC ][ yC ] | | tu_cbf_cr[ xC ][ yC ] ) ) | |`<br>      `CbWidth[ chType ][ x0 ][ y0 ] > MaxTbSizeY | |`<br>      `CbHeight[ chType ][ x0 ][ y0 ] > MaxTbSizeY ) ) | |`<br>      `( IntraSubPartitionsSplitType != ISP_NO_SPLIT &&`<br>      `( subTuIndex < NumIntraSubPartitions − 1 | | !InferTuCbfLuma ) ) )`<br>    `tu_cbf_luma[ x0 ][ y0 ]`<br>`...`<br>`}` | <br><br><br><br><br><br><br><br><br><br><br><br><br><br><br><br><br><br><br><br><br><br><br><br>ae(v)<br>ae(v)<br><br><br><br><br><br><br><br><br><br><br>ae(v) |

In an embodiment, wherein a transform unit syntax table corresponding to the transform unit syntax may be signaled according to following table:

| | Descriptor |
|---|---|
| transform_unit( x0, y0, tbWidth, tbHeight, treeType, subTuIndex ) { | |
|   if( ( treeType = = SINGLE_TREE \|\| treeType = = DUAL_TREE_CHROMA ) { | |
|     if( ( IntraSubPartitionsSplitType = = ISP_NO_SPLIT && ) \|\| ( | |
|       IntraSubPartitionsSplitType != ISP_NO_SPLIT && ( subTuIndex = = | |
|       NumIntraSubPartitions − 1 ) ) ) { | |
|       tu_cbf_cb[ x0 ][ y0 ] | ae(v) |
|       tu_cbf_cr[ x0 ][ y0 ] | ae(v) |
|     } | |
|   } | |
|   if( treeType = = SINGLE_TREE \|\| treeType = = DUAL_TREE_LUMA ) { | |
|     if(IntraSubPartitionsSplitType = = ISP_NO_SPLIT){ | |
|       if !( cu_sbt_flag && | |
|         ( ( subTuIndex = = 0 && cu_sbt_pos_flag ) \|\| | |
|         ( subTuIndex = = 1 && !cu_sbt_pos_flag ) ) ) | |
|         if ((CuPredMode[ x0 ][ y0 ] = = MODE_INTRA \|\| tu_cbf_cb[x0 ][ y0 ] \|\| | |
|         tu_cbf_cr[ x0 ][ y0 ]) \|\| | |
|         (CbWidth[ x0 ][ y0 ] > MaxTbSizeY \|\| CbHeight[ x0 ][ y0 ] > MaxTbSizeY )) ) | |
|           tu_cbf_luma[ x0 ][ y0 ] | ae(v) |
|     } | |
|     else | |
|       if ( subTuIndex < NumIntraSubPartitions − 1 \|\| !InferTuCbfLuma ) | |
|         tu_cbf_luma[ x0 ][ y0 ] | ae(v) |
| ... | |
| } | |

In an embodiment, wherein a transform tree syntax table corresponding to the transform unit syntax may be signaled according to following table:

| | Descriptor |
|---|---|
| transform_tree( x0, y0, tbWidth, tbHeight, treeType) { | |
|   InferTuCbfLuma = 1 | |
|   if( IntraSubPartSplitType = = NO_ISP_SPLIT) { | |
|     if( tbWidth > MaxTbSizeY \|\| tbHeight > MaxTbSizeY ) { | |
|       trafoWidth = ( tbWidth > MaxTbSizeY ) ? (tbWidth / 2) : tbWidth | |
|       trafoHeight = ( tbHeight > MaxTbSizeY ) ? (tbHeight / 2) : tbHeight | |
|       transform_tree( x0, y0, trafoWidth, trafoHeight) | |
|       if( tbWidth > MaxTbSizeY ) | |
|         transform_tree( x0 + trafoWidth, y0, trafoWidth, trafoHeight, treeType) | |
|       if( tbHeight > MaxTbSizeY ) | |
|         transform_tree( x0, y0 + trafoHeight, trafoWidth, trafoHeight, treeType) | |
|       if( tbWidth > MaxTbSizeY && tbHeight > MaxTbSizeY ) | |
|   transform_tree( x0 + trafoWidth, y0 + trafoHeight, trafoWidth, trafoHeight, treeType) | |
|     } else { | |
|       transform_unit( x0, y0, tbWidth, tbHeight, treeType, SubTuIdx++ ) | |
|     } | |
|   } else if( cu_sbt_flag) { | |
|     if( !cu_sbt_horizontal_flag) { | |
|       trafoWidth = tbWidth * SbtNumFourthsTb0 / 4 | |
|       transform_unit( x0, y0, trafoWidth, tbHeight, treeType , 0) | |
|       transform_unit( x0 + trafoWidth, y0, tbWidth − trafoWidth , tbHeight, treeType , 1) | |
|     } else { | |
|       trafoHeight = tbHeight * SbtNumFourthsTb0 /4 | |
|       transform_unit( x0, y0, tbWidth, trafoHeight, treeType , 0) | |
|       transform_unit( x0, y0 + trafoHeight, tbWidth, tbHeight − trafoHeight, treeType , 1) | |
|     } | |
|   } else if( IntraSubPartitionsSplitType = = ISP_HOR_SPLIT ) { | |
|     trafoHeight = tbHeight / NumIntraSubPartitions | |
|     for( partIdx = 0; partIdx < NumIntraSubPartitions; partIdx++ ) | |
|   transform_unit( x0, y0 + trafoHeight * partIdx, tbWidth, trafoHeight, treeType, partIdx ) | |
|   } else if( IntraSubPartitionsSplitType = = ISPVERSPLIT) { | |
|     trafoWidth = tbWidth / NumIntraSubPartitions | |
|     for( partIdx = 0; partIdx < NumIntraSubPartitions; partIdx++) | |
|       transform_unit( x0 + trafoWidth * partIdx, y0, trafoWidth, tbHeight, treeType, partIdx ) | |
|   } | |
| } | | wherein a coding unit syntax table corresponding to the transform tree syntax table may be signaled according to following table:

| | Descriptor |
|---|---|
| coding_unit( x0, y0, cbWidth, cbHeight, treeType ) { . . .   SubTuIdx = 0   transform_tree( x0, y0, cbWidth, cbHeight, treeType ) . . . } | |

In an embodiment, wherein treeType may be equal to SINGLE TREE.

In an embodiment, wherein the luma cbf flag may be a tu_cbf_luma flag, and if the value of tu_cbf_luma[x0][y0] is not present, the value of tu_cbf_luma[x0][y0] may e derived according to following conditions:
if tu_cbf_luma[x0][y0] is not present, its value is inferred as follows:
if cu_sbt_flag is equal to 1 and one of the following conditions is true, tu_cbf_luma[x0][y0] is inferred to be equal to 0:
subTuIndex is equal to 0 and cu_sbt_pos_flag is equal to 1;
subTuIndex is equal to 1 and cu_sbt_pos_flag is equal to 0;
otherwise, if treeType is equal to DUAL_TREE_CHROMA, tu_cbf_luma[x0][y0] is inferred to be equal to 0;
otherwise, tu_cbf_luma[x0][y0] is inferred to be equal to 1.

In an embodiment, wherein the luma cbf flag may be a tu_cbf_luma flag, and if the value of tu_cbf_luma[x0][y0] is not present, the value of tu_cbf_luma[x0][y0] may be derived according to following conditions:
if tu_cbf_luma[x0][y0] is not present in the current TU, its value is inferred as follows:
if cu_sbt_flag is equal to 1 and any of the following conditions is true:
subTuIndex is equal to 0 and cu_sbt_pos_flag is equal to 1;
subTuIndex is equal to 1 and cu_sbt_pos_flag is equal to 0;
then tu_cbf_luma[x0][y0] is inferred to be equal to 0.
otherwise, tu_cbf_luma[x0][y0] is inferred to be equal to 1.

In an embodiment, wherein tu_cbf_luma[x0][y0] equal to 1 may specify that the luma transform block contains one or more transform coefficient levels not equal to 0; wherein array indices x0, y0 may specify the location (x0, y0) of the top-left luma sample of the considered transform block relative to the top-left luma sample of the picture; wherein a transform coefficient level may be an integer quantity representing the value associated with a particular two dimensional frequency index in the decoding process prior to scaling for computation of a transform coefficient value.

The present disclosure further provides, in some embodiments, an encoder comprising processing circuitry for carrying out embodiments of the method as described above.

The present disclosure further provides, in some embodiments, a decoder comprising processing circuitry for carrying out embodiments of the method as described above.

The present disclosure further provides, in some embodiments, a computer program product comprising a program code for performing embodiments of the method as described above.

The present disclosure further provides, in some embodiments, a decoder or an encoder, comprising:
one or more processors; and
a non-transitory computer-readable storage medium coupled to the processors and storing programming for execution by the processors, wherein the programming, when executed by the processors, configures the decoder to carry out embodiments of the method as described above.

The present disclosure further provides, in an embodiment, an encoder comprising:
an obtaining unit, configured to obtain a bitstream, the bitstream comprising a transform unit syntax;
the obtaining unit configured to obtain according to the transform unit syntax, values of at least two chroma cbf flags (chroma coded block flags) for chroma blocks corresponding to a current transform unit or a current sub-transform unit within the current transform unit, wherein a chroma cbf flag of the at least two chroma cbf flags specifies whether a correspondent block has a residue in a correspondent color plane;
a deriving unit, configured to derive a value of a luma cbf flag at least based on:
a value of a coding unit cbf flag, cu_cbf flag, and the values of the at least two chroma cbf flags.

The present disclosure further provides, in an embodiment, a decoder comprising:
an obtaining unit, configured to obtain a bitstream, the bitstream comprising a transform unit syntax;
the obtaining unit configured to obtain according to the transform unit syntax, values of at least two chroma cbf flags (chroma coded block flags) for chroma blocks corresponding to a current transform unit or a current sub-transform unit within the current transform unit, wherein a chroma cbf flag of the at least two chroma cbf flags specifies whether a correspondent block has a residue in a correspondent color plane;
a deriving unit, configured to derive a value of a luma cbf flag at least based on:
a value of a coding unit cbf flag, cu_cbf flag, and the values of the at least two chroma cbf flags.

In an embodiment, the value of the luma cbf flag may be further derived based on a location of the current sub-transform unit within the current transform unit.

In an embodiment, the transform unit syntax may comprise the at least two chroma cbf flags, the obtaining, according to the transform unit syntax, values of at least two chroma cbf flags comprises: obtaining values of at least two chroma cbf flags from the transform unit syntax.

In an embodiment, the luma cbf flag may be a tu_cbf_luma flag.

In an embodiment, for the transform unit syntax, the transform unit syntax element may be:
signaled for a whole block, or
signaled for multiple sub-transform units that are obtained by Sub-Block Transform, SBT, for inter block, or
signaled in order to satisfy maximal transform unit size restrictions.

In an embodiment, wherein the current transform unit or the current sub-transform unit may include two chroma cbf flags, with one flag for each chroma plane, respectively.

In an embodiment, wherein the value of the luma cbf flag may be derived based on the value of the cu_cbf flag and the values of the two chroma cbf flags corresponding to the current transform unit.

In an embodiment, wherein if the current transform unit is not divided to sub-transform units, the cu_cbf flag may be signaled in the bitstream and a value of the cu_cbf flag may be equal to 1, the value of tu_cbf_cb flag is 0 and the value of the tu_cbf_cr flag is 0, then the value of the tu_cbf_luma flag for the current transform unit may be derived to 1.

In an embodiment, wherein a transform unit syntax table corresponding to the transform unit syntax may be signaled according to following table:

|  | Descriptor |
|---|---|
| transform_unit( x0, y0, tbWidth, tbHeight, treeType, subTuIndex, chType) { | |
|   if( IntraSubPartitionsSplitType != ISP_NO_SPLIT && | |
|     treeType = = SINGLE_TREE && subTuIndex = = NumIntraSubPartitions − 1) { | |
|     xC = CbPosX[ chType ][ x0 ][ y0 ] | |
|     yC = CbPosY[ chType ][ x0 ][ y0 ] | |
|     wC = CbWidth[ chType ][ x0 ][ y0 ] / SubWidthC | |
|     hC = CbHeight[ chType ][ x0 ][ y0 ] / SubHeightC | |
|   } else { | |
|     xC = x0 | |
|     yC = y0 | |
|     wC = tbWidth / SubWidthC | |
|     hC = tbHeight / SubHeightC | |
|   } | |
|   chromaAvailable = treeType != DUAL_TREE_LUMA && ChromaArrayType != 0 && | |
|     ( IntraSubPartitionsSplitType = = ISP_NO_SPLIT \|\| | |
|     ( IntraSubPartitionsSplitType != ISP_NO_SPLIT && | |
|     subTuIndex = = NumIntraSubPartitions − 1 ) ) | |
|   if( ( treeType = = SINGLE_TREE \|\| treeType = = DUAL_TREE_CHROMA ) && | |
|     ChromaArrayType != 0 && ( IntraSubPartitionsSplitType = = ISP_NO_SPLIT && | |
|     ( ( subTuIndex = = 0 && cu_sbt_pos_flag ) \|\| | |
|     ( subTuIndex = = 1 && !cu_sbt_pos_flag ) ) ) \|\| | |
|     ( IntraSubPartitionsSplitType != ISP_NO_SPLIT && | |
|     ( subTuIndex = = NumIntraSubPartitions − 1 ) ) ) { | |
|     tu_cbf_cb[ xC ][ yC ] | ae(v) |
|     tu_cbf_cr[ xC ][ yC ] | ae(v) |
|   } | |
|   if( treeType = = SINGLE_TREE \|\| treeType = = DUAL_TREE_LUMA ) { | |
|     if( ( IntraSubPartitionsSplitType = = ISP_NO_SPLIT && !( cu_sbt_flag && | |
|     ( ( subTuIndex = = 0 && cu_sbt_pos_flag ) \|\| | |
|     ( subTuIndex = = 1 && !cu_sbt_pos_flag ) ) ) && | |
|     ( CuPredMode[ chType ][ x0 ][ y0 ] = = MODE_INTRA \|\| | |
|     ( chromaAvailable && ( tu_cbf_cb[ xC ][ yC ] \|\| tu_cbf_cr[ xC ][ yC ] ) ) \|\| | |
|     CbWidth[ chType ][ x0 ][ y0 ] > MaxTbSizeY \|\| | |
|     CbHeight[ chType ][ x0 ][ y0 ] > MaxTbSizeY ) ) \|\| | |
|     ( IntraSubPartitionsSplitType != ISP_NO_SPLIT && | |
|     ( subTuIndex < NumIntraSubPartitions − 1 \|\| !InferTuCbfLuma ) ) | |
|     tu_cbf_luma[ x0 ][ y0 ] | ae(v) |
| ... | |
| } | |

In an embodiment, wherein a transform unit syntax table corresponding to the transform unit syntax may be signaled according to following table:

|  | Descriptor |
|---|---|
| transform_unit( x0, y0, tbWidth, tbHeight, treeType, subTuIndex ) { | |
|   if( ( treeType = = SINGLE_TREE \|\| treeType = = DUAL_TREE_CHROMA ) { | |
|     if( ( IntraSubPartitionsSplitType = = ISP_NO_SPLIT && ) \|\| ( | |
|     IntraSubPartitionsSplitType != ISP_NO_SPLIT && ( subTuIndex = = | |
|     NumIntraSubPartitions − 1 ) ) ) { | |
|     tu_cbf_cb[ x0 ][ y0 ] | ae(v) |
|     tu_cbf_cr[ x0 ][ y0 ] | ae(v) |
|   } | |
| } | |
|   if( treeType = = SINGLE_TREE \|\| treeType = = DUAL_TREE_LUMA ) { | |
|     if(IntraSubPartitionsSplitType = = ISP_NO_SPLIT){ | |
|     if ((CuPredMode[ x0 ][ y0 ] = = MODE_INTRA \|\| tu_cbf_cb[x0 ][ y0 ] \|\| | |
|     tu_cbf_cr[ x0 ][ y0 ] ) \|\| | |
|     (CbWidth[ x0 ][ y0 ] > MaxTbSizeY \|\| CbHeight[ x0 ][ y0 ] > MaxTbSizeY )) | |
|     tu_cbf_luma[ x0 ][ y0 ] | ae(v) |
|   } | |
|   else | |
|     if ( subTuIndex < NumIntraSubPartitions − 1 \|\| !InferTuCbfLuma ) | |
|     tu_cbf_luma[ x0 ][ y0 ] | ae(v) |
| ... | |
| } | |

In an embodiment, wherein if the current transform unit is split by Sub-Block Transform, SBT, the value of the tu_cbf_luma flag for the sub-transform unit, which allows non-zero cbf flags, may be derived according to following condition:

if the value of the cu_cbf flag is 1, and the value of the tu_cbf_cb flag is 0 and the value of the tu_cbf_cr flag is 0, then the value of the tu_cbf_luma flag for the current sub-transform unit is derived to be 1.

In an embodiment, wherein a transform unit syntax table corresponding to the transform unit syntax may be signaled according to following table:

|  | Descriptor |
|---|---|
| transform_unit( x0, y0, tbWidth, tbHeight, treeType, subTuIndex, chType) { <br>  if( IntraSubPartitionsSplitType != ISP_NO_SPLIT && <br>    treeType = = SINGLE_TREE && subTuIndex = = NumIntraSubPartitions − 1) { <br>    xC = CbPosX[ chType ][ x0 ][ y0 ] <br>    yC = CbPosY[ chType ][ x0 ][ y0 ] <br>    wC = CbWidth[ chType ][ x0 ][ y0 ] / SubWidthC <br>    hC = CbHeight[ chType ][ x0 ][ y0 ] / SubHeightC <br>  } else { <br>    xC = x0 <br>    yC = y0 <br>    wC = tbWidth / SubWidthC <br>    hC = tbHeight / SubHeightC <br>  } <br>  chromaAvailable = treeType != DUAL_TREE_LUMA && ChromaArrayType != 0 && <br>    ( IntraSubPartitionsSplitType = = ISP_NO_SPLIT \|\| <br>    ( IntraSubPartitionsSplitType != ISP_NO_SPLIT && <br>    subTuIndex = = NumIntraSubPartitions − 1 ) ) <br>  if( ( treeType = = SINGLE_TREE \|\| treeType = = DUAL_TREE_CHROMA ) && <br>    ChromaArrayType != 0 && ( IntraSubPartitionsSplitType = = ISP_NO_SPLIT && <br>    ( ( subTuIndex = = 0 && cu_sbt_pos_flag ) \|\| <br>    ( subTuIndex = = 1 && !cu_sbt_pos_flag ) ) ) \|\| <br>    ( IntraSubPartitionsSplitType != ISP_NO_SPLIT && <br>    ( subTuIndex = = NumIntraSubPartitions − 1 ) ) ) { <br>    tu_cbf_cb[ xC ][ yC ] | ae(v) |
|     tu_cbf_cr[ xC ][ yC ] | ae(v) |
|   } <br>  if( treeType = = SINGLE_TREE \|\| treeType = = DUAL_TREE_LUMA ) { <br>    if( ( IntraSubPartitionsSplitType = = ISP_NO_SPLIT && !( cu_sbt_flag && <br>    ( ( subTuIndex = = 0 && cu_sbt_pos_flag ) \|\| <br>    ( subTuIndex = = 1 && !cu_sbt_pos_flag ) ) ) && <br>    ( CuPredMode[ chType ][ x0 ][ y0 ] = = MODE_INTRA \|\| <br>    ( chromaAvailable && ( tu_cbf_cb[ xC ][ yC ] \|\| tu_cbf_cr[ xC ][ yC ] ) ) \|\| <br>    CbWidth[ chType ][ x0 ][ y0 ] > MaxTbSizeY \|\| <br>    CbHeight[ chType ][ x0 ][ y0 ] > MaxTbSizeY ) ) \|\| <br>    ( IntraSubPartitionsSplitType != ISP_NO_SPLIT && <br>    ( subTuIndex < NumIntraSubPartitions − 1 \|\| !InferTuCbfLuma ) ) ) <br>    tu_cbf_luma[ x0 ][ y0 ] | ae(v) |
| ... <br>} | |

In an embodiment, wherein a transform unit syntax table corresponding to the transform unit syntax may be signaled according to following table:

|  | Descriptor |
|---|---|
| transform_unit( x0, y0, tbWidth, tbHeight, treeType, subTuIndex ) { <br>  if( ( treeType = = SINGLE_TREE \|\| treeType = = DUAL_TREE_CHROMA ) { <br>    if( ( IntraSubPartitionsSplitType = = ISP_NO_SPLIT && ) \|\| ( <br>    IntraSubPartitionsSplitType != ISP_NO_SPLIT && ( subTuIndex = = <br>    NumIntraSubPartitions − 1 ) ) ) { <br>    tu_cbf_cb[ x0 ][ y0 ] | ae(v) |
|     tu_cbf_cr[ x0 ][ y0 ] | ae(v) |
|     } <br>  } <br>  if( treeType = = SINGLE_TREE \|\| treeType = = DUAL_TREE_LUMA ) { <br>    if(IntraSubPartitionsSplitType = = ISP_NO_SPLIT){ <br>      if !(cu_sbt_flag && <br>      ( ( subTuIndex = = 0 && cu_sbt_pos_flag ) \|\| <br>      ( subTuIndex = = 1 && !cu_sbt_pos_flag ) ) <br>      if ((CuPredMode[ x0 ][ y0 ] = = MODE_INTRA \|\| tu_cbf_cb[x0 ][ y0 ] \|\| <br>      tu_cbf_cr[ x0 ][ y0 ] ) \|\| <br>      (CbWidth[ x0 ][ y0 ] > MaxTbSizeY \|\| CbHeight[ x0 ][ y0 ] > MaxTbSizeY )) ) <br>        tu_cbf_luma[ x0 ][ y0 ] | ae(v) |

| | Descriptor |
|---|---|
| ``` 
    }
    else
      if ( subTuIndex < NumIntraSubPartitions − 1 | | !InferTuCbfLuma )
        tu_cbf_luma[ x0 ][ y0 ]
  ...
}
``` | ae(v) |

In an embodiment, wherein a transform tree syntax table corresponding to the transform unit syntax may be signaled according to following table:

| | Descriptor |
|---|---|
| ```
transform_tree( x0, y0, tbWidth, tbHeight, treeType) {
  InferTuCbfLuma = 1
  if( IntraSubPartSplitType = = NO_ISP_SPLIT) {
    if( tbWidth > MaxTbSizeY | | tbHeight > MaxTbSizeY ) {
      trafoWidth = ( tbWidth > MaxTbSizeY ) ? (tbWidth / 2) : tbWidth
      trafoHeight = ( tbHeight > MaxTbSizeY ) ? (tbHeight / 2) : tbHeight
      transform_tree( x0, y0, trafoWidth, trafoHeight )
      if( tbWidth > MaxTbSizeY )
        transform_tree( x0 + trafoWidth, y0, trafoWidth, trafoHeight, treeType)
      if( tbHeight > MaxTbSizeY )
        transform_tree( x0, y0 + trafoHeight, trafoWidth, trafoHeight, treeType)
      if( tbWidth > MaxTbSizeY && tbHeight > MaxTbSizeY )
    transform_tree( x0 + trafoWidth, y0 + trafoHeight, trafoWidth, trafoHeight, treeType)
    } else {
      transform_unit( x0, y0, tbWidth, tbHeight, treeType, SubTuIdx++ )
    }
  } else if( cu_sbt_flag) {
    if( !cu_sbt_horizontal_flag) {
      trafoWidth = tbWidth * SbtNumFourthsTb0 / 4
      transform_unit( x0, y0, trafoWidth, tbHeight, treeType , 0)
      transform_unit( x0 + trafoWidth, y0, tbWidth − trafoWidth , tbHeight, treeType , 1)
    } else {
      trafoHeight = tbHeight * SbtNumFourthsTb0 /4
      transform_unit( x0, y0, tbWidth, trafoHeight, treeType , 0)
      transform_unit( x0, y0 + trafoHeight, tbWidth, tbHeight − trafoHeight, treeType , 1)
    }
  } else if( IntraSubPartitionsSplitType = = ISP_HOR_SPLIT ) {
    trafoHeight = tbHeight / NumIntraSubPartitions
    for( partIdx = 0; partIdx < NumIntraSubPartitions; partIdx++ )
   transform_unit( x0, y0 + trafoHeight * partIdx, tbWidth, trafoHeight, treeType, partIdx )
  } else if( IntraSubPartitionsSplitType = = ISP_VER_SPLIT) {
    trafoWidth = tbWidth / NumIntraSubPartitions
    for( partIdx = 0; partIdx < NumIntraSubPartitions; partIdx++)
      transform_unit( x0 + trafoWidth * partIdx, y0, trafoWidth, tbHeight, treeType, partIdx )
  }
}
``` | | wherein a coding unit syntax table corresponding to the transform tree syntax table may be signaled according to following table:

| | Descriptor |
|---|---|
| ```
coding_unit( x0, y0, cbWidth, cbHeight, treeType ) {
  ...
  SubTuIdx = 0
  transform_tree( x0, y0, cbWidth, cbHeight, treeType )
  ...
}
``` | |

In an embodiment, wherein treeType may be equal to SINGLE TREE.

In an embodiment, wherein the luma cbf flag may be a tu_cbf_luma flag, and if the value of tu_cbf_luma[x0][y0] is not present, the value of tu_cbf_luma[x0][y0] may be derived according to following conditions:

if tu_cbf_luma[x0][y0] is not present, its value is inferred as follows:

if cu_sbt_flag is equal to 1 and one of the following conditions is true, tu_cbf_luma[x0][y0] is inferred to be equal to 0:

subTuIndex is equal to 0 and cu_sbt_pos_flag is equal to 1;

subTuIndex is equal to 1 and cu_sbt_pos_flag is equal to 0;

otherwise, if treeType is equal to DUAL_TREE_CHROMA, tu_cbf_luma[x0][y0] is inferred to be equal to 0;

otherwise, tu_cbf_luma[x0][y0] is inferred to be equal to 1.

In an embodiment, wherein the luma cbf flag may be a tu_cbf_luma flag, and if the value of tu_cbf_luma[x0][y0] is not present, the value of tu_cbf_luma[x0][y0] may be derived according to following conditions:

if tu_cbf_luma[x0][y0] is not present in the current TU, its value is inferred as follows:

if cu_sbt_flag is equal to 1 and any of the following conditions is true:

subTuIndex is equal to 0 and cu_sbt_pos_flag is equal to 1;

subTuIndex is equal to 1 and cu_sbt_pos_flag is equal to 0;

then tu_cbf_luma[x0][y0] is inferred to be equal to 0.

otherwise, tu_cbf_luma[x0][y0] is inferred to be equal to 1.

In an embodiment, wherein tu_cbf_luma[x0][y0] equal to 1 may specify that the luma transform block contains one or more transform coefficient levels not equal to 0; wherein array indices x0, y0 may specify the location (x0, y0) of the top-left luma sample of the considered transform block relative to the top-left luma sample of the picture; wherein a transform coefficient level may be an integer quantity representing the value associated with a particular two dimensional frequency index in the decoding process prior to scaling for computation of a transform coefficient value.

Details of one or more embodiments are set forth in the accompanying drawings and the description below. Other features, objects, and advantages will be apparent from the description, drawings, and claims.

BRIEF DESCRIPTION OF THE DRAWINGS

In the following embodiments of the disclosure are described in more detail with reference to the attached figures and drawings, in which.

Figure 1A:
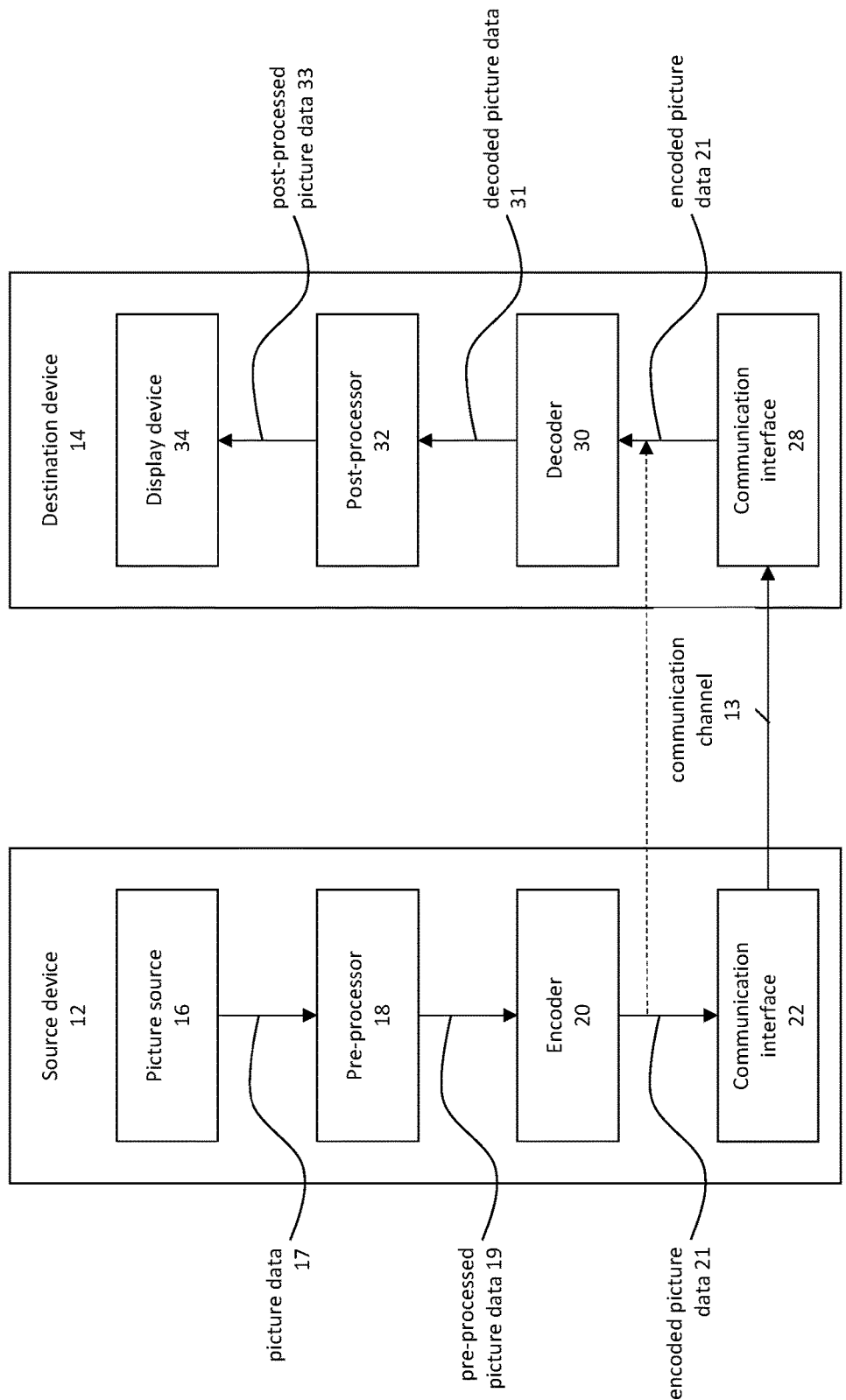
FIG. 1A is a block diagram showing an example of a video coding system configured to implement embodiments of the disclosure.

In the following identical reference signs refer to identical or at least functionally equivalent features if not explicitly specified otherwise.

DETAILED DESCRIPTION OF THE EMBODIMENTS

In the following description, reference is made to the accompanying figures, which form part of the disclosure, and which show, by way of illustration, specific aspects of embodiments of the disclosure or specific aspects in which embodiments of the present disclosure may be used. It is understood that embodiments of the disclosure may be used in other aspects and comprise structural or logical changes not depicted in the figures. The following detailed description, therefore, is not to be taken in a limiting sense, and the scope of the present disclosure is defined by the appended claims.

For instance, it is understood that a disclosure in connection with a described method may also hold true for a corresponding device or system configured to perform the method and vice versa. For example, if one or a plurality of specific method operations are described, a corresponding device may include one or a plurality of units, e.g. functional units, to perform the described one or plurality of method operations (e.g. one unit performing the one or plurality of operations, or a plurality of units each performing one or more of the plurality of operations), even if such one or more units are not explicitly described or illustrated in the figures. On the other hand, for example, if a specific apparatus is described based on one or a plurality of units, e.g. functional units, a corresponding method may include one operation to perform the functionality of the one or plurality of units (e.g. one operation performing the functionality of the one or plurality of units, or a plurality of operations each performing the functionality of one or more of the plurality of units), even if such one or plurality of operations are not explicitly described or illustrated in the figures. Further, it is understood that the features of the various exemplary embodiments and/or aspects described herein may be combined with each other, unless specifically noted otherwise.

Video coding typically refers to the processing of a sequence of pictures, which form the video or video sequence. Instead of the term "picture", the term "frame" or "image" may be used as synonyms in the field of video coding. Video coding (or coding in general) comprises two parts video encoding and video decoding. Video encoding is performed at the source side, typically comprising processing (e.g. by compression) the original video pictures to reduce the amount of data required for representing the video pictures (for more efficient storage and/or transmission). Video decoding is performed at the destination side and typically comprises the inverse processing compared to the encoder to reconstruct the video pictures. Embodiments referring to "coding" of video pictures (or pictures in general) shall be understood to relate to "encoding" or "decoding" of video pictures or respective video sequences. The combination of the encoding part and the decoding part is also referred to as CODEC (Coding and Decoding).

In case of lossless video coding, the original video pictures can be reconstructed, i.e. the reconstructed video pictures have the same quality as the original video pictures (assuming no transmission loss or other data loss during storage or transmission). In case of lossy video coding, further compression, e.g. by quantization, is performed, to reduce the amount of data representing the video pictures, which cannot be completely reconstructed at the decoder, i.e. the quality of the reconstructed video pictures is lower or worse compared to the quality of the original video pictures.

Several video coding standards belong to the group of "lossy hybrid video codecs" (i.e. combine spatial and temporal prediction in the sample domain and 2D transform coding for applying quantization in the transform domain). Each picture of a video sequence is typically partitioned into a set of non-overlapping blocks and the coding is typically performed on a block level. In other words, at the encoder the video is typically processed, i.e. encoded, on a block (video block) level, e.g. by using spatial (intra picture) prediction and/or temporal (inter picture) prediction to generate a prediction block, subtracting the prediction block from the current block (block currently processed/to be processed) to obtain a residual block, transforming the residual block and quantizing the residual block in the transform domain to reduce the amount of data to be transmitted (compression), whereas at the decoder the inverse processing compared to the encoder is applied to the encoded or compressed block to reconstruct the current block for representation. Furthermore, the encoder duplicates the decoder processing loop such that both will generate identical predictions (e.g. intra- and inter predictions) and/or re-constructions for processing, i.e. coding, the subsequent blocks.

In the following embodiments of a video coding system 10, a video encoder 20 and a video decoder 30 are described based on FIGS. 1 to 3.

FIG. 1A is a schematic block diagram illustrating an example coding system 10, e.g. a video coding system 10 (or short coding system 10) that may utilize techniques of this present application. Video encoder 20 (or short encoder 20) and video decoder 30 (or short decoder 30) of video coding system 10 represent examples of devices that may be configured to perform techniques in accordance with various examples described in the present application.

As shown in FIG. 1A, the coding system 10 comprises a source device 12 configured to provide encoded picture data 21 e.g. to a destination device 14 for decoding the encoded picture data 13.

The source device 12 comprises an encoder 20, and may additionally, i.e. optionally, comprise a picture source 16, a pre-processor (or pre-processing unit) 18, e.g. a picture pre-processor 18, and a communication interface or communication unit 22.

The picture source 16 may comprise or be any kind of picture capturing device, for example a camera for capturing a real-world picture, and/or any kind of a picture generating device, for example a computer-graphics processor for generating a computer animated picture, or any kind of other device for obtaining and/or providing a real-world picture, a computer generated picture (e.g. a screen content, a virtual reality (VR) picture) and/or any combination thereof (e.g. an augmented reality (AR) picture). The picture source may be any kind of memory or storage storing any of the aforementioned pictures.

In distinction to the pre-processor 18 and the processing performed by the pre-processing unit 18, the picture or picture data 17 may also be referred to as raw picture or raw picture data 17.

Pre-processor 18 is configured to receive the (raw) picture data 17 and to perform pre-processing on the picture data 17 to obtain a pre-processed picture 19 or pre-processed picture data 19. Pre-processing performed by the pre-processor 18 may, e.g., comprise trimming, color format conversion (e.g. from RGB to YCbCr), color correction, or de-noising. It can be understood that the pre-processing unit 18 may be optional component.

The video encoder 20 is configured to receive the pre-processed picture data 19 and provide encoded picture data 21 (further details will be described below, e.g., based on FIG. 2).

Communication interface 22 of the source device 12 may be configured to receive the encoded picture data 21 and to transmit the encoded picture data 21 (or any further processed version thereof) over communication channel 13 to another device, e.g. the destination device 14 or any other device, for storage or direct reconstruction.

The destination device 14 comprises a decoder 30 (e.g. a video decoder 30), and may additionally, i.e. optionally, comprise a communication interface or communication unit 28, a post-processor 32 (or post-processing unit 32) and a display device 34.

The communication interface 28 of the destination device 14 is configured receive the encoded picture data 21 (or any further processed version thereof), e.g. directly from the source device 12 or from any other source, e.g. a storage device, e.g. an encoded picture data storage device, and provide the encoded picture data 21 to the decoder 30.

The communication interface 22 and the communication interface 28 may be configured to transmit or receive the encoded picture data 21 or encoded data 13 via a direct communication link between the source device 12 and the destination device 14, e.g. a direct wired or wireless connection, or via any kind of network, e.g. a wired or wireless network or any combination thereof, or any kind of private and public network, or any kind of combination thereof.

The communication interface 22 may be, e.g., configured to package the encoded picture data 21 into an appropriate format, e.g. packets, and/or process the encoded picture data using any kind of transmission encoding or processing for transmission over a communication link or communication network.

The communication interface 28, forming the counterpart of the communication interface 22, may be, e.g., configured to receive the transmitted data and process the transmission data using any kind of corresponding transmission decoding or processing and/or de-packaging to obtain the encoded picture data 21.

Both, communication interface 22 and communication interface 28 may be configured as unidirectional communication interfaces as indicated by the arrow for the communication channel 13 in FIG. 1A pointing from the source device 12 to the destination device 14, or bi-directional communication interfaces, and may be configured, e.g. to send and receive messages, e.g. to set up a connection, to acknowledge and exchange any other information related to the communication link and/or data transmission, e.g. encoded picture data transmission.

The decoder 30 is configured to receive the encoded picture data 21 and provide decoded picture data 31 or a decoded picture 31 (further details will be described below, e.g., based on FIG. 3 or FIG. 5).

The post-processor 32 of destination device 14 is configured to post-process the decoded picture data 31 (also called reconstructed picture data), e.g. the decoded picture 31, to obtain post-processed picture data 33, e.g. a post-processed picture 33. The post-processing performed by the post-processing unit 32 may comprise, e.g. color format conversion (e.g. from YCbCr to RGB), color correction, trimming, or re-sampling, or any other processing, e.g. for preparing the decoded picture data 31 for display, e.g. by display device 34.

The display device 34 of the destination device 14 is configured to receive the post-processed picture data 33 for displaying the picture, e.g. to a user or viewer. The display device 34 may be or comprise any kind of display for representing the reconstructed picture, e.g. an integrated or external display or monitor. The displays may, e.g. comprise liquid crystal displays (LCD), organic light emitting diodes (OLED) displays, plasma displays, projectors, micro LED displays, liquid crystal on silicon (LCoS), digital light processor (DLP) or any kind of other display.

Although FIG. 1A depicts the source device 12 and the destination device 14 as separate devices, embodiments of devices may also comprise both or both functionalities, the source device 12 or corresponding functionality and the destination device 14 or corresponding functionality. In such embodiments the source device 12 or corresponding functionality and the destination device 14 or corresponding functionality may be implemented using the same hardware and/or software or by separate hardware and/or software or any combination thereof.

As will be apparent for the skilled person based on the description, the existence and (exact) split of functionalities of the different units or functionalities within the source device 12 and/or destination device 14 as shown in FIG. 1A may vary depending on the actual device and application.

Figure 1B:
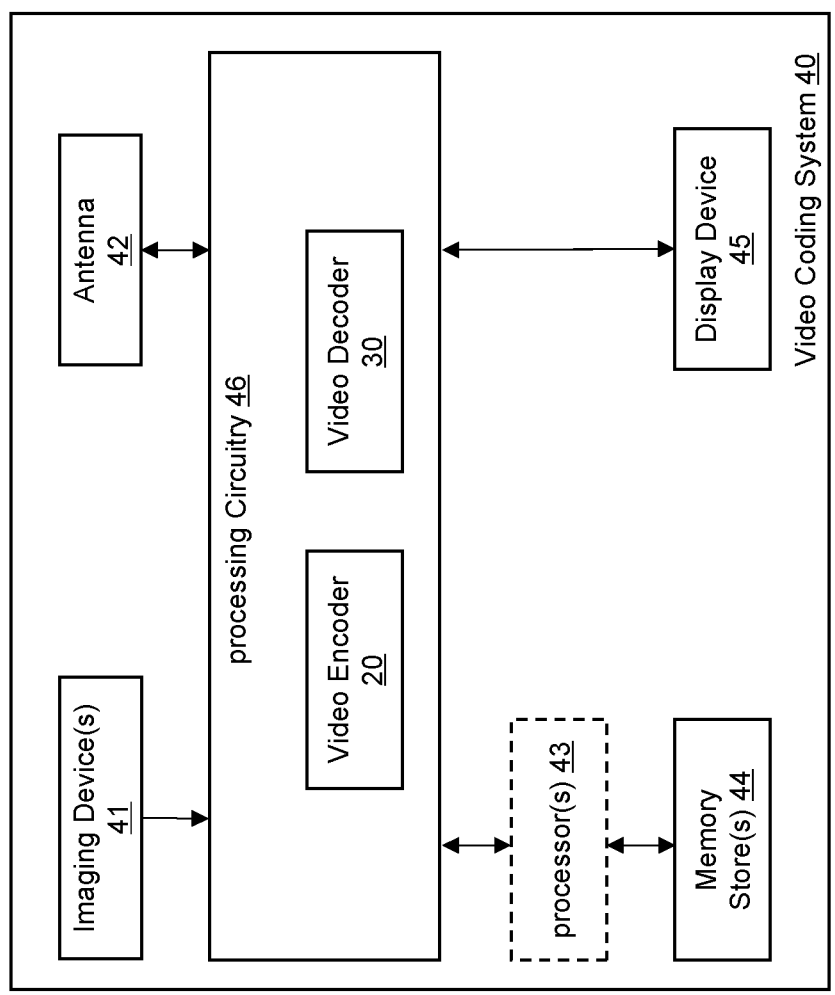
FIG. 1B is a block diagram showing another example of a video coding system configured to implement embodiments of the disclosure.

The encoder 20 (e.g. a video encoder 20) or the decoder 30 (e.g. a video decoder 30) or both encoder 20 and decoder 30 may be implemented via processing circuitry as shown in FIG. 1B, such as one or more microprocessors, digital signal processors (DSPs), application-specific integrated circuits (ASICs), field-programmable gate arrays (FPGAs), discrete logic, hardware, video coding dedicated or any combinations thereof. The encoder 20 may be implemented via processing circuitry 46 to embody the various modules as discussed with respect to encoder 20 of FIG. 2 and/or any other encoder system or subsystem described herein. The decoder 30 may be implemented via processing circuitry 46 to embody the various modules as discussed with respect to decoder 30 of FIG. 3 and/or any other decoder system or subsystem described herein. The processing circuitry may be configured to perform the various operations as discussed later. As shown in FIG. 5, if the techniques are implemented partially in software, a device may store instructions for the software in a suitable, non-transitory computer-readable storage medium and may execute the instructions in hardware using one or more processors to perform the techniques of this disclosure. Either of video encoder 20 and video decoder 30 may be integrated as part of a combined encoder/decoder (CODEC) in a single device, for example, as shown in FIG. 1B.

Source device 12 and destination device 14 may comprise any of a wide range of devices, including any kind of handheld or stationary devices, e.g. notebook or laptop computers, mobile phones, smart phones, tablets or tablet computers, cameras, desktop computers, set-top boxes, televisions, display devices, digital media players, video gaming consoles, video streaming devices (such as content services servers or content delivery servers), broadcast receiver device, broadcast transmitter device, or the like and may use no or any kind of operating system. In some cases, the source device 12 and the destination device 14 may be equipped for wireless communication. Thus, the source device 12 and the destination device 14 may be wireless communication devices.

In some cases, video coding system 10 illustrated in FIG. 1A is merely an example and the techniques of the present application may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In some examples, the encoding and decoding is performed by devices that do not communicate with one another, but simply encode data to memory and/or retrieve and decode data from memory.

For convenience of description, embodiments of the disclosure are described herein, for example, by reference to High-Efficiency Video Coding (HEVC) or to the reference software of Versatile Video coding (VVC), the next generation video coding standard developed by the Joint Collaboration Team on Video Coding (JCT-VC) of ITU-T Video Coding Experts Group (VCEG) and ISO/IEC Motion Picture Experts Group (MPEG). One of ordinary skill in the art will understand that embodiments of the disclosure are not limited to HEVC or VVC.

Encoder and Encoding Method

Figure 2:
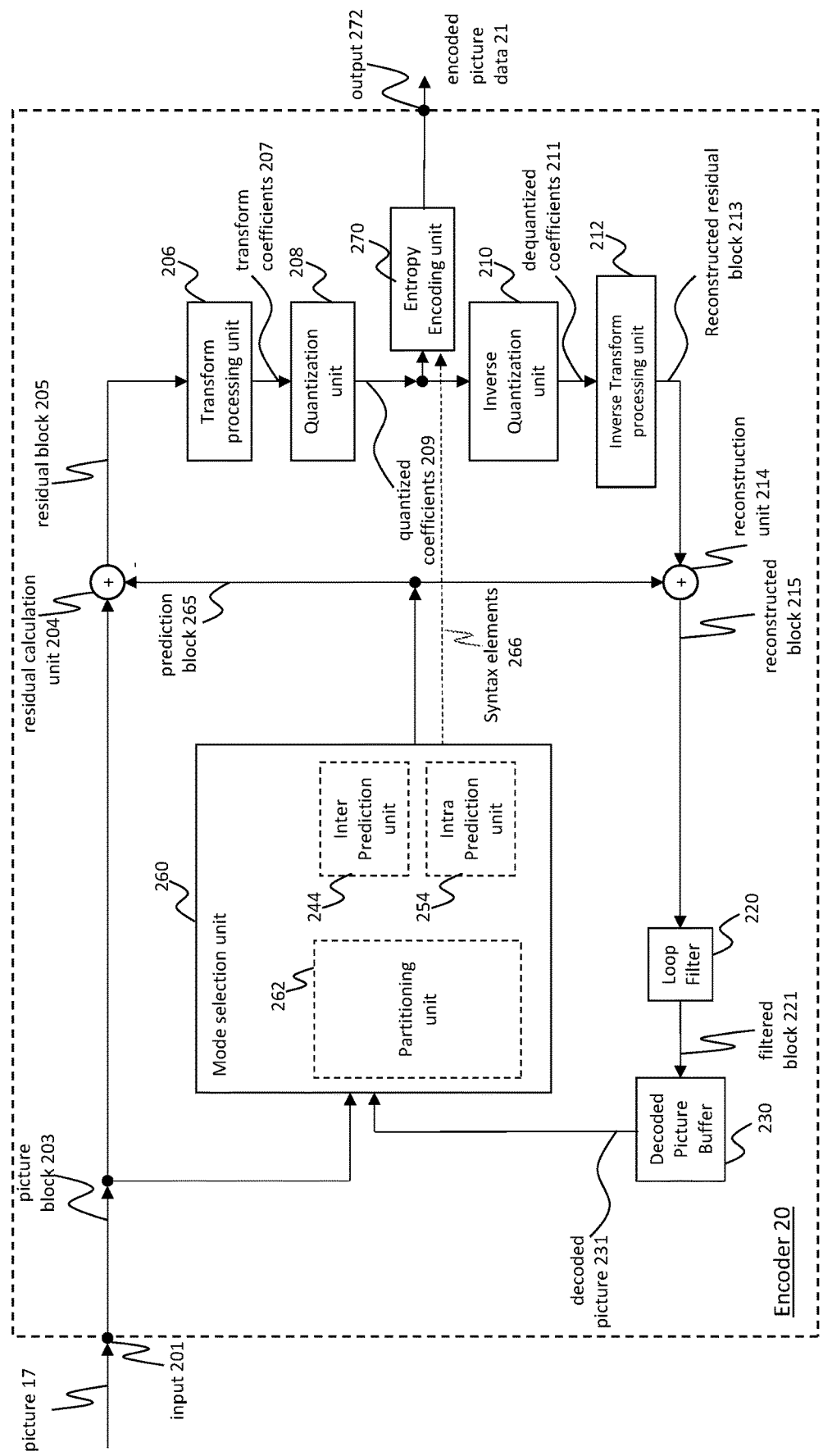
FIG. 2 is a block diagram showing an example of a video encoder configured to implement embodiments of the disclosure.

FIG. 2 shows a schematic block diagram of an example video encoder 20 that is configured to implement the techniques of the present application. In the example of FIG. 2, the video encoder 20 comprises an input 201 (or input interface 201), a residual calculation unit 204, a transform processing unit 206, a quantization unit 208, an inverse quantization unit 210, and inverse transform processing unit 212, a reconstruction unit 214, a loop filter unit 220, a decoded picture buffer (DPB) 230, a mode selection unit 260, an entropy encoding unit 270 and an output 272 (or output interface 272). The mode selection unit 260 may include an inter prediction unit 244, an intra prediction unit 254 and a partitioning unit 262. Inter prediction unit 244 may include a motion estimation unit and a motion compensation unit (not shown). A video encoder 20 as shown in FIG. 2 may also be referred to as hybrid video encoder or a video encoder according to a hybrid video codec.

Figure 3:
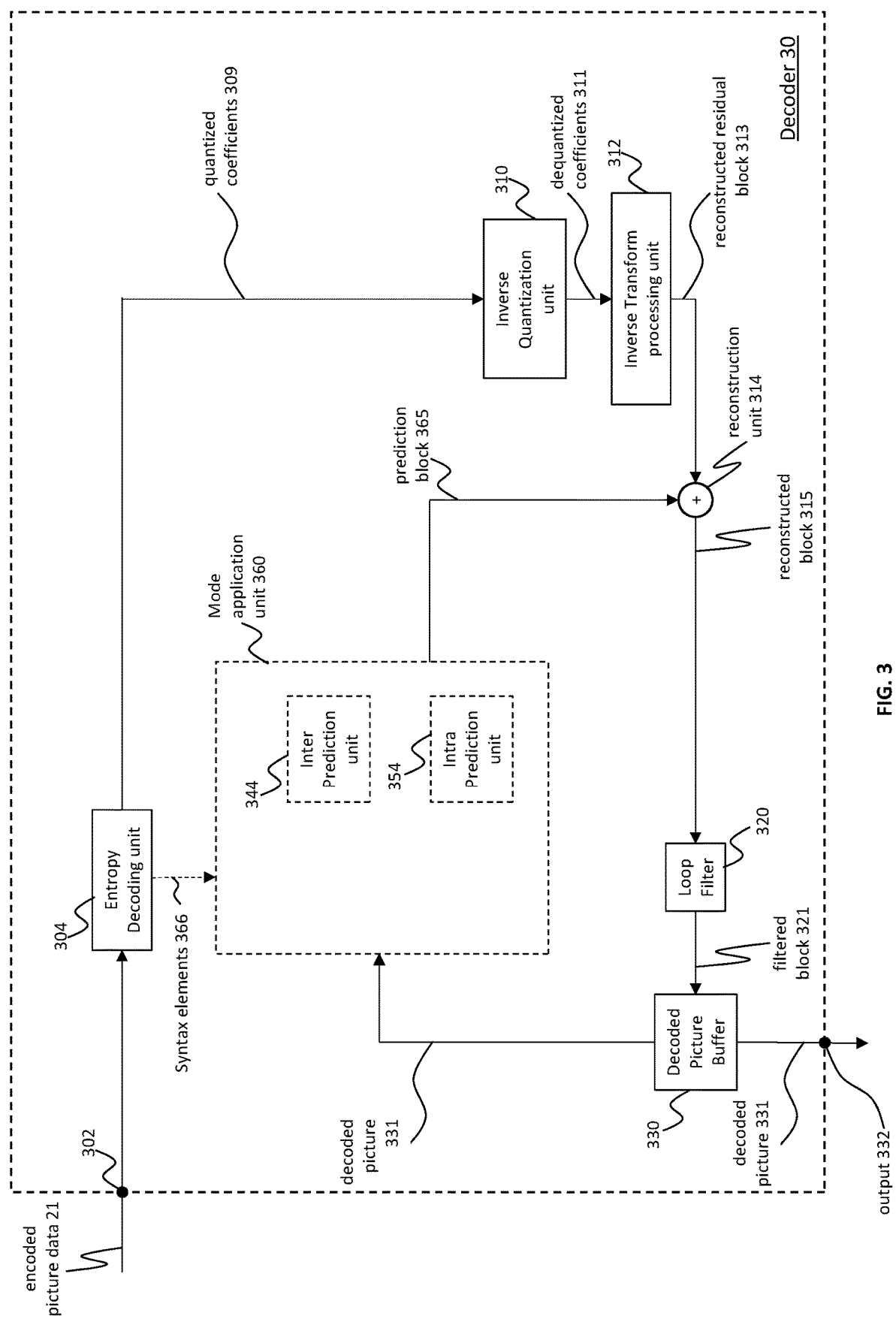
FIG. 3 is a block diagram showing an example structure of a video decoder configured to implement embodiments of the disclosure.

The residual calculation unit 204, the transform processing unit 206, the quantization unit 208, the mode selection unit 260 may be referred to as forming a forward signal path of the encoder 20, whereas the inverse quantization unit 210, the inverse transform processing unit 212, the reconstruction unit 214, the buffer 216, the loop filter 220, the decoded picture buffer (DPB) 230, the inter prediction unit 244 and the intra-prediction unit 254 may be referred to as forming a backward signal path of the video encoder 20, wherein the backward signal path of the video encoder 20 corresponds to the signal path of the decoder (see video decoder 30 in FIG. 3). The inverse quantization unit 210, the inverse transform processing unit 212, the reconstruction unit 214, the loop filter 220, the decoded picture buffer (DPB) 230, the inter prediction unit 244 and the intra-prediction unit 254 are also referred to forming the "built-in decoder" of video encoder 20.

Pictures & Picture Partitioning (Pictures & Blocks)

The encoder 20 may be configured to receive, e.g. via input 201, a picture 17 (or picture data 17), e.g. picture of a sequence of pictures forming a video or video sequence. The received picture or picture data may also be a pre-processed picture 19 (or pre-processed picture data 19). For sake of simplicity, the following description refers to the picture 17. The picture 17 may also be referred to as current picture or picture to be coded (in particular in video coding to distinguish the current picture from other pictures, e.g. previously encoded and/or decoded pictures of the same video sequence, i.e. the video sequence which also comprises the current picture).

A (digital) picture is or can be regarded as a two-dimensional array or matrix of samples with intensity values. A sample in the array may also be referred to as pixel (short form of picture element) or a pel. The number of samples in horizontal and vertical direction (or axis) of the array or picture define the size and/or resolution of the picture. For representation of color, typically three color components are employed, i.e. the picture may be represented or include three sample arrays. In RBG format or color space a picture comprises a corresponding red, green and blue sample array. However, in video coding each pixel is typically represented in a luminance and chrominance format or color space, e.g. YCbCr, which comprises a luminance component indicated by Y (sometimes also L is used instead) and two chrominance components indicated by Cb and Cr. The luminance (or short luma) component Y represents the brightness or grey level intensity (e.g. like in a grey-scale picture), while the two chrominance (or short chroma) components Cb and Cr represent the chromaticity or color information components. Accordingly, a picture in YCbCr format comprises a luminance sample array of luminance sample values (Y), and two chrominance sample arrays of chrominance values (Cb and Cr). Pictures in RGB format may be converted or transformed into YCbCr format and vice versa, the process is also known as color transformation or conversion. If a picture is monochrome, the picture may comprise only a luminance sample array. Accordingly, a picture may be, for example, an array of luma samples in monochrome format or an array of luma samples and two corresponding arrays of chroma samples in 4:2:0, 4:2:2, and 4:4:4 color format.

Embodiments of the video encoder 20 may comprise a picture partitioning unit (not depicted in FIG. 2) configured to partition the picture 17 into a plurality of (typically non-overlapping) picture blocks 203. These blocks may also be referred to as root blocks, macro blocks (H.264/AVC) or coding tree blocks (CTB) or coding tree units (CTU) (H.265/HEVC and VVC). The picture partitioning unit may be configured to use the same block size for all pictures of a video sequence and the corresponding grid defining the block size, or to change the block size between pictures or subsets or groups of pictures, and partition each picture into the corresponding blocks.

In further embodiments, the video encoder may be configured to receive directly a block 203 of the picture 17, e.g. one, several or all blocks forming the picture 17. The picture block 203 may also be referred to as current picture block or picture block to be coded.

Like the picture 17, the picture block 203 again is or can be regarded as a two-dimensional array or matrix of samples with intensity values (sample values), although of smaller dimension than the picture 17. In other words, the block 203 may comprise, e.g., one sample array (e.g. a luma array in case of a monochrome picture 17, or a luma or chroma array in case of a color picture) or three sample arrays (e.g. a luma and two chroma arrays in case of a color picture 17) or any other number and/or kind of arrays depending on the color format applied. The number of samples in horizontal and vertical direction (or axis) of the block 203 define the size of block 203. Accordingly, a block may, for example, an M×N (M-column by N-row) array of samples, or an M×N array of transform coefficients.

Embodiments of the video encoder 20 as shown in FIG. 2 may be configured to encode the picture 17 block by block, e.g. the encoding and prediction is performed per block 203.

Embodiments of the video encoder 20 as shown in FIG. 2 may be further configured to partition and/or encode the picture by using slices (also referred to as video slices), wherein a picture may be partitioned into or encoded using one or more slices (typically non-overlapping), and each slice may comprise one or more blocks (e.g. CTUs).

Embodiments of the video encoder 20 as shown in FIG. 2 may be further configured to partition and/or encode the picture by using tile groups (also referred to as video tile groups) and/or tiles (also referred to as video tiles), wherein a picture may be partitioned into or encoded using one or more tile groups (typically non-overlapping), and each tile group may comprise, e.g. one or more blocks (e.g. CTUs) or one or more tiles, wherein each tile, e.g. may be of rectangular shape and may comprise one or more blocks (e.g. CTUs), e.g. complete or fractional blocks.

Residual Calculation

The residual calculation unit 204 may be configured to calculate a residual block 205 (also referred to as residual 205) based on the picture block 203 and a prediction block 265 (further details about the prediction block 265 are provided later), e.g. by subtracting sample values of the prediction block 265 from sample values of the picture block 203, sample by sample (pixel by pixel) to obtain the residual block 205 in the sample domain.

Transform

The transform processing unit 206 may be configured to apply a transform, e.g. a discrete cosine transform (DCT) or discrete sine transform (DST), on the sample values of the residual block 205 to obtain transform coefficients 207 in a transform domain. The transform coefficients 207 may also be referred to as transform residual coefficients and represent the residual block 205 in the transform domain.

The transform processing unit 206 may be configured to apply integer approximations of DCT/DST, such as the transforms specified for H.265/HEVC. Compared to an orthogonal DCT transform, such integer approximations are typically scaled by a certain factor. In order to preserve the norm of the residual block which is processed by forward and inverse transforms, additional scaling factors are applied as part of the transform process. The scaling factors are typically chosen based on certain constraints like scaling factors being a power of two for shift operations, bit depth of the transform coefficients, tradeoff between accuracy and implementation costs, etc. Specific scaling factors are, for example, specified for the inverse transform, e.g. by inverse transform processing unit 212 (and the corresponding inverse transform, e.g. by inverse transform processing unit 312 at video decoder 30) and corresponding scaling factors for the forward transform, e.g. by transform processing unit 206, at an encoder 20 may be specified accordingly.

Embodiments of the video encoder 20 (respectively transform processing unit 206) may be configured to output transform parameters, e.g. a type of transform or transforms, e.g. directly or encoded or compressed via the entropy encoding unit 270, so that, e.g., the video decoder 30 may receive and use the transform parameters for decoding.

Quantization

The quantization unit 208 may be configured to quantize the transform coefficients 207 to obtain quantized coefficients 209, e.g. by applying scalar quantization or vector quantization. The quantized coefficients 209 may also be referred to as quantized transform coefficients 209 or quantized residual coefficients 209.

The quantization process may reduce the bit depth associated with some or all of the transform coefficients 207. For example, an n-bit transform coefficient may be rounded down to an m-bit Transform coefficient during quantization, where n is greater than m. The degree of quantization may be modified by adjusting a quantization parameter (QP). For example for scalar quantization, different scaling may be applied to achieve finer or coarser quantization. Smaller quantization step sizes correspond to finer quantization, whereas larger quantization step sizes correspond to coarser quantization. The applicable quantization step size may be indicated by a quantization parameter (QP). The quantization parameter may for example be an index to a predefined set of applicable quantization step sizes. For example, small quantization parameters may correspond to fine quantization (small quantization step sizes) and large quantization parameters may correspond to coarse quantization (large quantization step sizes) or vice versa. The quantization may include division by a quantization step size and a corresponding and/or the inverse dequantization, e.g. by inverse quantization unit 210, may include multiplication by the quantization step size. Embodiments according to some standards, e.g. HEVC, may be configured to use a quantization parameter to determine the quantization step size. Generally, the quantization step size may be calculated based on a quantization parameter using a fixed point approximation of an equation including division. Additional scaling factors may be introduced for quantization and dequantization to restore the norm of the residual block, which might get modified because of the scaling used in the fixed point approximation of the equation for quantization step size and quantization parameter. In one example implementation, the scaling of the inverse transform and dequantization might be combined. Alternatively, customized quantization tables may be used and signaled from an encoder to a decoder, e.g. in a bitstream. The quantization is a lossy operation, wherein the loss increases with increasing quantization step sizes.

Embodiments of the video encoder 20 (respectively quantization unit 208) may be configured to output quantization parameters (QP), e.g. directly or encoded via the entropy encoding unit 270, so that, e.g., the video decoder 30 may receive and apply the quantization parameters for decoding.

Inverse Quantization

The inverse quantization unit 210 is configured to apply the inverse quantization of the quantization unit 208 on the quantized coefficients to obtain dequantized coefficients 211, e.g. by applying the inverse of the quantization scheme applied by the quantization unit 208 based on or using the same quantization step size as the quantization unit 208. The dequantized coefficients 211 may also be referred to as dequantized residual coefficients 211 and correspond—although typically not identical to the transform coefficients due to the loss by quantization—to the transform coefficients 207.

Inverse Transform

The inverse transform processing unit 212 is configured to apply the inverse transform of the transform applied by the transform processing unit 206, e.g. an inverse discrete cosine transform (DCT) or inverse discrete sine transform (DST) or other inverse transforms, to obtain a reconstructed residual block 213 (or corresponding dequantized coefficients 213) in the sample domain. The reconstructed residual block 213 may also be referred to as transform block 213.

Reconstruction

The reconstruction unit 214 (e.g. adder or summer 214) is configured to add the transform block 213 (i.e. reconstructed residual block 213) to the prediction block 265 to obtain a reconstructed block 215 in the sample domain, e.g. by adding—sample by sample—the sample values of the reconstructed residual block 213 and the sample values of the prediction block 265.

Filtering

The loop filter unit 220 (or short "loop filter" 220), is configured to filter the reconstructed block 215 to obtain a filtered block 221, or in general, to filter reconstructed samples to obtain filtered samples. The loop filter unit is, e.g., configured to smooth pixel transitions, or otherwise improve the video quality. The loop filter unit 220 may comprise one or more loop filters such as a de-blocking filter, a sample-adaptive offset (SAO) filter or one or more other filters, e.g. a bilateral filter, an adaptive loop filter (ALF), a sharpening, a smoothing filters or a collaborative filters, or any combination thereof. Although the loop filter unit 220 is shown in FIG. 2 as being an in loop filter, in other configurations, the loop filter unit 220 may be implemented as a post loop filter. The filtered block 221 may also be referred to as filtered reconstructed block 221.

Embodiments of the video encoder 20 (respectively loop filter unit 220) may be configured to output loop filter parameters (such as sample adaptive offset information), e.g. directly or encoded via the entropy encoding unit 270, so that, e.g., a decoder 30 may receive and apply the same loop filter parameters or respective loop filters for decoding.

Decoded Picture Buffer

The decoded picture buffer (DPB) 230 may be a memory that stores reference pictures, or in general reference picture data, for encoding video data by video encoder 20. The DPB 230 may be formed by any of a variety of memory devices, such as dynamic random access memory (DRAM), including synchronous DRAM (SDRAM), magnetoresistive RAM (MRAM), resistive RAM (RRAM), or other types of memory devices. The decoded picture buffer (DPB) 230 may be configured to store one or more filtered blocks 221. The decoded picture buffer 230 may be further configured to store other previously filtered blocks, e.g. previously reconstructed and filtered blocks 221, of the same current picture or of different pictures, e.g. previously reconstructed pictures, and may provide complete previously reconstructed, i.e. decoded, pictures (and corresponding reference blocks and samples) and/or a partially reconstructed current picture (and corresponding reference blocks and samples), for example for inter prediction. The decoded picture buffer (DPB) 230 may be also configured to store one or more unfiltered reconstructed blocks 215, or in general unfiltered reconstructed samples, e.g. if the reconstructed block 215 is not filtered by loop filter unit 220, or any other further processed version of the reconstructed blocks or samples.

Mode Selection (Partitioning & Prediction)

The mode selection unit 260 comprises partitioning unit 262, inter-prediction unit 244 and intra-prediction unit 254, and is configured to receive or obtain original picture data, e.g. an original block 203 (current block 203 of the current picture 17), and reconstructed picture data, e.g. filtered and/or unfiltered reconstructed samples or blocks of the same (current) picture and/or from one or a plurality of previously decoded pictures, e.g. from decoded picture buffer 230 or other buffers (e.g. line buffer, not shown). The reconstructed picture data is used as reference picture data for prediction, e.g. inter-prediction or intra-prediction, to obtain a prediction block 265 or predictor 265.

Mode selection unit 260 may be configured to determine or select a partitioning for a current block prediction mode (including no partitioning) and a prediction mode (e.g. an intra or inter prediction mode) and generate a corresponding prediction block 265, which is used for the calculation of the residual block 205 and for the reconstruction of the reconstructed block 215.

Embodiments of the mode selection unit 260 may be configured to select the partitioning and the prediction mode (e.g. from those supported by or available for mode selection unit 260), which provide the best match or in other words the minimum residual (minimum residual means better compression for transmission or storage), or a minimum signaling overhead (minimum signaling overhead means better compression for transmission or storage), or which considers or balances both. The mode selection unit 260 may be configured to determine the partitioning and prediction mode based on rate distortion optimization (RDO), i.e. select the prediction mode that provides a minimum rate distortion. Terms like "best", "minimum", "optimum" etc. in this context do not necessarily refer to an overall "best", "minimum", "optimum", etc. but may also refer to the fulfillment of a termination or selection criterion like a value exceeding or falling below a threshold or other constraints leading potentially to a "sub-optimum selection" but reducing complexity and processing time.

In other words, the partitioning unit 262 may be configured to partition the block 203 into smaller block partitions or sub-blocks (which form again blocks), e.g. iteratively using quad-tree-partitioning (QT), binary partitioning (BT) or triple-tree-partitioning (TT) or any combination thereof, and to perform, e.g., the prediction for each of the block partitions or sub-blocks, wherein the mode selection comprises the selection of the tree-structure of the partitioned block 203 and the prediction modes are applied to each of the block partitions or sub-blocks.

In the following the partitioning (e.g. by partitioning unit 260) and prediction processing (by inter-prediction unit 244 and intra-prediction unit 254) performed by an example video encoder 20 will be explained in more detail.

Partitioning

The partitioning unit 262 may partition (or split) a current block 203 into smaller partitions, e.g. smaller blocks of square or rectangular size. These smaller blocks (which may also be referred to as sub-blocks) may be further partitioned into even smaller partitions. This is also referred to tree-partitioning or hierarchical tree-partitioning, wherein a root block, e.g. at root tree-level 0 (hierarchy-level 0, depth 0), may be recursively partitioned, e.g. partitioned into two or more blocks of a next lower tree-level, e.g. nodes at tree-level 1 (hierarchy-level 1, depth 1), wherein these blocks may be again partitioned into two or more blocks of a next lower level, e.g. tree-level 2 (hierarchy-level 2, depth 2), etc. until the partitioning is terminated, e.g. because a termination criterion is fulfilled, e.g. a maximum tree depth or minimum block size is reached. Blocks that are not further partitioned are also referred to as leaf-blocks or leaf nodes of the tree. A tree using partitioning into two partitions is referred to as binary-tree (BT), a tree using partitioning into three partitions is referred to as ternary-tree (TT), and a tree using partitioning into four partitions is referred to as quad-tree (QT).

As mentioned before, the term "block" as used herein may be a portion, in particular a square or rectangular portion, of a picture. With reference, for example, to HEVC and VVC, the block may be or correspond to a coding tree unit (CTU), a coding unit (CU), prediction unit (PU), and transform unit (TU) and/or to the corresponding blocks, e.g. a coding tree block (CTB), a coding block (CB), a transform block (TB) or prediction block (PB).

For example, a coding tree unit (CTU) may be or comprise a CTB of luma samples, two corresponding CTBs of chroma samples of a picture that has three sample arrays, or a CTB of samples of a monochrome picture or a picture that is coded using three separate color planes and syntax structures used to code the samples. Correspondingly, a coding tree block (CTB) may be an N×N block of samples for some value of N such that the division of a component into CTBs is a partitioning. A coding unit (CU) may be or comprise a coding block of luma samples, two corresponding coding blocks of chroma samples of a picture that has three sample arrays, or a coding block of samples of a monochrome picture or a picture that is coded using three separate color planes and syntax structures used to code the samples. Correspondingly, a coding block (CB) may be an M×N block of samples for some values of M and N such that the division of a CTB into coding blocks is a partitioning.

In embodiments, e.g., according to HEVC, a coding tree unit (CTU) may be split into CUs by using a quad-tree structure denoted as coding tree. The decision whether to code a picture area using inter-picture (temporal) or intra-picture (spatial) prediction is made at the CU level. Each CU can be further split into one, two or four PUs according to the PU splitting type. Inside one PU, the same prediction process is applied and the relevant information is transmitted to the decoder on a PU basis. After obtaining the residual block by applying the prediction process based on the PU splitting type, a CU can be partitioned into transform units (TUs) according to another quadtree structure similar to the coding tree for the CU.

In embodiments, e.g., according to the latest video coding standard currently in development, which is referred to as Versatile Video Coding (VVC), a combined Quad-tree and binary tree (QTBT) partitioning is for example used to partition a coding block. In the QTBT block structure, a CU can have either a square or a rectangular shape. For example, a coding tree unit (CTU) is first partitioned by a quadtree structure. The quadtree leaf nodes are further partitioned by a binary tree or ternary (or triple) tree structure. The partitioning tree leaf nodes are called coding units (CUs), and that segmentation is used for prediction and transform processing without any further partitioning. This means that the CU, PU and TU have the same block size in the QTBT coding block structure. In parallel, multiple partition, for example, triple tree partition may be used together with the QTBT block structure.

In one example, the mode selection unit 260 of video encoder 20 may be configured to perform any combination of the partitioning techniques described herein.

As described above, the video encoder 20 is configured to determine or select the best or an optimum prediction mode from a set of (e.g. pre-determined) prediction modes. The set of prediction modes may comprise, e.g., intra-prediction modes and/or inter-prediction modes.

Intra-Prediction

The set of intra-prediction modes may comprise 35 different intra-prediction modes, e.g. non-directional modes like DC (or mean) mode and planar mode, or directional modes, e.g. as defined in HEVC, or may comprise 67 different intra-prediction modes, e.g. non-directional modes like DC (or mean) mode and planar mode, or directional modes, e.g. as defined for VVC.

The intra-prediction unit 254 is configured to use reconstructed samples of neighboring blocks of the same current picture to generate an intra-prediction block 265 according to an intra-prediction mode of the set of intra-prediction modes.

The intra prediction unit 254 (or in general the mode selection unit 260) is further configured to output intra-prediction parameters (or in general information indicative of the selected intra prediction mode for the block) to the entropy encoding unit 270 in form of syntax elements 266 for inclusion into the encoded picture data 21, so that, e.g., the video decoder 30 may receive and use the prediction parameters for decoding.

Inter-Prediction

The set of (or possible) inter-prediction modes depends on the available reference pictures (i.e. previous at least partially decoded pictures, e.g. stored in DBP 230) and other inter-prediction parameters, e.g. whether the whole reference picture or only a part, e.g. a search window area around the area of the current block, of the reference picture is used for searching for a best matching reference block, and/or e.g. whether pixel interpolation is applied, e.g. half/semi-pel and/or quarter-pel interpolation, or not.

Additional to the above prediction modes, skip mode and/or direct mode may be applied.

The inter prediction unit 244 may include a motion estimation (ME) unit and a motion compensation (MC) unit (both not shown in FIG. 2). The motion estimation unit may be configured to receive or obtain the picture block 203 (current picture block 203 of the current picture 17) and a decoded picture 231, or at least one or a plurality of previously reconstructed blocks, e.g. reconstructed blocks of one or a plurality of other/different previously decoded pictures 231, for motion estimation. E.g., a video sequence may comprise the current picture and the previously decoded pictures 231, or in other words, the current picture and the previously decoded pictures 231 may be part of or form a sequence of pictures forming a video sequence.

The encoder 20 may, e.g., be configured to select a reference block from a plurality of reference blocks of the same or different pictures of the plurality of other pictures and provide a reference picture (or reference picture index) and/or an offset (spatial offset) between the position (x, y coordinates) of the reference block and the position of the current block as inter prediction parameters to the motion estimation unit. This offset is also called motion vector (MV).

The motion compensation unit is configured to obtain, e.g. receive, an inter prediction parameter and to perform inter prediction based on or using the inter prediction parameter to obtain an inter prediction block 265. Motion compensation, performed by the motion compensation unit, may involve fetching or generating the prediction block based on the motion/block vector determined by motion estimation, possibly performing interpolations to sub-pixel precision. Interpolation filtering may generate additional pixel samples from known pixel samples, thus potentially increasing the number of candidate prediction blocks that may be used to code a picture block. Upon receiving the motion vector for the PU of the current picture block, the motion compensation unit may locate the prediction block to which the motion vector points in one of the reference picture lists.

The motion compensation unit may also generate syntax elements associated with the blocks and video slices for use by video decoder 30 in decoding the picture blocks of the video slice. In addition or as an alternative to slices and respective syntax elements, tile groups and/or tiles and respective syntax elements may be generated or used.

Entropy Coding

The entropy encoding unit 270 is configured to apply, for example, an entropy encoding algorithm or scheme (e.g. a variable length coding (VLC) scheme, an context adaptive VLC scheme (CAVLC), an arithmetic coding scheme, a binarization, a context adaptive binary arithmetic coding (CABAC), syntax-based context-adaptive binary arithmetic coding (SBAC), probability interval partitioning entropy (PIPE) coding or another entropy encoding methodology or technique) or bypass (no compression) on the quantized coefficients 209, inter prediction parameters, intra prediction parameters, loop filter parameters and/or other syntax elements to obtain encoded picture data 21 which can be output via the output 272, e.g. in the form of an encoded bitstream 21, so that, e.g., the video decoder 30 may receive and use the parameters for decoding. The encoded bitstream 21 may be transmitted to video decoder 30, or stored in a memory for later transmission or retrieval by video decoder 30.

Other structural variations of the video encoder 20 can be used to encode the video stream. For example, a non-transform based encoder 20 can quantize the residual signal directly without the transform processing unit 206 for certain blocks or frames. In another implementation, an encoder 20 can have the quantization unit 208 and the inverse quantization unit 210 combined into a single unit.

Decoder and Decoding Method

FIG. 3 shows an example of a video decoder 30 that is configured to implement the techniques of this present application. The video decoder 30 is configured to receive encoded picture data 21 (e.g. encoded bitstream 21), e.g. encoded by encoder 20, to obtain a decoded picture 331. The encoded picture data or bitstream comprises information for decoding the encoded picture data, e.g. data that represents picture blocks of an encoded video slice (and/or tile groups or tiles) and associated syntax elements.

In the example of FIG. 3, the decoder 30 comprises an entropy decoding unit 304, an inverse quantization unit 310, an inverse transform processing unit 312, a reconstruction unit 314 (e.g. a summer 314), a loop filter 320, a decoded picture buffer (DBP) 330, a mode application unit 360, an inter prediction unit 344 and an intra prediction unit 354. Inter prediction unit 344 may be or include a motion compensation unit. Video decoder 30 may, in some examples, perform a decoding pass generally reciprocal to the encoding pass described with respect to video encoder 100 from FIG. 2.

As explained with regard to the encoder 20, the inverse quantization unit 210, the inverse transform processing unit 212, the reconstruction unit 214 the loop filter 220, the decoded picture buffer (DPB) 230, the inter prediction unit 344 and the intra prediction unit 354 are also referred to as forming the "built-in decoder" of video encoder 20. Accordingly, the inverse quantization unit 310 may be identical in function to the inverse quantization unit 110, the inverse transform processing unit 312 may be identical in function to the inverse transform processing unit 212, the reconstruction unit 314 may be identical in function to reconstruction unit 214, the loop filter 320 may be identical in function to the loop filter 220, and the decoded picture buffer 330 may be identical in function to the decoded picture buffer 230. Therefore, the explanations provided for the respective units and functions of the video 20 encoder apply correspondingly to the respective units and functions of the video decoder 30.

Entropy Decoding

The entropy decoding unit 304 is configured to parse the bitstream 21 (or in general encoded picture data 21) and perform, for example, entropy decoding to the encoded picture data 21 to obtain, e.g., quantized coefficients 309 and/or decoded coding parameters (not shown in FIG. 3), e.g. any or all of inter prediction parameters (e.g. reference picture index and motion vector), intra prediction parameter (e.g. intra prediction mode or index), transform parameters, quantization parameters, loop filter parameters, and/or other syntax elements. Entropy decoding unit 304 may be configured to apply the decoding algorithms or schemes corresponding to the encoding schemes as described with regard to the entropy encoding unit 270 of the encoder 20. Entropy decoding unit 304 may be further configured to provide inter prediction parameters, intra prediction parameter and/or other syntax elements to the mode application unit 360 and other parameters to other units of the decoder 30. Video decoder 30 may receive the syntax elements at the video slice level and/or the video block level. In addition or as an alternative to slices and respective syntax elements, tile groups and/or tiles and respective syntax elements may be received and/or used.

Inverse Quantization

The inverse quantization unit 310 may be configured to receive quantization parameters (QP) (or in general information related to the inverse quantization) and quantized coefficients from the encoded picture data 21 (e.g. by parsing and/or decoding, e.g. by entropy decoding unit 304) and to apply based on the quantization parameters an inverse quantization on the decoded quantized coefficients 309 to obtain dequantized coefficients 311, which may also be referred to as transform coefficients 311. The inverse quantization process may include use of a quantization parameter determined by video encoder 20 for each video block in the video slice (or tile or tile group) to determine a degree of quantization and, likewise, a degree of inverse quantization that should be applied.

Inverse Transform

Inverse transform processing unit 312 may be configured to receive dequantized coefficients 311, also referred to as transform coefficients 311, and to apply a transform to the dequantized coefficients 311 in order to obtain reconstructed residual blocks 213 in the sample domain. The reconstructed residual blocks 213 may also be referred to as transform blocks 313. The transform may be an inverse transform, e.g., an inverse DCT, an inverse DST, an inverse integer transform, or a conceptually similar inverse transform process. The inverse transform processing unit 312 may be further configured to receive transform parameters or corresponding information from the encoded picture data 21 (e.g. by parsing and/or decoding, e.g. by entropy decoding unit 304) to determine the transform to be applied to the dequantized coefficients 311.

Reconstruction

The reconstruction unit 314 (e.g. adder or summer 314) may be configured to add the reconstructed residual block 313, to the prediction block 365 to obtain a reconstructed block 315 in the sample domain, e.g. by adding the sample values of the reconstructed residual block 313 and the sample values of the prediction block 365.

Filtering

The loop filter unit 320 (either in the coding loop or after the coding loop) is configured to filter the reconstructed block 315 to obtain a filtered block 321, e.g. to smooth pixel transitions, or otherwise improve the video quality. The loop filter unit 320 may comprise one or more loop filters such as a de-blocking filter, a sample-adaptive offset (SAO) filter or one or more other filters, e.g. a bilateral filter, an adaptive loop filter (ALF), a sharpening, a smoothing filters or a collaborative filters, or any combination thereof. Although the loop filter unit 320 is shown in FIG. 3 as being an in loop filter, in other configurations, the loop filter unit 320 may be implemented as a post loop filter.

Decoded Picture Buffer

The decoded video blocks 321 of a picture are then stored in decoded picture buffer 330, which stores the decoded pictures 331 as reference pictures for subsequent motion compensation for other pictures and/or for output respectively display.

The decoder 30 is configured to output the decoded picture 311, e.g. via output 312, for presentation or viewing to a user.

Prediction

The inter prediction unit 344 may be identical to the inter prediction unit 244 (in particular to the motion compensation unit) and the intra prediction unit 354 may be identical to the inter prediction unit 254 in function, and performs split or partitioning decisions and prediction based on the partitioning and/or prediction parameters or respective information received from the encoded picture data 21 (e.g. by parsing and/or decoding, e.g. by entropy decoding unit 304). Mode application unit 360 may be configured to perform the prediction (intra or inter prediction) per block based on reconstructed pictures, blocks or respective samples (filtered or unfiltered) to obtain the prediction block 365.

When the video slice is coded as an intra coded (I) slice, intra prediction unit 354 of mode application unit 360 is configured to generate prediction block 365 for a picture block of the current video slice based on a signaled intra prediction mode and data from previously decoded blocks of the current picture. When the video picture is coded as an inter coded (i.e., B, or P) slice, inter prediction unit 344 (e.g. motion compensation unit) of mode application unit 360 is configured to produce prediction blocks 365 for a video block of the current video slice based on the motion vectors and other syntax elements received from entropy decoding unit 304. For inter prediction, the prediction blocks may be produced from one of the reference pictures within one of the reference picture lists. Video decoder 30 may construct the reference frame lists, List 0 and List 1, using default construction techniques based on reference pictures stored in DPB 330. The same or similar may be applied for or by embodiments using tile groups (e.g. video tile groups) and/or tiles (e.g. video tiles) in addition or alternatively to slices (e.g. video slices), e.g. a video may be coded using I, P or B tile groups and/or tiles.

Mode application unit 360 is configured to determine the prediction information for a video block of the current video slice by parsing the motion vectors or related information and other syntax elements, and uses the prediction information to produce the prediction blocks for the current video block being decoded. For example, the mode application unit 360 uses some of the received syntax elements to determine a prediction mode (e.g., intra or inter prediction) used to code the video blocks of the video slice, an inter prediction slice type (e.g., B slice, P slice, or GPB slice), construction information for one or more of the reference picture lists for the slice, motion vectors for each inter encoded video block of the slice, inter prediction status for each inter coded video block of the slice, and other information to decode the video blocks in the current video slice. The same or similar may be applied for or by embodiments using tile groups (e.g. video tile groups) and/or tiles (e.g. video tiles) in addition or alternatively to slices (e.g. video slices), e.g. a video may be coded using I, P or B tile groups and/or tiles.

Embodiments of the video decoder 30 as shown in FIG. 3 may be configured to partition and/or decode the picture by using slices (also referred to as video slices), wherein a picture may be partitioned into or decoded using one or more slices (typically non-overlapping), and each slice may comprise one or more blocks (e.g. CTUs).

Embodiments of the video decoder 30 as shown in FIG. 3 may be configured to partition and/or decode the picture by using tile groups (also referred to as video tile groups) and/or tiles (also referred to as video tiles), wherein a picture may be partitioned into or decoded using one or more tile groups (typically non-overlapping), and each tile group may comprise, e.g. one or more blocks (e.g. CTUs) or one or more tiles, wherein each tile, e.g. may be of rectangular shape and may comprise one or more blocks (e.g. CTUs), e.g. complete or fractional blocks.

Other variations of the video decoder 30 can be used to decode the encoded picture data 21. For example, the decoder 30 can produce the output video stream without the loop filtering unit 320. For example, a non-transform based decoder 30 can inverse-quantize the residual signal directly without the inverse-transform processing unit 312 for certain blocks or frames. In another implementation, the video decoder 30 can have the inverse-quantization unit 310 and the inverse-transform processing unit 312 combined into a single unit.

It should be understood that, in the encoder 20 and the decoder 30, a processing result of a current operation may be further processed and then output to the next operation. For example, after interpolation filtering, motion vector derivation or loop filtering, a further operation, such as Clip or shift, may be performed on the processing result of the interpolation filtering, motion vector derivation or loop filtering.

Figure 4:
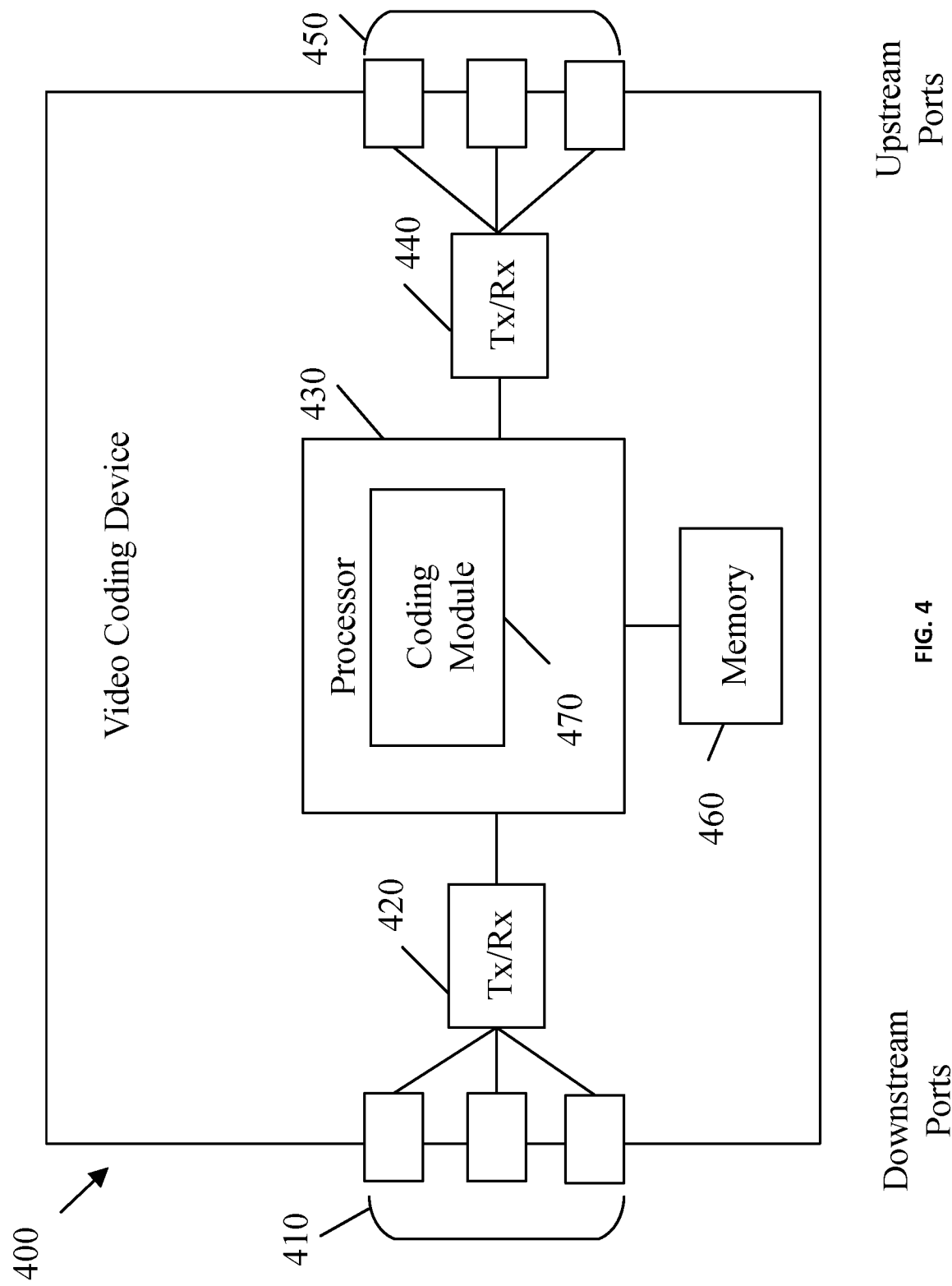
FIG. 4 is a block diagram illustrating an example of an encoding apparatus or a decoding apparatus according to some embodiments.

FIG. 4 is a schematic diagram of a video coding device 400 according to an embodiment of the disclosure. The video coding device 400 is suitable for implementing the disclosed embodiments as described herein. In an embodiment, the video coding device 400 may be a decoder such as video decoder 30 of FIG. 1A or an encoder such as video encoder 20 of FIG. 1A.

The video coding device 400 comprises ingress ports 410 (or input ports 410) and receiver units (Rx) 420 for receiving data; a processor, logic unit, or central processing unit (CPU) 430 to process the data; transmitter units (Tx) 440 and egress ports 450 (or output ports 450) for transmitting the data; and a memory 460 for storing the data. The video coding device 400 may also comprise optical-to-electrical (OE) components and electrical-to-optical (EO) components coupled to the ingress ports 410, the receiver units 420, the transmitter units 440, and the egress ports 450 for egress or ingress of optical or electrical signals.

The processor 430 is implemented by hardware and software. The processor 430 may be implemented as one or more CPU chips, cores (e.g., as a multi-core processor), FPGAs, ASICs, and DSPs. The processor 430 is in communication with the ingress ports 410, receiver units 420, transmitter units 440, egress ports 450, and memory 460. The processor 430 comprises a coding module 470. The coding module 470 implements the disclosed embodiments described above. For instance, the coding module 470 implements, processes, prepares, or provides the various coding operations. The inclusion of the coding module 470 therefore provides a substantial improvement to the functionality of the video coding device 400 and effects a transformation of the video coding device 400 to a different state. Alternatively, the coding module 470 is implemented as instructions stored in the memory 460 and executed by the processor 430.

The memory 460 may comprise one or more disks, tape drives, and solid-state drives and may be used as an overflow data storage device, to store programs when such programs are selected for execution, and to store instructions and data that are read during program execution. The memory 460 may be, for example, volatile and/or non-volatile and may be a read-only memory (ROM), random access memory (RAM), ternary content-addressable memory (TCAM), and/or static random-access memory (SRAM).

Figure 5:
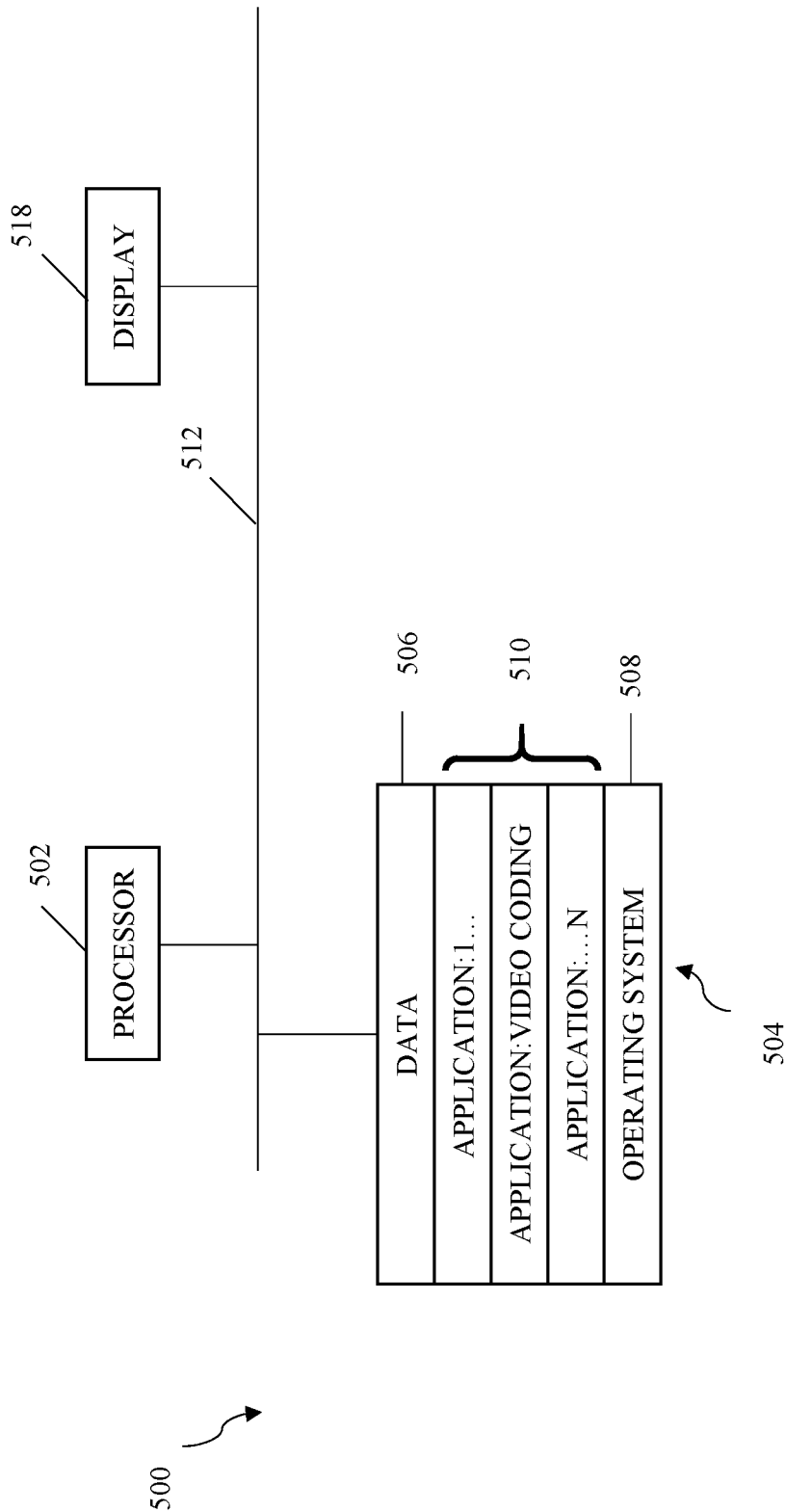
FIG. 5 is a block diagram illustrating another example of an encoding apparatus or a decoding apparatus according to some embodiments.

FIG. 5 is a simplified block diagram of an apparatus 500 that may be used as either or both of the source device 12 and the destination device 14 from FIG. 1 according to an exemplary embodiment.

A processor 502 in the apparatus 500 can be a central processing unit. Alternatively, the processor 502 can be any other type of device, or multiple devices, capable of manipulating or processing information now existing or hereafter developed. Although the disclosed implementations can be practiced with a single processor as shown, e.g., the processor 502, advantages in speed and efficiency can be achieved using more than one processor.

A memory 504 in the apparatus 500 can be a read only memory (ROM) device or a random access memory (RAM) device in an implementation. Any other suitable type of storage device can be used as the memory 504. The memory 504 can include code and data 506 that is accessed by the processor 502 using a bus 512. The memory 504 can further include an operating system 508 and application programs 510, the application programs 510 including at least one program that permits the processor 502 to perform the methods described here. For example, the application programs 510 can include applications 1 through N, which further include a video coding application that performs the methods described here.

The apparatus 500 can also include one or more output devices, such as a display 518. The display 518 may be, in one example, a touch sensitive display that combines a display with a touch sensitive element that is operable to sense touch inputs. The display 518 can be coupled to the processor 502 via the bus 512.

Although depicted here as a single bus, the bus 512 of the apparatus 500 can be composed of multiple buses. Further, the secondary storage 514 can be directly coupled to the other components of the apparatus 500 or can be accessed via a network and can comprise a single integrated unit such as a memory card or multiple units such as multiple memory cards. The apparatus 500 can thus be implemented in a wide variety of configurations.

Modern video codecs normally include a different ways of transform unit partitioning, among which Sub-block transform for inter blocks, Intra Sub-Partitions Coding Mode for intra blocks, transform unit partitioning ti satisfy maximal transform size restriction. Also transform unit can be directly coded without further split. On later stages each transform or sub-transform unit includes a set of cbf flags, which specify whether there is a residue for current block in each color component correspondently. It should be noticed, cbf flags have some redundancy, which can be utilized using specific features of each certain transform unit partitioning.

The embodiments of the disclosure propose a general unified way of redundancy removal in cbf flags signaling.

In the present disclosure, in a first embodiment, if transform unit split is not used, then tu_cbf_luma can be derived from cu_cbf flag if it is set to 1 and two chroma flags of the current TU are set to 0. In this case tu_cbf_luma is set equal to 1 and not signaled. Otherwise signaling of tu_cbf_luma is performed in normal way. In the present disclosure, cu_cbf flag equal to 1 specifies that a transform tree syntax structure is present for the current coding unit, if cu_cbf flag equal to 0 specifies that the transform tree syntax structure is not present for the current coding unit.

In a second embodiment, if transform unit is split by SBT onto two sub-transform units and for one of those can include residues, which are controlled by tu_cbf_luma, tu_cbf_cb and tu_cbf_cr flags, then tu_cbf_luma can be derived from cu_cbf flag according to following rule. If cu_cbf flag if it is set to 1 and two chroma flags of the current TU are set to 0, then tu_cbf_luma is set equal to 1 and not signaled. Otherwise signaling of tu_cbf_luma is performed in normal way.

In a third embodiment, if transform unit is split by sub-transform units to satisfy maximal transform unit size restriction then luma cbf flag for the last sub-transform unit in transform unit, is derived according to following condition. If cu_cbf flag is 1 and all of tu_cbf_luma, tu_cbf_cb and tu_cbf_cr are 0 for all previously coded sub-transform units in the current transform unit, and tu_cbf_cb and tu_cbf_cr of the current sub-transform unit are 0 then tu_cbf_luma is set equal to 1 and not signaled. Otherwise signaling of tu_cbf_luma is performed in normal way.

The embodiments of the present disclosure allow improving coding efficiency and proposed unified mechanism of cbf flags signaling. Thus a unified mechanism of cbf flags signaling is proposed.

The relationships between cbf flags and sub-transform unit partitioning tools allow removing redundancy in the bitstream.

In other words, embodiments of the present disclosure propose a modification of VVC 4 specification and VTM flags signaling between them. A first aspect proposes to remove hierarchical chroma CBF signaling based on Transform Unit depth from the VTM SW, which is not presented in the specification; and include to the specification missing luma cbf flag deriving methods for normal TU and SBT TU based on chroma CBF flags, which is presented in the SW. A second aspect is proposed on top of the first and assumes a unified design of all existing luma cbf flag deriving methods.

There are four possibilities of TU representing in VVC 4:

1. Normal TU equals to CU size (no split);
2. SBT TUs partitioning;
3. ISP TUs partitioning;
4. TUs partitioning caused by maximal transform size restriction.

Following tables demonstrates these possibilities.

TABLE 1

| VVC 4 transform tree syntax table | |
|---|---|
| | Descriptor |
| transform_tree(x0, y0, tbWidth, tbHeight, treeType) {<br>  InferTuCbfLuma = 1<br>  if( IntraSubPartSplitType = = NO_ISP_SPLIT ) {<br>    if( tbWidth > MaxTbSizeY \|\| tbHeight > MaxTbSizeY ) {<br>      trafoWidth = ( tbWidth > MaxTbSizeY ) ? (tbWidth / 2) : tbWidth<br>      trafoHeight = ( tbHeight > MaxTbSizeY ) ? (tbHeight / 2) : tbHeight<br>      transform_tree( x0, y0, trafoWidth, trafoHeight )<br>      if( tbWidth > MaxTbSizeY )<br>        transform_tree( x0 + trafoWidth, y0, trafoWidth, trafoHeight, treeType)<br>      if( tbHeight > MaxTbSizeY )<br>        transform_tree( x0, y0 + trafoHeight, trafoWidth, trafoHeight, treeType)<br>      if( tbWidth > MaxTbSizeY && tbHeight > MaxTbSizeY )<br>        transform_tree( x0 + trafoWidth, y0 + trafoHeight, trafoWidth, trafoHeight, treeType)<br>    } else {<br>      transform_unit( x0, y0, tbWidth, tbHeight, treeType, 0)<br>    }<br>  } else if( cu_sbt_flag) {<br>    if( !cu_sbt_horizontal_flag) {<br>      trafoWidth = tbWidth * SbtNumFourthsTb0 / 4<br>      transform unit( x0, y0, trafoWidth, tbHeight, treeType , 0 )<br>      transform unit( x0 + trafoWidth, y0, tbWidth − trafoWidth, tbHeight, treeType , 1 )<br>    } else {<br>      trafoHeight = tbHeight * SbtNumFourthsTb0 / 4<br>      transform unit( x0, y0, tbWidth, trafoHeight, treeType , 0 )<br>      transform unit( x0, y0 + trafoHeight, tbWidth, tbHeight − trafoHeight, treeType , 1 )<br>    }<br>  } else if( IntraSubPartitionsSplitType = = ISP_HOR_SPLIT ) {<br>    trafoHeight = tbHeight / NumIntraSubPartitions<br>    for( partIdx = 0; partIdx < NumIntraSubPartitions; partIdx++ )<br>      transform unit( x0, y0 + trafoHeight * partIdx, tbWidth, trafoHeight, treeType, partIdx )<br>  }else if( IntraSubPartitionsSplitType = = ISP_VER_SPLIT ) {<br>    trafoWidth = tbWidth / NumIntraSubPartitions<br>    for( partIdx = 0; partIdx < NumIntraSubPartitions; partIdx++ )<br>      transform unit( x0 + trafoWidth * partIdx, y0, trafoWidth, tbHeight, treeType, partIdx )<br>  }<br>} | |

4.0.1 SW aimed to remove inconsistency in part of CBF

TABLE 2

| VVC 4 transform unit syntax table | |
|---|---|
| | Descriptor |
| transform_unit( x0, y0, tbWidth, tbHeight, treeType, subTuIndex ) {<br>  if( treeType = = SINGLE_TREE \|\| treeType = = DUAL_TREE_LUMA ) {<br>    if( ( IntraSubPartitionsSplitType = = ISP_NO_SPLIT && !( cu_sbt_flag &&<br>      ( ( subTuIndex = = 0 && !cu_sbt_pos_flag ) \|\| | |

TABLE 2-continued

VVC 4 transform unit syntax table

| | Descriptor |
|---|---|
| ( subTuIndex = = 1 && !cu sbt_pos_flag ) ) ) ) \|\|<br>( IntraSubPartitionsSplitType != ISP_NO_SPLIT &&<br>( subTuIndex < NumIntraSubPartitions − 1 \| \| !InferTuCbfLuma ) ) )<br>    tu_cbf_luma[ x0 ][ y0 ] | ae(v) |
|   if (IntraSubPartitionsSplitType != ISP_NO_SPLIT )<br>    InferTuCbfLuma = InferTuCbfLuma && !tu_cbf_luma[ x0 ][ y0 ]<br>}<br>if( ( treeType = = SINGLE_TREE \| \| treeType = = DUAL_TREE_CHROMA ) {<br>  if( ( IntraSubPartitionsSplitType = = ISP_NO_SPLIT && !( cu_sbt_flag &&<br>    ( ( subTuIndex = = 0 && cu_sbt_pos_flag ) \|\|<br>      ( subTuIndex = = 1 && !cu_sbt_pos_flag ) ) ) ) \|\|<br>    ( IntraSubPartitionsSplitType != ISP_NO_SPLIT &&<br>    ( subTuIndex = = NumIntraSubPartitions − 1 ) ) ) { | |
|     tu_cbf_cb[ x0 ][ y0 ] | ae(v) |
|     tu_cbf_cr[ x0 ][ y0 ] | ae(v) |
|   }<br>}<br>...<br>} | |

It can be noted that according to Table 1 and Table 2, both luma and chroma CBFs signaling is performed independently from each other's and there is no hierarchical dependencies for chroma CBF flags.

From the SW perspective, VTM4.0.1 includes both of abovementioned aspects.

The hierarchical chroma CBFs signaling method was tested in VTM4.0.1 and demonstrates negligible impact to coding efficiency. On the other hand, support of this feature requires additional non-trivial logic in both SW and specification.

In one embodiment, it is proposed to remove from the SW hierarchical chroma CBFs signaling method and include to the spec luma CBF deriving.

Following table demonstrates modified syntax table.

TABLE 3

Proposed transform unit syntax table (embodiment 1)

| | Descriptor |
|---|---|
| transform_unit( x0, y0, tbWidth, tbHeight, treeType, subTuIndex ) {<br>  if( ( treeType = = SINGLE_TREE \| \| treeType = = DUAL_TREE_CHROMA ) {<br>    if( ( IntraSubPartitionsSplitType = = ISP_NO_SPLIT && !( cu_sbt_flag &&<br>      ( ( subTuIndex = = 0 && cu_sbt_pos_flag ) \|\|<br>        ( subTuIndex = = 1 && !cu_sbt_pos_flag ) ) ) ) \|\|<br>      ( IntraSubPartitionsSplitType != ISP_NO_SPLIT &&<br>      ( subTuIndex = = NumIntraSubPartitions − 1 ) ) ) { | |
|     tu_cbf_cb[ x0 ][ y0 ] | ae(v) |
|     tu_cbf_cr[ x0 ][ y0 ] | ae(v) |
|   }<br>}<br>if( treeType = = SINGLE_TREE \| \| treeType = = DUAL_TREE_LUMA ) {<br>  if( ( IntraSubPartitionsSplitType = = ISP_NO_SPLIT && !( cu_sbt_flag &&<br>    ( ( subTuIndex = = 0 && cu_sbt_pos_flag ) \|\|<br>      ( subTuIndex = = 1 && !cu_sbt_pos_flag ) ) ) &&<br>      (CuPredModeF[ x0 ][ y0 ] != MODE_INTRA \| \| tu_cbf_cb[ x0 ][ y0 ] \| \|<br>tu_cbf_cr[ x0 ][ y0 ] ) )<br>    \| \|( (IntraSubPartitionsSplitType != ISP_NO_SPLIT) &&<br>    ( subTuIndex < NumIntraSubPartitions − 1 \| \| !InferTuCbfLuma ) ) ) | |
|     tu_cbf_luma[ x0 ][ y0 ] | ae(v) |
| ...<br>} | | existing mechanism of last luma cbf deriving for ISP. The table below demonstrates proposed modification.

In another embodiment it is proposed to apply similar method of luma cbf deriving for TUs, divided in order to satisfy maximal TU restriction. This unification can share

TABLE 4

Proposed transform unit syntax table (embodiment 2)

|  | Descriptor |
|---|---|
| transform_unit( x0, y0, tbWidth, tbHeight, treeType, subTuIndex ) { | |
|   if( ( treeType = = SINGLE_TREE \|\| treeType = = DUAL_TREE_CHROMA ) { | |
|     if( ( IntraSubPartitionsSplitType = = ISP_NO_SPLIT && !( cu_sbt_flag && | |
|         ( ( subTuIndex = = 0 && cu_sbt_pos_flag ) \|\| | |
|           ( subTuIndex = = 1 && !cu_sbt_pos_flag ) ) ) ) \|\| | |
|       ( IntraSubPartitionsSplitType != ISP_NO_SPLIT && | |
|         ( subTuIndex = = NumIntraSubPartitions − 1 ) ) ) { | |
|       tu_cbf_cb[ x0 ][ y0 ] | ae(v) |
|       tu_cbf_cr[ x0 ][ y0 ] | ae(v) |
|     } | |
|   } | |
|   if( treeType = = SINGLE_TREE \|\| treeType = = DUAL_TREE_LUMA ) { | |
|     if( ( IntraSubPartitionsSplitType = = ISP_NO_SPLIT && !( cu_sbt_flag && | |
|         ( ( subTuIndex = = 0 && cu_sbt_pos_flag ) \|\| | |
|           ( subTuIndex = = 1 && !cu_sbt_pos_flag ) ) ) && | |
|         (CuPredMode [ x0 ][ y0 ] != MODE_INTRA \|\| tu_cbf_cb[x0 ][y0 ] \|\| | |
| tu_cbf_cr[ x0 ][ y0 ] ) ) | |
|      \|( (IntraSubPartitionsSplitType != ISP_NO_SPLIT \|\| (CbWidth[ x0 ][ y0 ] > MaxTbSizeY | |
| \|\| CbHeight[ x0 ][ y0 ]>MaxTbSizeY )) && | |
|       ( subTuIndex < NumIntraSubPartitions − 1 \|\| !InferTuCbfLuma ) ) ) | |
|       tu_cbf_luma[ x0 ][ y0 ] | ae(v) |
|     if (CuPredMode[ x0 ][ y0 ] = = MODE_INTRA) | |
|       if (IntraSubPartitionsSplitType != ISP_NO_SPLIT) | |
|         InferTuCbfLuma = InferTuCbfLuma && !tu_cbf_luma[ x0 ][ y0 ] | |
|       else | |
|         InferTuCbfLuma = 0 | |
|     else | |
|       InferTuCbfLuma = InferTuCbfLuma && !tu_cbf_luma[ x0 ][ y0 ] && | |
| !tu_cbf_cb[ x0 ][ y0 ] && !tu_cbf_cr[ x0 ][ y0 ] | |
| ... | |
| } | |

The embodiments of the disclosure allow improving coding efficiency, simplifying specification and proposed unified mechanism of cbf flags signaling. Thus a unified mechanism of cbf flags signaling is proposed.

The relationships between cbf flags and sub-transform unit partitioning tools allow removing redundancy in the bitstream.

In even other words, there are four possibilities of TU representing in VVC 4:

1. Normal TU equals to CU size (no split);
2. SBT TUs partitioning;
3. ISP TUs partitioning;
4. TUs partitioning caused by maximal transform size restriction.

Following tables demonstrate these possibilities.

TABLE 1

VVC 4 transform tree syntax table

|  | Descriptor |
|---|---|
| transform_tree( x0, y0, tbWidth, tbHeight , treeType) { | |
|   InferTuCbfLuma = 1 | |
|   if( IntraSubPartSplitType = = NO_ISP_SPLIT) { | |
|     if( tbWidth > MaxTbSizeY \|\| tbHeight > MaxTbSizeY ) { | |
|       trafoWidth = ( tbWidth > MaxTbSizeY ) ? (tbWidth / 2) : tbWidth | |
|       trafoHeight = ( tbHeight > MaxTbSizeY ) ? (tbHeight / 2) : tbHeight | |
|       transform tree( x0, y0, trafoWidth, trafoHeight) | |
|       if( tbWidth > MaxTbSizeY ) | |
|         transform tree( x0 + trafoWidth, y0, trafoWidth, trafoHeight, treeType ) | |
|       if( tbHeight > MaxTbSizeY ) | |
|         transform tree( x0, y0 + trafoHeight, trafoWidth, trafoHeight, treeType ) | |
|       if( tbWidth > MaxTbSizeY && tbHeight > MaxTbSizeY ) | |
|         transform_tree( x0 + trafoWidth, y0 + trafoHeight, trafoWidth, trafoHeight, treeType ) | |
|     } else { | |
|       transform_unit( x0, y0, tbWidth, tbHeight, treeType, 0) | |
|     } | |
|   } else if( cu_sbt_flag) { | |
|     if( !cu_sbt_horizontal flag) { | |
|       trafoWidth = tbWidth * SbtNumFourthsTb0 / 4 | |
|       transform_unit( x0, y0, trafoWidth, tbHeight, treeType , 0) | |
|       transform_unit( x0 + trafoWidth, y0, tbWidth − trafoWidth, tbHeight, treeType, 1 ) | |
|     } else { | |

TABLE 1-continued

VVC 4 transform tree syntax table

| | Descriptor |
|---|---|
| <pre>      trafoHeight = tbHeight * SbtNumFourthsTb0 / 4
      transform_unit( x0, y0, tbWidth, trafoHeight, treeType , 0)
      transform_unit( x0, y0 +trafoHeight, tbWidth, tbHeight − trafoHeight, treeType, 1 )
    }
  } else if( IntraSubPartitionsSplitType = = ISP_HOR_SPLIT) {
    trafoHeight = tbHeight / NumIntraSubPartitions
    for( partIdx = 0; partIdx < NumIntraSubPartitions; partIdx++ )
      transform_unit( x0, y0 + trafoHeight * partIdx, tbWidth, trafoHeight, treeType, partIdx )
  } else if( IntraSubPartitionsSplitType = = ISP_VER_SPLIT) {
    trafoWidth = tbWidth / NumIntraSubPartitions
    for( partIdx = 0; partIdx < NumIntraSubPartitions; partIdx++ )
      transform_unit( x0 + trafoWidth * partIdx, y0, trafoWidth, tbHeight, treeType, partIdx )
  }
}</pre> | |

TABLE 2

VVC 4 transform unit syntax table

| | Descriptor |
|---|---|
| <pre>transform_unit( x0, y0, tbWidth, tbHeight, treeType, subTuIndex ) {
  if( treeType = = SINGLE_TREE | | treeType = = DUAL_TREE_LUMA ) {
    if( ( IntraSubPartitionsSplitType = = ISP_NO_SPLIT && !( cu_sbt_flag &&
        ( ( subTuIndex = = 0 && cu_sbt_pos_flag ) | |
          ( subTuIndex = = 1 && !cu_sbt_pos_flag ) ) ) ) | |
      ( IntraSubPartitionsSplitType != ISP_NO_SPLIT &&
        ( subTuIndex < NumIntraSubPartitions − 1 | | !InferTuCbfLuma ) ) )
      tu_cbf_luma[ x0 ][ y0 ]</pre> | ae(v) |
| <pre>    if (IntraSubPartitionsSplitType != ISP_NO_SPLIT)
      InferTuCbfLuma = InferTuCbfLuma && !tu_cbf_luma[ x0 ][ y0 ]
  }
  if( ( treeType = = SINGLE_TREE | | treeType = = DUAL_TREE_CHROMA ) {
    if( ( IntraSubPartitionsSplitType = = ISP_NO_SPLIT && !( cu_sbt_flag &&
        ( ( subTuIndex = = 0 && cu_sbt_pos flag ) | |
          ( subTuIndex = = 1 && !cu_sbt_pos flag ) ) ) ) | |
      ( IntraSubPartitionsSplitType != ISP_NO_SPLIT &&
        ( subTuIndex = = NumIntraSubPartitions − 1 ) ) ) {
      tu_cbf_cb[ x0 ][ y0 ]</pre> | ae(v) |
| <pre>      tu_cbf_cr[ x0 ][ y0 ]</pre> | ae(v) |
| <pre>    }
  }
...
}</pre> | |

It can be noted that according to Table 1 and Table 2, both luma and chroma CBFs signaling is performed independently from each other's and there is no hierarchical dependencies for chroma CBF flags.

From the SW perspective, VTM4.0.1 includes both of abovementioned aspects.

The hierarchical chroma CBFs signaling method was tested in VTM4.0.1 and demonstrates negligible impact to coding efficiency. On the other hand, support of this feature requires additional non-trivial logic in both SW and specification.

In one embodiment, it is proposed to remove from the SW hierarchical chroma CBFs signaling method and include to the spec luma CBF deriving.

Following table demonstrates modified syntax table.

TABLE 3

Proposed transform unit syntax table (1st embodiment)

| | Descriptor |
|---|---|
| <pre>transform_unit( x0, y0, tbWidth, tbHeight, treeType, subTuIndex ) {
  if( ( treeType = = SINGLE_TREE | | treeType = = DUAL_TREE_CHROMA ) {
    if( ( IntraSubPartitionsSplitType = = ISP_NO_SPLIT && !( cu_sbt_flag &&
        ( ( subTuIndex = = 0 && cu_sbt_pos flag ) | |
          ( subTuIndex = = 1 && !cu_sbt_pos flag ) ) ) ) | |
      ( IntraSubPartitionsSplitType != ISP_NO_SPLIT &&
        ( subTuIndex = = NumIntraSubPartitions − 1 ) ) ) {
      tu_cbf_cb[ x0 ][ y0 ]</pre> | ae(v) |

TABLE 3-continued

Proposed transform unit syntax table (1st embodiment)

|  | Descriptor |
|---|---|
| ```
        tu_cbf_cr[ x0 ][ y0 ]
      }
    }
    if( treeType = = SINGLE_TREE | | treeType = = DUAL_TREE_LUMA ) {
      if( ( IntraSubPartitionsSplitType = = ISP_NO_SPLIT && !( cu_sbt_flag &&
           ( ( subTuIndex = = 0 && cu_sbt_pos flag ) | |
             ( subTuIndex = = 1 && !cu_sbt_pos flag ) ) ) &&
           ( ( CuPredMode[ x0 ][ y0 ] = = MODE_INTRA | | tu_cbf_cb[ x0 ][ y0 ] |
|
tu_cbf_cr[ x0 ][ y0 ] ) | | (CbWidth[ x0 ][ y0 ] > MaxTbSizeY | | CbHeight[ x0 ][ y0 ] >
MaxTbSizeY )) )
      | |( (IntraSubPartitionsSplitType != ISP_NO_SPLIT) &&
         ( subTuIndex < NumIntraSubPartitions − 1 | | !InferTuCbfLuma ) ) )
      tu_cbf_luma[ x0 ][ y0 ]
    ...
}
``` | ae(v) |

In this embodiment tu_cbf_luma[x0][y0] flag derivation method performs 1) for normal case when TU equals to CU and for 2) SBT case for sub-TU that contains CBF flag. Derivation process performs based on block type (CuPredMode[x0][y0]) and on values of Cb and Cr CBF flags (tu_cbf_cb[x0][y0] and tu_cbf_cr[x0][y0]) which are already transmitted in the bitstream before tu_cbf_luma[x0][y0]. It should be noted, that the derivation technique is not applied to TUs that are divided into sub-TUs in order to satisfy maximal transform unit size restriction.

The embodiments of the disclosure allow improving coding efficiency, simplifying specification and proposed unified mechanism of cbf flags signaling.

The relationships between cbf flags and sub-transform unit partitioning tools allow removing redundancy in the bitstream.

In yet another embodiment, related to the embodiment described before it is proposed to remove from the SW hierarchical chroma CBFs signaling method and include to the spec luma CBF deriving.

The following table demonstrates a modified syntax table for the transform unit syntax, i.e. the transform unit syntax is signaled according to following table:

Transform unit syntax table:

|  | Descriptor |
|---|---|
| ```
transform_unit( x0, y0, tbWidth, tbHeight, treeType, subTuIndex ) {
  if( ( treeType = = SINGLE_TREE | | treeType = = DUAL_TREE_CHROMA ) {
    if( ( IntraSubPartitionsSplitType = = ISP_NO_SPLIT && !( cu_sbt_flag &&
         ( ( subTuIndex = = 0 && cu_sbt_pos_flag ) | |
           ( subTuIndex = = 1 && !cu_sbt_pos_flag ) ) ) ) | |
       ( IntraSubPartitionsSplitType != ISP_NO_SPLIT &&
         ( subTuIndex = = NumIntraSubPartitions − 1 ) ) ) {
      tu_cbf_cb[ x0 ][ y0 ]
      tu_cbf_cr[ x0 ][ y0 ]
    }
  }
  if( treeType = = SINGLE_TREE | | treeType = = DUAL_TREE_LUMA ) {
    if( ( IntraSubPartitionsSplitType = = ISP_NO_SPLIT && !( cu_sbt_flag &&
         ( ( subTuIndex = = 0 && cu_sbt_pos flag ) | |
           ( subTuIndex = = 1 && !cu_sbt_pos flag ) ) ) &&
         ((CuPredMode[ x0 ][ y0 ] = = MODE_INTRA | | tu_cbf_cb[ x0 ][ y0 ]
| |
tu_cbf_cr[ x0 ][ y0 ] ) | | (CbWidth [ x0 ][ y0 ] > MaxTbSizeY | | CbHeight[ x0 ][ y0 ]
>
MaxTbSizeY )) )
    | |( (IntraSubPartitionsSplitType != ISP_NO_SPLIT) &&
       ( subTuIndex < NumIntraSubPartitions − 1 | | !InferTuCbfLuma ) ) )
    tu_cbf_luma[ x0 ][ y0 ]
  ...
}
``` | ae(v)<br>ae(v)<br><br><br><br><br><br><br><br><br><br><br>ae(v) |

In this embodiment a tu_cbf_luma[x0][y0] flag derivation method performs 1) for normal case when TU equals to CU and for 2) SBT case for sub-TU that contains CBF flag. Derivation process performs based on block type (CuPredMode[x0][y0]) and on values of Cb and Cr CBF flags (tu_cbf_cb[x0][y0] and tu_cbf_cr[x0][y0]) which are already transmitted in the bitstream before tu_cbf_luma[x0][y0]. It should be noted, that the derivation technique is not applied to TUs that are divided into sub-TUs in order to satisfy maximal transform unit size restriction.

This embodiment, like the other embodiments, of the disclosure allows improving coding efficiency, simplifying specification and proposed unified mechanism of cbf flags signaling.

Also for this embodiment, the relationships between cbf flags and sub-transform unit partitioning tools allow removing redundancy in the bitstream.

Figure 6:
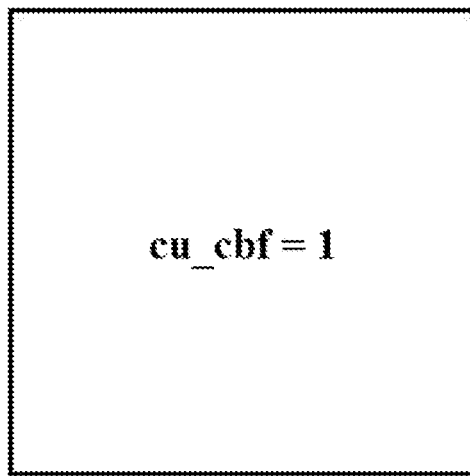
FIG. 6 is a block diagram illustrating an embodiment of the method of signaling of cbf flags.
Figure 6:
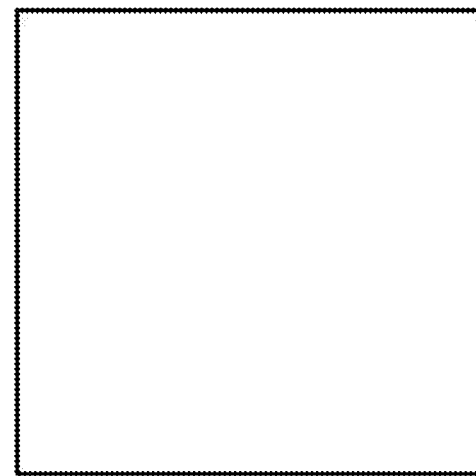
Figure 6:
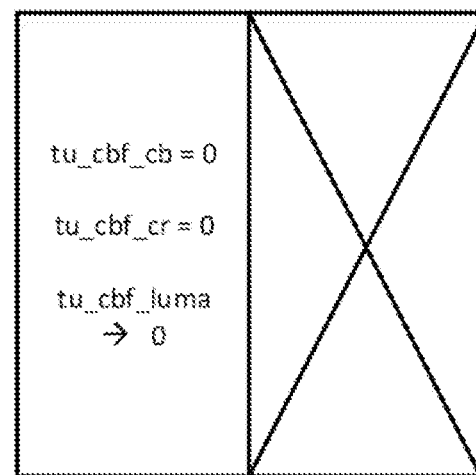

FIG. 6 is a block diagram illustrating an embodiment of the method of signaling of cbf flags. FIG. 6 illustrates a case where a normal TU equals to CU size, and the TU is split by SBT partitioning in vertical direction on to two SubTUs: SubTU 0 and SubTU 1, where according to SBT design only one SubTu may have non-zero tu_cbf_cb, tu_cbf_cr, tu_cbf_luma flags. In the example given in FIG. 6, SubTU 0 may have non-zero tu_cbf_cb, tu_cbf_cr, tu_cbf_luma flags. Assuming that the whole coding unit has cu_cbf flag equal to 1 and both tu_cbf_cb, tu_cbf_cr of SubTU 0 are signaled and are equal to 0, the value of tu_cbf_luma can be derived to 1 without explicit signaling.

Figure 10:
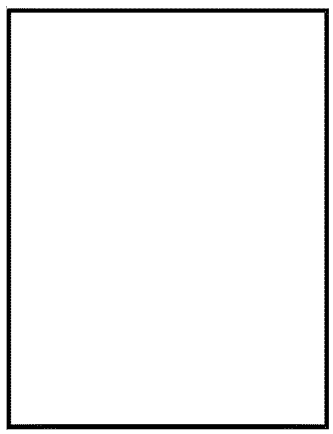
FIG. 10 illustrates a block diagram similar to that of FIG. 6 according to an embodiment.
Figure 10:
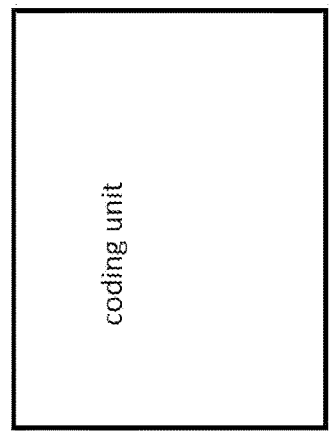
Figure 10:
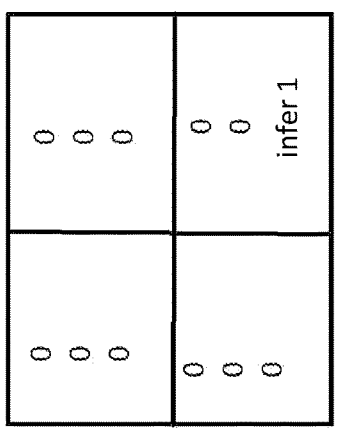
Figure 10:
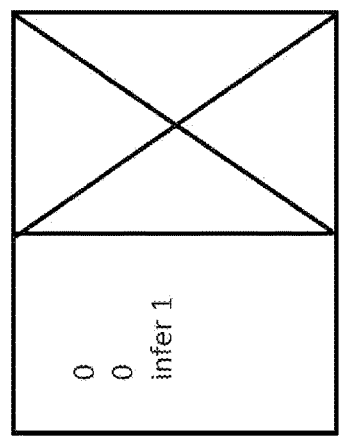

This is also further illustrated in FIG. 10, which shows a case for TU equals CU and no split, and a case with a pipeline split.

Figure 7:
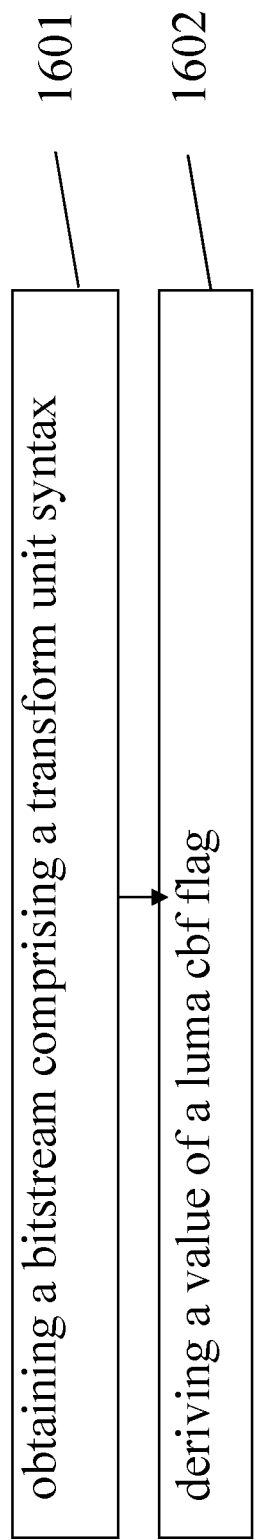
FIG. 7 illustrates a flowchart of a method of coding implemented by a decoding device or encoding device according to an embodiment of the present disclosure.

FIG. 7 illustrates a flowchart of the operations of a method of video coding implemented by a decoding device or encoding device according to the present disclosure. In FIG. 7, the method comprises operation 1601, which defines obtaining a bitstream, the bitstream comprising a transform unit syntax. For operation 1601, the transform unit syntax comprises at least two chroma cbf flags (chroma coded block flags), for chroma blocks corresponding to a current transform unit or a current sub-transform unit within the current transform unit, wherein a chroma cbf flag of the at least two chroma cbf flags specifies whether a certain block has residue in a correspondent color plane. FIG. 7 further illustrates operation 1602 of deriving a value of a luma cbf flag. Deriving a luma cbf flag in operation 1602 is based on: a value of a coding unit cbf flag, cu_cbf flag; and one or any combination of values of the at least two chroma cbf flags; and/or location of the current sub-transform unit within the current transform unit; and/or values of luma and chroma cbf flags correspondent to sub-transform units in the current transform unit that previous to the current sub-transform unit. In the present disclosure, a block has a residue means that the block includes at least one transform coefficients with a value not equal to 0.

Figure 8:
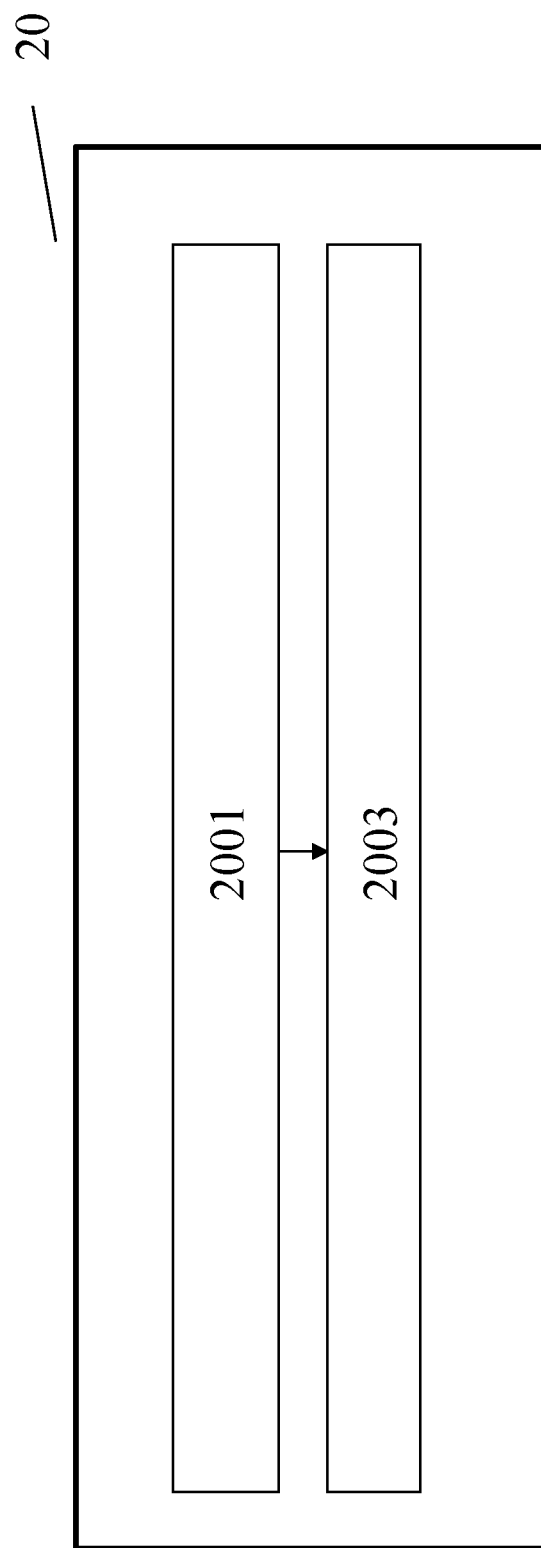
FIG. 8 illustrates schematically an example of an encoder according to an embodiment of the present disclosure.

FIG. 8 illustrates an encoder 20 according to the present disclosure. In FIG. 8, the encoder 20 comprises an obtaining unit 2001, configured to obtain a bitstream, the bitstream comprising a transform unit syntax; the obtaining unit 2001 configured to obtain according to the transform unit syntax, values of at least two chroma cbf flags (chroma coded block flags) for chroma blocks corresponding to a current transform unit or a current sub-transform unit within the current transform unit, wherein a chroma cbf flag of the at least two chroma cbf flags specifies whether a correspondent block has a residue in a correspondent color plane; and a deriving unit 2003, configured to derive a value of a luma cbf flag at least based on:

a value of a coding unit cbf flag, cu_cbf flag, and the values of the at least two chroma cbf flags. It should be understood that more than one obtaining unit may be used.

Figure 9:
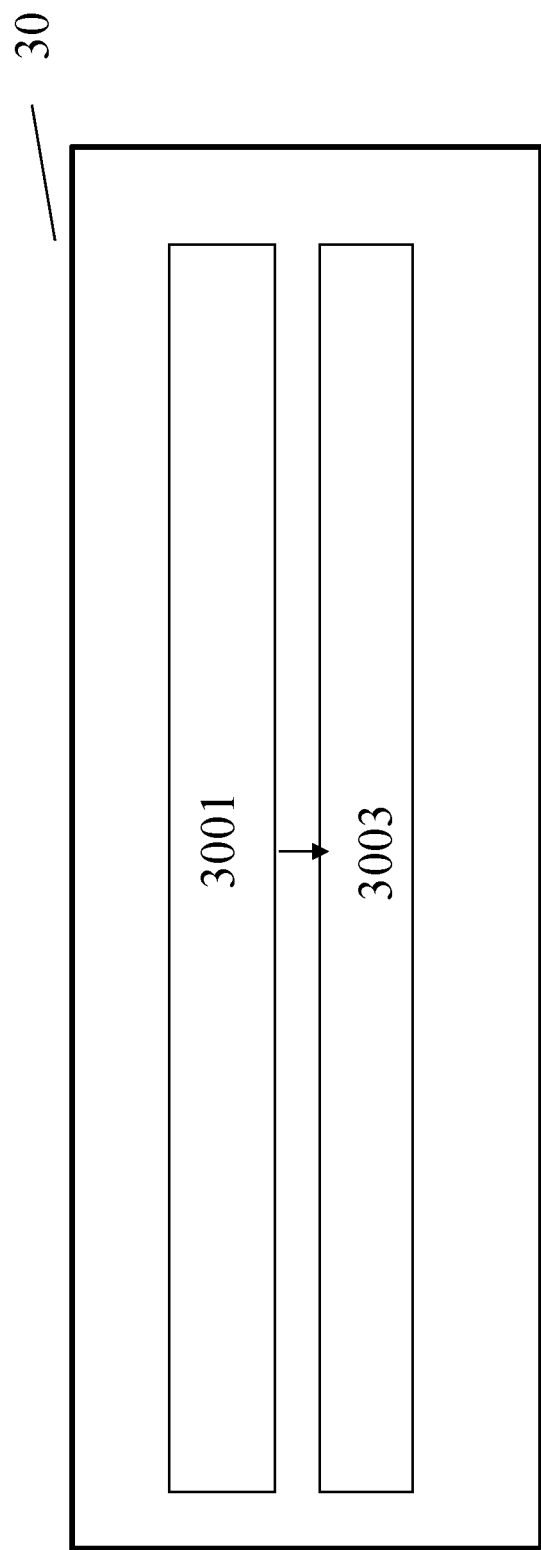
FIG. 9 illustrates schematically an example of a decoder according to an embodiment of the present disclosure.

FIG. 9 illustrates a decoder 30 according to the present disclosure. In FIG. 9, the decoder 30 comprises an obtaining unit 3001, configured to obtain a bitstream, the bitstream comprising a transform unit syntax; the obtaining unit 3001 configured to obtain according to the transform unit syntax, values of at least two chroma cbf flags (chroma coded block flags) for chroma blocks corresponding to a current transform unit or a current sub-transform unit within the current transform unit, wherein a chroma cbf flag of the at least two chroma cbf flags specifies whether a correspondent block has a residue in a correspondent color plane;

a deriving unit 3003, configured to derive a value of a luma cbf flag at least based on:

a value of a coding unit cbf flag, cu_cbf flag, and the values of the at least two chroma cbf flags. It should be understood that more than one obtaining unit may be used.

Mathematical Operators

The mathematical operators used in this application are similar to those used in the C programming language. However, the results of integer division and arithmetic shift operations are defined more precisely, and additional operations are defined, such as exponentiation and real-valued division. Numbering and counting conventions generally begin from 0, e.g., "the first" is equivalent to the 0-th, "the second" is equivalent to the 1-th, etc.

Arithmetic Operators

The following arithmetic operators are defined as follows:

+ Addition
− Subtraction (as a two-argument operator) or negation (as a unary prefix operator)
* Multiplication, including matrix multiplication
$x^y$ Exponentiation. Specifies x to the power of y. In other contexts, such notation is used for superscripting not intended for interpretation as exponentiation.
/ Integer division with truncation of the result toward zero. For example, 7/4 and −7/−4 are truncated to 1 and −7/4 and 7/−4 are truncated to −1.
÷ Used to denote division in mathematical equations where no truncation or rounding is intended.

$$\frac{x}{y}$$

Used to denote division in mathematical equations where no truncation or rounding is intended.

$$\sum_{i=x}^{y} f(i)$$

The summation of f(i) with i taking all integer values from x up to and including y.

Modulus. Remainder of x divided by y, defined only for integers x and y with x>=0 x % y and y>0.

Logical Operators

The following logical operators are defined as follows:
x && y Boolean logical "and" of x and y
x||y Boolean logical "or" of x and y
! Boolean logical "not"
x?y:z If x is TRUE or not equal to 0, evaluates to the value of y; otherwise, evaluates to the value of z.

Relational Operators

The following relational operators are defined as follows:
> Greater than
>= Greater than or equal to
< Less than
<= Less than or equal to
== Equal to
!= Not equal to When a relational operator is applied to a syntax element or variable that has been assigned the value "na" (not applicable), the value "na" is treated as a distinct value for the syntax element or variable. The value "na" is considered not to be equal to any other value.

Bit-Wise Operators

The following bit-wise operators are defined as follows:

& Bit-wise "and". When operating on integer arguments, operates on a two's complement representation of the integer value. When operating on a binary argument that contains fewer bits than another argument, the shorter argument is extended by adding more significant bits equal to 0.

| Bit-wise "or". When operating on integer arguments, operates on a two's complement representation of the integer value. When operating on a binary argument that contains fewer bits than another argument, the shorter argument is extended by adding more significant bits equal to 0.

^ A Bit-wise "exclusive or". When operating on integer arguments, operates on a two's complement representation of the integer value. When operating on a binary argument that contains fewer bits than another argument, the shorter argument is extended by adding more significant bits equal to 0.

x>>y Arithmetic right shift of a two's complement integer representation of x by y binary digits. This function is defined only for non-negative integer values of y. Bits shifted into the most significant bits (MSBs) as a result of the right shift have a value equal to the MSB of x prior to the shift operation.

x<<y Arithmetic left shift of a two's complement integer representation of x by y binary digits. This function is defined only for non-negative integer values of y. Bits shifted into the least significant bits (LSBs) as a result of the left shift have a value equal to 0.

Assignment Operators

The following arithmetic operators are defined as follows:

= Assignment operator

++ Increment, i.e., x++ is equivalent to x=x+1; when used in an array index, evaluates to the value of the variable prior to the increment operation.

-- Decrement, i.e., x-- is equivalent to x=x-1; when used in an array index, evaluates to the value of the variable prior to the decrement operation.

+= Increment by amount specified, i.e., x+=3 is equivalent to x=x+3, and x+=(-3) is equivalent to x=x+(-3).

-= Decrement by amount specified, i.e., x-=3 is equivalent to x=x-3, and x-=(-3) is equivalent to x=x-(-3).

Range Notation

The following notation is used to specify a range of values:

x=y..z x takes on integer values starting from y to z, inclusive, with x, y, and z being integer numbers and z being greater than y.

Mathematical Functions

The following mathematical functions are defined:

$$Abs(x) = \begin{cases} x & ; \quad x >= 0 \\ -x & ; \quad x < 0 \end{cases}$$

Asin(x) the trigonometric inverse sine function, operating on an argument x that is in the range of −1.0 to 1.0, inclusive, with an output value in the range of −π÷2 to π÷2, inclusive, in units of radians Atan(x) the trigonometric inverse tangent function, operating on an argument x, with an output value in the range of −π÷2 to π÷2, inclusive, in units of radians $$Atan2(y, x) = \begin{cases} Atan\left(\frac{y}{x}\right) & ; \quad x > 0 \\ Atan\left(\frac{y}{x}\right) + \pi & ; \quad x < 0 \: \&\& \: y >= 0 \\ Atan\left(\frac{y}{x}\right) - \pi & ; \quad x < 0 \: \&\& \: y < 0 \\ +\frac{\pi}{2} & ; \quad x == 0 \: \&\& \: y >= 0 \\ -\frac{\pi}{2} & ; \quad otherwise \end{cases}$$

Ceil(x) the smallest integer greater than or equal to x.

Clip $1_Y(x)$ = Clip 3(0, (1<< $BitDepth_Y$) − 1, x)

Clip $1_C(x)$ = Clip 3(0, (1<< $BitDepth_C$) − 1, x)

$$Clip\ 3(x, y, z) = \begin{cases} x & ; \quad z < x \\ y & ; \quad z > y \\ z & ; \quad otherwise \end{cases}$$

Cos(x) the trigonometric cosine function operating on an argument x in units of radians Floor(x) the largest integer less than or equal to x.

$$GetCurrMsb(a, b, c, d) = \begin{cases} c + d & ; \quad b - a >= d/2 \\ c - d & ; \quad a - b > d/2 \\ c & ; \quad otherwise \end{cases}$$

Ln(x) the natural logarithm of x (the base-e logarithm, where e is the natural logarithm base constant 2.718 281 828 . . . ).

Log 2(x) the base-2 logarithm of x.

Log 10(x) the base-10 logarithm of x.

$$Min(x, y) = \begin{cases} x & ; \quad x <= y \\ y & ; \quad x > y \end{cases}$$

$$Max(x, y) = \begin{cases} x & ; \quad x >= y \\ y & ; \quad x < y \end{cases}$$

Round(x)=Sign(x)*Floor(Abs(x)+0.5)

$$Sign(x) = \begin{cases} 1 & ; \quad x > 0 \\ 0 & ; \quad x == 0 \\ -1 & ; \quad x < 0 \end{cases}$$

Sin(x) the trigonometric sine function operating on an argument x in units of radians Sqrt(x)=√x Swap(x,y)=(y,x)

Tan(x) the trigonometric tangent function operating on an argument x in units of radians Order of Operation Precedence When an order of precedence in an expression is not indicated explicitly by use of parentheses, the following rules apply:

Operations of a higher precedence are evaluated before any operation of a lower precedence.

Operations of the same precedence are evaluated sequentially from left to right.

The table below specifies the precedence of operations from highest to lowest; a higher position in the table indicates a higher precedence.

For those operators that are also used in the C programming language, the order of precedence used in this Specification is the same as used in the C programming language.

TABLE

Operation precedence from highest (at top of table) to lowest (at bottom of table)
operations (with operands x, y, and z)

"x++", "x--"
"!x", "-x" (as a unary prefix operator)
$x^y$ $"x*y", "x/y", "x \div y", "\frac{x}{y}", "x \% y"$ "x + y", "x - y" (as a two-argument operator), $"\sum_{i=x}^{y} f(i)"$ "x << y", "x >> y"
"x < y", "x <= y", "x > y", "x >= y"
"x = = y", "x != y"
"x & y"
"x|y"
"x && y"
"x||y"
"x ? y : z"
"x . . . y"
"x = y", "x += y", "x -= y"

Text Description of Logical Operations

In the text, a statement of logical operations as would be described mathematically in the following form:
  if (condition 0)
    statement 0
  else if (condition 1)
    statement 1
  . . .
  else /* informative remark on remaining condition */
    statement n
may be described in the following manner:
  . . . as follows / . . . the following applies:
    If condition 0, statement 0
    Otherwise, if condition 1, statement 1
    . . .
    Otherwise (informative remark on remaining condition), statement n Each "If . . . Otherwise, if . . . Otherwise, . . . " statement in the text is introduced with " . . . as follows" or " . . . the following applies" immediately followed by "If . . . ". The last condition of the "If . . . Otherwise, if . . . Otherwise, . . . " is always an "Otherwise, . . . ". Interleaved "If . . . Otherwise, if . . . Otherwise, . . . " statements can be identified by matching " . . . as follows" or " . . . the following applies" with the ending "Otherwise, . . . ".

In the text, a statement of logical operations as would be described mathematically in the following form:
  if (condition 0a && condition 0b)
    statement 0
  else if (condition 1a||condition 1b)
    statement 1
  . . .
  else
    statement n
may be described in the following manner:
  . . . as follows / . . . the following applies:

If all of the following conditions are true, statement 0:
      condition 0a
      condition 0b
    Otherwise, if one or more of the following conditions are true, statement 1:
      condition 1a
      condition 1b
    . . .
    Otherwise, statement n In the text, a statement of logical operations as would be described mathematically in the following form:
  if (condition 0)
    statement 0
  if (condition 1)
    statement 1
may be described in the following manner:
  When condition 0, statement 0
  When condition 1, statement 1

Although embodiments of the disclosure have been primarily described based on video coding, it should be noted that embodiments of the coding system 10, encoder 20 and decoder 30 (and correspondingly the system 10) and the other embodiments described herein may also be configured for still picture processing or coding, i.e. the processing or coding of an individual picture independent of any preceding or consecutive picture as in video coding. In general only inter-prediction units 244 (encoder) and 344 (decoder) may not be available in case the picture processing coding is limited to a single picture 17. All other functionalities (also referred to as tools or technologies) of the video encoder 20 and video decoder 30 may equally be used for still picture processing, e.g. residual calculation 204/304, transform 206, quantization 208, inverse quantization 210/310, (inverse) transform 212/312, partitioning 262/362, intra-prediction 254/354, and/or loop filtering 220, 320, and entropy coding 270 and entropy decoding 304.

Embodiments, e.g. of the encoder 20 and the decoder 30, and functions described herein, e.g. with reference to the encoder 20 and the decoder 30, may be implemented in hardware, software, firmware, or any combination thereof. If implemented in software, the functions may be stored on a computer-readable medium or transmitted over communication media as one or more instructions or code and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media that is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limiting, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. In addition, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. In addition, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

The present disclosure discloses the following thirteen aspects.

A first aspect of a method of coding implemented by a decoding device or encoding device, the method comprising:

obtaining a bitstream, the bitstream comprises a transform unit syntax, (in an example, the transform unit syntax element can be either coded for a whole block or coded for multiple sub-transform units that are obtained by Sub-Block Transform for inter block (SBT), or in order to satisfy maximal transform unit size restrictions);

the syntax comprises at least two cbf flags for chroma blocks (in an example, transform unit syntax correspond to either transform unit or sub-transform units which include two chroma cbf flags: tu_cbf_cb and tu_cbf_cb—one flag for each chroma plane), a chroma cbf flag specifies whether certain block has residue in correspondent color plane;

deriving a value of a luma cbf flag tu_cbf_luma based on one or any combination of a value of a cu_cbf flag, values of two chroma cbf flags corresponding to a current transform unit or sub-transform unit, location of the sub-transform unit within transform unit, values of luma and chroma cbf flags correspondent to previous sub-transform units in the current transform unit.

A second aspect of the method of the first aspect, wherein the value of the luma cbf flag (for example, a tu_cbf_luma flag) is derived based on the value of the cu_cbf flag and values of the two chroma cbf flags corresponding to the current transform unit.

A third aspect of the method of the second aspect, when the current transform unit is not divided to sub-transform units, the value of the cu_cbf flag is 1, the value of tu_cbf_cb flag is 0 and the value of the tu_cbf_cr flag is 0, then the value of the tu_cbf_luma flag for the current transform unit is derived to 1.

A fourth aspect of the method of the third aspect, wherein a transform unit syntax table is signaled according to following table:

|  | Descriptor |
|---|---|
| transform_unit( x0, y0, tbWidth, tbHeight, treeType, subTuIndex ) { | |
|   if( ( treeType = = SINGLE_TREE \| \| treeType = = DUAL_TREE_CHROMA ) { | |
|     if( ( IntraSubPartitionsSplitType = = ISP_NO_SPLIT && ) \| \| ( IntraSubPartitionsSplitType != ISP_NO_SPLIT && ( subTuIndex = =   NumIntraSubPartitions − 1 ) ) ) | |
|     { | |
|       tu_cbf_cb[ x0 ][ y0 ] | ae(v) |
|       tu_cbf_cr[ x0 ][ y0 ] | ae(v) |
|     } | |
|   } | |
|   if( treeType = = SINGLE_TREE \| \| treeType = = DUAL_TREE_LUMA ) { | |
|     if( ( IntraSubPartitionsSplitType = = ISP_NO_SPLIT && (CuPredMode[ x0 ][ y0 ] != MODE_INTRA \| \| tu_cbf_cb [ x0 ][y0 ] \| \| tu_cbf_cr[ x0 ][ y0 ] ) ) \| \| ( (IntraSubPartitionsSplitType != ISP_NO_SPLIT)    && ( subTuIndex < NumIntraSubPartitions −1 \| \| !InferTuCbfLuma ) ) ) | |
|       tu_cbf_luma[ x0 ][ y0 ] | ae(v) |
|   ... | |
| } | |

A fifth aspect of the method according to the first or second aspects, wherein when the current transform unit is split by SBT, the value of the tu_cbf_luma flag for the sub-transform unit, which allows non-zero cbf flags, is derived according to following condition:

when the value of the cu_cbf flag is 1, and the value of the tu_cbf_cb flag is 0 and the value of the tu_cbf_cr flag is 0, then the value of the tu_cbf_luma flag for the current sub-transform unit is derived to 1.

A sixth aspect of the method according to any one of the first to fifth aspects, wherein a transform unit syntax table is signaled according to following table when the value of the cu_cbf flag is 1, and values of the tu_cbf_luma flag, the tu_cbf_cb flag and the tu_cbf_cr flag are 0 for all previously coded sub-transform units in the current transform unit, the value of the tu_cbf_cb flag of the current sub-transform unit is 0, and the value of the

|  | Descriptor |
|---|---|
| transform_unit( x0, y0, tbWidth, tbHeight, treeType, subTuIndex ) { | |
|   if( ( treeType = = SINGLE_TREE \| \| treeType = = DUAL_TREE_CHROMA ) { | |
|     if( ( IntraSubPartitionsSplitType = = ISP_NO_SPLIT && !( cu_sbt_flag && | |
|       ( ( subTuIndex = = 0 && cu_sbt_pos_flag ) \| \| | |
|         ( subTuIndex = = 1 && !cu_sbt_pos_flag ) ) ) ) \| \| | |
|     ( IntraSubPartitionsSplitType != ISP_NO_SPLIT && | |
|       ( subTuIndex = = NumIntraSubPartitions − 1 ) ) ) { | |
|       tu_cbf_cb[ x0 ][ y0 ] | ae(v) |
|       tu_cbf_cr[ x0 ][ y0 ] | ae(v) |
|     } | |
|   } | |
|   if( treeType = = SINGLE_TREE \| \| treeType = = DUAL_TREE_LUMA ) { | |
|     if( ( IntraSubPartitionsSplitType = = ISP_NO_SPLIT && !( cu_sbt_flag && | |
|       ( ( subTuIndex = = 0 && cu_sbt_pos_flag ) \| \| | |
|         ( subTuIndex = = 1 && !cu_sbt_pos_flag ) ) ) && | |
|       (CuPredMode[ x0 ][ y0 ] != MODE_INTRA \| \| | |
| tu_cbf_cb[ x0 ][ y0 ] \| \| tu_cbf_cr[ x0 ][ y0 ] ) ) | |
|     \| \|( (IntraSubPartitionsSplitType != ISP NO SPLIT \| \| | |
| (CbWidth[ x0 ][ y0 ] > MaxTbSizeY \| \| CbHeight[ x0 ][ y0 ] > MaxTbSizeY )) && | |
|     ( subTuIndex < NumIntraSubPartitions − 1 | |
| \| \| !InferTuCbfLurna ) ) ) | |
|       tu_cbf_luma[ x0 ][ y0 ] | ae(v) |
| ... | |
| } | |

A seventh aspect of the method of the first or second aspects, when the current transform unit is split by sub-transform units to satisfy maximal transform unit size restriction, a value of the tu_cbf_luma flag for the last sub-transform unit in transform unit, is derived according to following condition:

tu_cbf_cr flag of the current sub-transform unit is 0, then the value of the tu_cbf_luma flag is derived to 1.

An eighth aspect of the method of any one of the first to seventh aspects, wherein a transform unit syntax table is signaled according to following table:

|  | Descriptor |
|---|---|
| transform_unit( x0, y0, tbWidth, tbHeight, treeType, subTuIndex ) { | |
|   if( ( treeType = = SINGLE TREE \| \| treeType = = DUAL_TREE_CHROMA ) { | |
|     if( ( IntraSubPartitionsSplitType = = ISP_NO_SPLIT && !( cu_sbt_flag && | |
|       ( ( subTuIndex = = 0 && cu_sbt_pos_flag ) \| \| | |
|         ( subTuIndex = = 1 && !cu_sbt_pos_flag ) ) ) ) \| \| | |
|     ( IntraSubPartitionsSplitType != ISP_NO_SPLIT && | |
|       ( subTuIndex = = NumIntraSubPartitions − 1 ) ) ) { | |
|       tu_cbf_cb[ x0 ][ y0 ] | ae(v) |
|       tu_cbf_cr[ x0 ][ y0 ] | ae(v) |
|     } | |
|   } | |
|   if( treeType = = SINGLE_TREE \| \| treeType = = DUAL_TREE_LUMA ) { | |
|     if( ( IntraSubPartitionsSplitType = = ISP_NO_SPLIT && !( cu_sbt_flag && | |
|       ( ( subTuIndex = = 0 && cu_sbt_pos flag ) \| \| | |
|         ( subTuIndex = = 1 && !cu_sbt_pos flag ) ) ) && | |
|       (CuPredMode[ x0 ][ y0 ] != MODE_INTRA \| \| | |
| tu_cbf_cb[ x0 ][ y0 ] \| \| tu_cbf_cr[ x0 ][ y0 ] ) ) | |
|     \| \|( (IntraSubPartitionsSplitType != ISP_NO_SPLIT \| \| | |
| (CbWidth[ x0 ][ y0 ] > MaxTbSizeY \| \| CbHeigh[ x0 ][ y0 ] > MaxTbSizeY )) && | |
|     ( subTuIndex < NumIntraSubPartitions − 1 | |
| \| \| !InferTuCbfLuma ) ) ) | |
|       tu_cbf_luma[ x0 ][ y0 ] | ae(v) |
|     if (CuPredMode[ x0 ][ y0 ] != MODE_INTRA) | |

| | Descriptor |
|---|---|
| ``if (IntraSubPartitionsSplitType != ISP_NO_SPLIT )``<br>    ``InferTuCbfLuma = InferTuCbfLuma``<br>``&& !tu_cbf_luma[ x0 ][ y0 ]``<br>    ``else``<br>        ``InferTuCbfLuma = 0``<br>  ``else``<br>        ``InferTuCbfLuma = InferTuCbfLuma``<br>``&& !tu_cbf_luma[ x0 ][ y0 ]&& !tu_cbf_cb[ x0 ][ y0 ]&& !tu_cbf_cr[ x0 ][ y0 ]``<br>``...``<br>``}`` | |

A ninth aspect of the method of any one of the first to eighth aspects, wherein a coding unit syntax table and a transform tree syntax table are signaled according to following tables.

| -continued | |
|---|---|
| | Descriptor |
| ``}`` | |

| | Descriptor |
|---|---|
| ``transform_tree( x0, y0, tbWidth, tbHeight, treeType) {``<br>  ``InferTuCbfLuma = 1``<br>  ``if( IntraSubPartSplitType == NO_ISP_SPLIT ) {``<br>    ``if( tbWidth > MaxTbSizeY || tbHeight > MaxTbSizeY ) {``<br>      ``trafoWidth = ( tbWidth > MaxTbSizeY ) ? (tbWidth / 2) :``<br>``tbWidth``<br>      ``trafoHeight = ( tbHeight > MaxTbSizeY ) ? (tbHeight / 2) :``<br>``tbHeight``<br>      ``transform_tree( x0, y0, trafoWidth, trafoHeight )``<br>      ``if( tbWidth > MaxTbSizeY )``<br>    ``transform tree( x0 + trafoWidth, y0, trafoWidth, trafoHeight, treeType)``<br>      ``if( tbHeight > MaxTbSizeY )``<br>    ``transform tree( x0, y0 + trafoHeight, trafoWidth, trafoHeight, treeType)``<br>      ``if( tbWidth > MaxTbSizeY && tbHeight > MaxTbSizeY )``<br>    ``transform tree( x0 + trafoWidth, y0 + trafoHeight, trafoWidth, trafoHeight, tree``<br>``Type)``<br>    ``} else {``<br>      ``transform unit( x0, y0, tbWidth, tbHeight, treeType, SubTuIdx++ )``<br>    ``}``<br>  ``} else if( cu_sbt_flag ) {``<br>    ``if( !cu_sbt_horizontal_flag ) {``<br>      ``trafoWidth = tbWidth * SbtNumFourthsTb0 / 4``<br>      ``transform unit( x0, y0, trafoWidth, tbHeight, treeType, 0)``<br>    ``transform unit( x0 + trafoWidth, y0, tbWidth ? trafoWidth, tbHeight, treeType , 1``<br>``)``<br>    ``}else {``<br>      ``trafoHeight = tbHeight * SbtNumFourthsTb0 / 4``<br>      ``transform unit( x0, y0, tbWidth, trafoHeight, treeType, 0 )``<br>    ``transform unit( x0, y0 + trafoHeight, tbWidth, tbHeight – trafoHeight, treeType ,``<br>``1 )``<br>    ``}``<br>  ``} else if( IntraSubPartitionsSplitType == ISP_HOR_SPLIT ) {``<br>    ``trafoHeight = tbHeight / NumIntraSubPartitions``<br>    ``for( partIdx = 0; partIdx < NumIntraSubPartitions; partIdx++ )``<br>    ``transform unit( x0, y0 + trafoHeight * partIdx, tbWidth, trafoHeight, treeType,``<br>``partIdx )``<br>  ``} else if( IntraSubPartitionsSplitType == ISP_VER_SPLIT ) {``<br>    ``trafoWidth = tbWidth / NumIntraSubPartitions``<br>    ``for( partIdx = 0; partIdx < NumIntraSubPartitions; partIdx++ )``<br>    ``transform_unit( x0 + trafoWidth * partIdx, y0, trafoWidth, tbHeight, treeType,``<br>``partIdx )``<br>  ``}``<br>``}`` | |

| | Descriptor |
|---|---|
| ``coding_unit( x0, y0, cbWidth, cbHeight, treeType ) {``<br>``...``<br>  ``SubTuIdx = 0``<br>  ``transform_tree( x0, y0, cbWidth, cbHeight, treeType )``<br>``...`` | |

A tenth aspect of an encoder (20) comprising processing circuitry for carrying out the method according to any one of the first to ninth aspects.

An eleventh aspect of a decoder (30) comprising processing circuitry for carrying out the method according to any one of the first to ninth aspects.

A twelfth aspect of a computer program product comprising a program code for performing the method according to any one of the first to ninth aspects.

A thirteenth aspect of a decoder or an encoder, comprising:
one or more processors; and
a non-transitory computer-readable storage medium coupled to the processors and storing programming for execution by the processors, wherein the programming, when executed by the processors, configures the decoder to carry out the method according to any one of the first to ninth aspects.

The present disclosure also includes the following thirteen aspects.

A first aspect of a method of coding implemented by a decoding device or encoding device, the method comprising:
obtaining a bitstream, the bitstream comprises a transform unit syntax (in an example, the transform unit syntax element can be either coded for a whole block or coded for multiple sub-transform units that are obtained by Sub-Block Transform for inter block (SBT), or in order to satisfy maximal transform unit size restrictions);
the syntax comprises at least two cbf flags for chroma blocks (in an example, transform unit syntax correspond to either transform unit or sub-transform units which include two chroma cbf flags: tu_cbf_cb and tu_cbf_cb—one flag for each chroma plane), a chroma cbf flag specifies whether certain block has residue in correspondent color plane;
deriving a value of a luma cbf flag tu_cbf_luma based on one or any combination of
a value of a cu_cbf flag,
values of two chroma cbf flags corresponding to a current transform unit or sub-transform unit,
location of the sub-transform unit within transform unit,
values of luma and chroma cbf flags correspondent to previous sub-transform units in the current transform unit.

A second aspect of the method of the first aspect, wherein the value of the luma cbf flag (for example, a tu_cbf_luma flag) is derived based on the value of the cu_cbf flag and values of the two chroma cbf flags corresponding to the current transform unit.

A third aspect of the method of the second aspect, when the current transform unit is not divided to sub-transform units, the value of the cu_cbf flag is 1, the value of tu_cbf_cb flag is 0 and the value of the tu_cbf_cr flag is 0, then the value of the tu_cbf_luma flag for the current transform unit is derived to 1.

A fourth aspect of the method of the third aspect, wherein a transform unit syntax table is signaled according to following table:

|  | Descriptor |
|---|---|
| transform_unit( x0, y0, tbWidth, tbHeight, treeType, subTuIndex ) { | |
|   if( ( treeType = = SINGLE_TREE \| \| treeType = = DUAL_TREE_CHROMA ) { | |
|     if( ( IntraSubPartitionsSplitType = = ISP_NO_SPLIT && ) \| \| ( | |
|       IntraSubPartitionsSplitType != ISP_NO_SPLIT && ( subTuIndex = = | |
|       NumIntraSubPartitions −1 ) ) ) { | |
|       tu_cbf_cb[ x0 ][ y0 ] | ae(v) |
|       tu_cbf_cr[ x0 ][ y0 ] | ae(v) |
|     } | |
|   } | |
|   if( treeType = = SINGLE TREE \| \| treeType = = DUAL_TREE_LUMA ) { | |
|     if( ( IntraSubPartitionsSplitType = = ISP_NO_SPLIT && (CuPredMode[ x0 ][ y0 ] != | |
| MODE_INTRA \| \| tu_cbf_cb[    x0 ][ y0 ] \| \| tu_cbf_cr[ x0 ][ y0 ]) ) \| \| ( | |
| (IntraSubPartitionsSplitType != ISP_NO_SPLIT)   && ( subTuIndex < | |
| NumIntraSubPartitions − 1 \| \| !InferTuCbfLuma ) ) ) | |
|       tu_cbf_luma[ x0 ][ y0 ] | ae(v) |
|   ... | |
| } | |

A fifth aspect of the method according to the first or second aspects, wherein when the current transform unit is split by SBT, the value of the tu_cbf_luma flag for the sub-transform unit, which allows non-zero cbf flags, is derived according to following condition:
when the value of the cu_cbf flag is 1, and the value of the tu_cbf_cb flag is 0 and the value of the tu_cbf_cr flag is 0, then the value of the tu_cbf_luma flag for the current sub-transform unit is derived to 1.

A sixth aspect of the method according to any one of the first to fifth aspects, wherein a transform unit syntax table is signaled according to following table

|  | Descriptor |
|---|---|
| transform_unit( x0, y0, tbWidth, tbHeight, treeType, subTuIndex ) { | |
|   if( ( treeType = = SINGLE_TREE \| \| treeType = = DUAL_TREE_CHROMA ) { | |
|     if( ( IntraSubPartitionsSplitType = = ISP_NO_SPLIT && !( cu_sbt_flag && | |
|       ( ( subTuIndex = = 0 && cu_sbt_pos_flag ) \| \| | |
|       ( subTuIndex = = 1 && !cu_sbt_pos_flag ) ) ) ) \| \| | |
|     ( IntraSubPartitionsSplitType != ISP_NO_SPLIT && | |
|      ( subTuIndex = = NumIntraSubPartitions − 1 ) ) ) { | |
|       tu_cbf_cb[ x0 ][ y0 ] | ae(v) |
|       tu_cbf_cr[ x0 ][ y0 ] | ae(v) |
|     } | |
|   } | |
|   if( treeType = = SINGLE_TREE \| \| treeType = = DUAL_TREE_LUMA ) { | |
|     if( ( IntraSubPartitionsSplitType = = ISP_NO_SPLIT && !( cu_sbt_flag && | |

|  | Descriptor |
|---|---|
|     ( ( subTuIndex = = 0 && cu_sbt_pos flag ) \|\|<br>      ( subTuIndex = = 1 && !cu_sbt_pos flag ) ) ) &&<br>      (CuPredMode[ x0 ][ y0 ] != MODE_INTRA \|\| tu_cbf_cb[ x0 ][ y0 ]<br>\|\|<br>tu_cbf_cr[ x0 ][ y0 ] ) )<br>    \| \|( (IntraSubPartitionsSplitType != ISP_NO_SPLIT) &&<br>    ( subTuIndex < NumIntraSubPartitions − 1 \|\| !InferTuCbfLuma ) ) )<br>      tu_cbf_luma[ x0 ][ y0 ] | ae(v) |
| ...<br>} | |

A seventh aspect of the method of the first or second aspects, when the current transform unit is split by sub-transform units to satisfy maximal transform unit size restriction, a value of the tu_cbf_luma flag for the last sub-transform unit in transform unit, is derived according to following condition:

when the value of the cu_cbf flag is 1, and values of the tu_cbf_luma flag, the tu_cbf_cb flag and the tu_cbf_cr flag are 0 for all previously coded sub-transform units in the current transform unit, the value of the tu_cbf_cb flag of the current sub-transform unit is 0, and the value of the tu_cbf_cr flag of the current sub-transform unit is 0, then the value of the tu_cbf_luma flag is derived to 1.

An eighth aspect of the method of any one of the first to seventh aspects, wherein a transform unit syntax table is signaled according to following table:

|  | Descriptor |
|---|---|
| coding_unit( x0, y0, cbWidth, cbHeight, treeType ) {<br>  ...<br>  SubTuIdx = 0<br>  transform_tree( x0, y0, cbWidth, cbHeight,<br>    treeType )<br>  ...<br>} | |

|  | Descriptor |
|---|---|
| transform_unit( x0, y0, tbWidth, tbHeight, treeType, subTuIndex ) {<br>  if( ( treeType = = SINGLE_TREE \|\| treeType = = DUAL_TREE_CHROMA ) {<br>    if( ( IntraSubPartitionsSplitType = = ISP_NO_SPLIT && !( cu_sbt_flag &&<br>      ( ( subTuIndex = = 0 && cu_sbt_pos_flag ) \|\|<br>        ( subTuIndex = = 1 && !cu_sbt_pos_flag ) ) ) ) \|\|<br>      ( IntraSubPartitionsSplitType != ISP_NO_SPLIT &&<br>      ( subTuIndex = = NumIntraSubPartitions − 1 ) ) ) {<br>      tu_cbf_cb[ x0 ][ y0 ] | ae(v) |
|       tu_cbf_cr[ x0 ][ y0 ] | ae(v) |
|     }<br>  }<br>  if( treeType = = SINGLE_TREE \|\| treeType = = DUAL_TREE_LUMA ) {<br>    if( ( IntraSubPartitionsSplitType = = ISP_NO_SPLIT && !( cu_sbt_flag &&<br>      ( ( subTuIndex = = 0 && cu_sbt_pos_flag ) \|\|<br>        ( subTuIndex = = 1 && !cu_sbt_pos_flag ) ) ) &&<br>      (CuPredMode[ x0 ][ y0 ] != MODE_INTRA \|\| tu_cbf_cb[ x0 ][ y0 ] \|\|<br>tu_cbf_cr[ x0 ][ y0 ] ) )<br>    \| \|( (IntraSubPartitionsSplitType != ISP_NO_SPLIT) \|\| (CbWidth[ x0 ][ y0 ] ><br>MaxTbSizeY<br>\|\| CbHeight[ x0 ][ y0 ] > MaxTbSizeY )) &&<br>      ( subTuIndex < NumIntraSubPartitions − 1 \|\| !InferTuCbfLuma ) ) )<br>      tu_cbf_luma[ x0 ][ y0 ] | ae(v) |
|     if (CuPredMode[ x0 ][ y0 ] = = MODE_INTRA)<br>      if (IntraSubPartitionsSplitType != ISP_NO_SPLIT)<br>        InferTuCbfLuma = InferTuCbfLuma && !tu_cbf_luma[ x0 ][ y0 ]<br>      else<br>        InferTuCbfLuma = 0<br>    else<br>      InferTuCbfLuma = InferTuCbfLuma && !tu_cbf_luma[ x0 ][ y0 ] &&<br>!tu_cbf_cb[ x0 ][ y0 ] && !tu_cbf_cr[ x0 ][ y0 ]<br>  ...<br>} | |

A ninth aspect of the method of any one of the first to eighth aspects, wherein a coding unit syntax table and a transform tree syntax table are signaled according to following tables.

|  | Descriptor |
| --- | --- |
| transform_tree( x0, y0, tbWidth, tbHeight , treeType) {<br>  InferTuCbfLuma = 1<br>  if( IntraSubPartSplitType = = NO_ISP_SPLIT ) {<br>    if( tbWidth > MaxTbSizeY \| \| tbHeight > MaxTbSizeY ) {<br>      trafoWidth = ( tbWidth > MaxTbSizeY ) ? (tbWidth / 2) : tbWidth<br>      trafoHeight = ( tbHeight > MaxTbSizeY ) ? (tbHeight / 2) : tbHeight<br>      transform_tree( x0, y0, trafoWidth, trafoHeight)<br>      if( tbWidth > MaxTbSizeY )<br>        transform_tree( x0 + trafoWidth, y0, trafoWidth, trafoHeight, treeType )<br>      if( tbHeight > MaxTbSizeY )<br>        transform_tree( x0, y0 + trafoHeight, trafoWidth, trafoHeight, treeType )<br>      if( tbWidth > MaxTbSizeY && tbHeight > MaxTbSizeY )<br>        transform_ tree( x0 + trafoWidth, y0 + trafoHeight, trafoWidth, trafoHeight, treeType )<br>    } else {<br>      transform_unit( x0, y0, tbWidth, tbHeight, treeType, SubTuIdx++ )<br>    }<br>  } else if( cu_sbt_flag) {<br>    if( !cu_sbt_horizontal_flag ) {<br>      trafoWidth = tbWidth * SbtNumFourthsTb0 / 4<br>      transform_unit( x0, y0, trafoWidth, tbHeight, treeType , 0 )<br>      transform_unit( x0 + trafoWidth, y0, tbWidth − trafoWidth, tbHeight, treeType, 1 )<br>    } else {<br>      trafoHeight = tbHeight * SbtNumFourthsTb0 /4<br>      transform_unit( x0, y0, tbWidth, trafoHeight, treeType , 0 )<br>      transform_unit( x0, y0 + trafoHeight, tbWidth, tbHeight − trafoHeight, treeType , 1 )<br>    }<br>  } else if( IntraSubPartitionsSplitType = = ISP_HOR_SPLIT ) {<br>    trafoHeight = tbHeight / NumIntraSubPartitions<br>    for( partIdx = 0; partIdx < NumIntraSubPartitions; partIdx++ )<br>      transform_unit( x0, y0 + trafoHeight * partIdx, tbWidth, trafoHeight, treeType, partIdx )<br>  } else if( IntraSubPartitionsSplitType = = ISP_VER_SPLIT ) {<br>    trafoWidth = tbWidth / NumIntraSubPartitions<br>    for( partIdx = 0; partIdx < NumIntraSubPartitions; partIdx++ )<br>      transform_unit( x0 + trafoWidth * partIdx, y0, trafoWidth, tbHeight, treeType, partIdx )<br>  }<br>} | |

A tenth aspect of an encoder (20) comprising processing circuitry for carrying out the method according to any of the first to ninth aspects.

An eleventh aspect of a decoder (30) comprising processing circuitry for carrying out the method according to any one of the first to ninth aspects.

A twelfth aspect of a computer program product comprising a program code for performing the method according to any one of the first to ninth aspects.

A thirteenth aspect of a decoder or an encoder, comprising:

one or more processors; and a non-transitory computer-readable storage medium coupled to the processors and storing programming for execution by the processors, wherein the programming, when executed by the processors, configures the decoder to carry out the method according to any one of the first to ninth aspects.

The present disclosure also includes the following thirteen aspects.

A first aspect of a method of implemented by a decoding device or encoding device, the method comprising:

obtaining a bitstream, the bitstream comprises a transform unit syntax, (in an example, the transform unit syntax element can be either coded for a whole block or coded for multiple sub-transform units that are obtained by Sub-Block Transform for inter block (SBT), or in order to satisfy maximal transform unit size restrictions);

the syntax comprises at least two cbf flags for chroma blocks (in an example, transform unit syntax correspond to either transform unit or sub-transform units which include two chroma cbf flags: tu_cbf_cb and tu_cbf_cb—one flag for each chroma plane), a chroma cbf flag specifies whether certain block has residue in correspondent color plane;

deriving a value of a luma cbf flag tu_cbf_luma based on one or any combination of a value of a cu_cbf flag, values of two chroma cbf flags corresponding to a current transform unit or sub-transform unit, location of the sub-transform unit within transform unit, values of luma and chroma cbf flags correspondent to previous sub-transform units in the current transform unit.

A second aspect of the method of the first aspect, wherein the value of the luma cbf flag (for example, a tu_cbf_luma flag) is derived based on the value of the cu_cbf flag and values of the two chroma cbf flags corresponding to the current transform unit.

A third aspect of the method of the second aspect, when the current transform unit is not divided to sub-transform units, the cu_cbf flag is signaled in the bitstream and a value of the cu_cbf flag equals to 1, the value of tu_cbf_cb flag is 0 and the value of the tu_cbf_cr flag is 0, then the value of the tu_cbf_luma flag for the current transform unit is derived to 1.

A fourth aspect of the method of the third aspect, wherein a transform unit syntax table is signaled according to following table:

| | Descriptor |
|---|---|
| transform_unit( x0, y0, tbWidth, tbHeight, treeType, subTuIndex ) {<br>  if( ( treeType = = SINGLE_TREE \| \| treeType = = DUAL_TREE_CHROMA ) {<br>    if( ( IntraSubPartitionsSplitType = = ISP_NO_SPLIT && ) \| \| (<br>      IntraSubPartitionsSplitType != ISP_NO_SPLIT && ( subTuIndex = =<br>      NumIntraSubPartitions − 1 ) ) ) {<br>      tu_cbf_cb[ x0 ][ y0 ] | ae(v) |
|       tu_cbf_cr[ x0 ][ y0 ] | ae(v) |
|     }<br>  }<br>  if( treeType = = SINGLE_TREE \| \| treeType = = DUAL_TREE_LUMA ) {<br>    if( ( IntraSubPartitionsSplitType = = ISP_NO_SPLIT && ((CuPredMode[ x0 ][ y0 ] = =<br>MODE_INTRA \| \| tu_cbf_cb[x0 ][ y0 ] \| \| tu_cbf_cr[ x0 ][ y0 ]) \| \| (CbWidth[ x0 ][ y0 ] ><br>MaxTbSizeY \| \| CbHeight[ x0 ][ y0 ] > MaxTbSizeY )) ) \| \|( (IntraSubPartitionsSplitType !=<br>ISP_NO_SPLIT)               && ( subTuIndex < NumIntraSubPartitions − 1 \| \|<br>!InferTuCbfLuma ) ) )<br>      tu_cbf_luma[ x0 ][ y0 ] | ae(v) |
|   }<br>...<br>} | |

A fifth aspect of the method according to the third aspect, wherein a transform unit syntax table is signaled according to following table:

when the value of the cu_cbf flag is 1, and the value of the tu_cbf_cb flag is 0 and the value of the tu_cbf_cr flag

| | Descriptor |
|---|---|
| transform_unit( x0, y0, tbWidth, tbHeight, treeType, subTuIndex ) {<br>  if( ( treeType = = SINGLE_TREE \| \| treeType = = DUAL_TREE_CHROMA ) {<br>    if( ( IntraSubPartitionsSplitType = = ISP_NO_SPLIT && ) \| \| (<br>      IntraSubPartitionsSplitType != ISP_NO_SPLIT && ( subTuIndex = =<br>      NumIntraSubPartitions − 1 ) ) ) {<br>      tu_cbf_cb[ x0 ][ y0 ] | ae(v) |
|       tu_cbf_cr[ x0 ][ y0 ] | ae(v) |
|     }<br>  }<br>  if( treeType = = SINGLE_TREE \| \| treeType = = DUAL_TREE_LUMA ) {<br>    if(IntraSubPartitionsSplitType = = ISP_NO_SPLIT){<br>      if ((CuPredMode[ x0 ][ y0 ] = = MODE_INTRA \| \| tu_cbf_cb[x0 ][ y0 ] \| \|<br>      tu_cbf_cr[ x0 ][ y0 ] ) \| \|<br>      (CbWidth[ x0 ][ y0 ] > MaxTbSizeY \| \| CbHeight[ x0 ][ y0 ] > MaxTbSizeY )) )<br>      tu_cbf_luma[ x0 ][ y0 ] | ae(v) |
|     }<br>    else<br>      if ( subTuIndex < NumIntraSubPartitions − 1 \| \| !InferTuCbfLuma )<br>      tu_cbf_luma[ x0 ][ y0 ] | ae(v) |
| ...<br>} | |

A sixth aspect of the method of the first or second aspects, when the current transform unit is split by SBT, the value of the tu_cbf_luma flag for the sub-transform unit, which allows non-zero cbf flags, is derived according to following condition:

is 0, then the value of the tu_cbf_luma flag for the current sub-transform unit is derived to 1.

A seventh aspect of the method of any one of the first to sixth aspects, wherein a transform unit syntax table is signaled according to following table

| | Descriptor |
|---|---|
| transform_unit( x0, y0, tbWidth, tbHeight, treeType, subTuIndex ) {<br>  if( ( treeType = = SINGLE_TREE \| \| treeType = = DUAL_TREE_CHROMA ) {<br>    if( ( IntraSubPartitionsSplitType = = ISP_NO_SPLIT && !( cu_sbt_flag &&<br>      ( ( subTuIndex = = 0 && cu_sbt_pos_flag ) \| \|<br>      ( subTuIndex = = 1 && !cu_sbt_pos_flag ) ) ) ) \| \|<br>    ( IntraSubPartitionsSplitType != ISP_NO_SPLIT &&<br>      ( subTuIndex = = NumIntraSubPartitions − 1 ) ) ) {<br>      tu_cbf_cb[ x0 ][ y0 ] | ae(v) |
|       tu_cbf_cr[ x0 ][ y0 ] | ae(v) |
|     }<br>  }<br>  if( treeType = = SINGLE_TREE \| \| treeType = = DUAL_TREE_LUMA ) {<br>    if( ( IntraSubPartitionsSplitType = = ISP_NO_SPLIT && !( cu_sbt_flag &&<br>      ( ( subTuIndex = = 0 && cu_sbt_pos_flag ) \| \| | |

|  | Descriptor |
|---|---|
|    ( subTuIndex = = 1 && !cu_sbt_pos_flag ) ) ) && <br>   ((CuPredMode[ x0 ][ y0 ] = = MODE_INTRA \|\| tu_cbf_cb [x0 ][ y0 ] \|\| <br>tu_cbf_cr[ x0 ][ y0 ]) \|\| (CbWidth[ x0 ][ y0 ] > MaxTbSizeY \|\| CbHeight[ x0 ][ y0 ] <br>> <br>MaxTbSizeY )) ) <br>  \|\|( (IntraSubPartitionsSplitType != ISP_NO_SPLIT) && <br>  ( subTuIndex < NumIntraSubPartitions − 1 \|\| !InferTuCbfLuma ) ) ) <br>  tu_cbf_luma[ x0 ][ y0 ] <br>. . . <br>} | <br><br><br><br><br><br><br>ae(v) |

An eighth aspect of the method of any one of the first to sixth aspects, wherein a transform unit syntax table is signaled according to following table

|  | Descriptor |
|---|---|
| transform_unit( x0, y0, tbWidth, tbHeight, treeType, subTuIndex ) { <br> if( ( treeType = = SINGLE_TREE \|\| treeType = = DUAL_TREE_CHROMA ) { <br>  if( ( IntraSubPartitionsSplitType = = ISP_NO_SPLIT && ) \|\| ( <br>   IntraSubPartitionsSplitType != ISP_NO_SPLIT && ( subTuIndex = = <br>   NumIntraSubPartitions − 1 ) ) ) { <br>  tu_cbf_cb[ x0 ][ y0 ] <br>  tu_cbf_cr[ x0 ][ y0 ] <br>  } <br> } <br> if( treeType = = SINGLE_TREE \|\| treeType = = DUAL_TREE_LUMA ) { <br>  if(IntraSubPartitionsSplitType == ISP_NO_SPLIT){ <br>   if !( cu_sbt_flag && <br>    ( ( subTuIndex = = 0 && cu_sbt_pos_flag ) \|\| <br>    ( subTuIndex = = 1 && !cu_sbt_pos_flag ) ) ) <br>   if ((CuPredMode[ x0 ][ y0 ] = = MODE_INTRA \|\| tu_cbf_cb[x0 ][ Y0 ] \|\| <br>    tu_cbf_cr[ x0 ][ Y0 ] ) \|\| <br>    (CbWidth[ x0 ][ y0 ] > MaxTbSizeY \|\| CbHeight[ x0 ][ y0 ] > MaxTbSizeY )) ) <br>    tu_cbf_luma[ x0 ][ y0 ] <br> } <br> else <br>  if ( subTuIndex < NumIntraSubPartitions − 1 \|\| !InferTuCbfLuma ) <br>   tu_cbf_luma[ x0 ][ y0 ] <br>. . . <br>} | <br><br><br><br><br><br>ae(v) <br>ae(v) <br><br><br><br><br><br><br><br><br><br><br>ae(v) <br><br><br><br>ae(v) |

A ninth aspect of the method of any one of the first to eighth aspects, wherein a coding unit syntax table and a transform tree syntax table are signaled according to following tables.

|  | Descriptor |
|---|---|
| coding_unit( x0, y0, cbWidth, cbHeight, treeType ) { <br>. . . <br> SubTuIdx = 0 <br> transform_tree( x0, y0, cbWidth, cbHeight, |  |

|  | Descriptor |
|---|---|
|   treeType ) <br>. . . <br>} |  |

|  | Descriptor |
|---|---|
| transform_tree( x0, y0, tbWidth, tbHeight , treeType) { <br> InferTuCbfLuma = 1 <br> if( IntraSubPartSplitType = = NO_ISP_SPLIT ) { <br>  if( tbWidth > MaxTbSizeY \|\| tbHeight > MaxTbSizeY ) { <br>   trafoWidth = ( tbWidth > MaxTbSizeY ) ? (tbWidth / 2) : tbWidth <br>   trafoHeight = ( tbHeight > MaxTbSizeY ) ? (tbHeight / 2) : tbHeight <br>   transform_tree( x0, y0, trafoWidth, trafoHeight ) <br>   if( tbWidth > MaxTbSizeY ) <br>    transform_tree( x0 + trafoWidth, y0, trafoWidth, trafoHeight, treeType ) <br>   if( tbHeight > MaxTbSizeY ) <br>    transform_tree( x0, y0 + trafoHeight, trafoWidth, trafoHeight, treeType ) |  |

| | Descriptor |
|---|---|
| ```
        if( tbWidth > MaxTbSizeY && tbHeight > MaxTbSizeY )
            transform_tree( x0 + trafoWidth, y0 + trafoHeight, trafoWidth, trafoHeight, treeType )
    } else {
        transform_unit( x0, y0, tbWidth, tbHeight, treeType, SubTuIdx++ )
    }
} else if( cu_sbt_flag ) {
    if( !cu_sbt_horizontal_flag ) {
        trafoWidth = tbWidth * SbtNumFourthsTb0 /4
        transform_unit( x0, y0, trafoWidth, tbHeight, treeType , 0 )
        transform_unit( x0 + trafoWidth, y0, tbWidth – trafoWidth , tbHeight, treeType , 1)
    } else {
        trafoHeight = tbHeight * SbtNumFourthsTb0 /4
        transform_unit( x0, y0, tbWidth, trafoHeight, treeType , 0 )
        transform_unit( x0, y0 + trafoHeight, tbWidth, tbHeight – trafoHeight, treeType, 1 )
    }
} else if( IntraSubPartitionsSplitType = = ISP_HOR_SPLIT ) {
    trafoHeight = tbHeight / NumIntraSubPartitions
    for( partIdx = 0; partIdx < NumIntraSubPartitions; partIdx++ )
        transform_unit( x0, y0 + trafoHeight * partIdx, tbWidth, trafoHeight, treeType, partIdx )
} else if( IntraSubPartitionsSplitType = = ISP_VER_SPLIT ) {
    trafoWidth = tbWidth / NumIntraSubPartitions
    for( partIdx = 0; partIdx < NumIntraSubPartitions; partIdx++ )
        transform_unit( x0 + trafoWidth * partIdx, y0, trafoWidth, tbHeight, treeType, partIdx )
    }
}
``` | |

A tenth aspect of an encoder (20) comprising processing circuitry for carrying out the method according to any one of the first to ninth aspects.

An eleventh aspect of a decoder (30) comprising processing circuitry for carrying out the method according to any one of the first to ninth aspects.

A twelfth aspect of a computer program product comprising a program code for performing the method according to any one of the first to ninth aspects.

A thirteenth aspect of a decoder or an encoder, comprising:
one or more processors; and
a non-transitory computer-readable storage medium coupled to the processors and storing programming for execution by the processors, wherein the programming, when executed by the processors, configures the decoder to carry out the method according to any one of the first to ninth aspects.

The present disclosure further includes the following fourteen aspects.

A first aspect of a method of coding implemented by a decoding device or encoding device, the method comprising:
obtaining a bitstream, the bitstream comprises a transform unit syntax, (in an example, the transform unit syntax element can be either coded for a whole block or coded for multiple sub-transform units that are obtained by Sub-Block Transform for inter block (SBT), or in order to satisfy maximal transform unit size restrictions);

the syntax comprises at least two cbf flags for chroma blocks (in an example, transform unit syntax correspond to either transform unit or sub-transform units which include two chroma cbf flags: tu_cbf_cb and tu_cbf_cb—one flag for each chroma plane), a chroma cbf flag specifies whether certain block has residue in correspondent color plane;

deriving a value of a luma cbf flag tu_cbf_luma based on one or any combination of
a value of a cu_cbf flag,
values of two chroma cbf flags corresponding to a current transform unit or sub-transform unit,
location of the sub-transform unit within transform unit,
values of luma and chroma cbf flags correspondent to previous sub-transform units in the current transform unit.

A second aspect of the method of the first aspect, wherein the value of the luma cbf flag (for example, a tu_cbf_luma flag) is derived based on the value of the cu_cbf flag and values of the two chroma cbf flags corresponding to the current transform unit.

A third aspect of a method of the second aspect, when the current transform unit is not divided to sub-transform units, the cu_cbf flag is signaled in the bitstream and a value of the cu_cbf flag equals to 1, the value of tu_cbf_cb flag is 0 and the value of the tu_cbf_cr flag is 0, then the value of the tu_cbf_luma flag for the current transform unit is derived to 1.

A fourth aspect of the method of the third aspect, wherein a transform unit syntax table is signaled according to following table:

| | Descriptor |
|---|---|
| ```
transform_unit( x0, y0, tbWidth, tbHeight, treeType, subTuIndex ) {
    if( ( treeType = = SINGLE_TREE | |treeType = = DUAL_TREE_CHROMA ) {
        if( ( IntraSubPartitionsSplitType = = ISP_NO_SPLIT && ) | | (
            IntraSubPartitionsSplitType != ISP_NO_SPLIT && ( subTuIndex = =
            NumIntraSubPartitions − 1 ) ) ) {
            tu_cbf_cb[ x0 ][ y0 ]
            tu_cbf_cr[ x0 ][ y0 ]
        }
    }
``` | ae(v)<br>ae(v) |

-continued

| | Descriptor |
|---|---|
| if( treeType = = SINGLE_TREE \| \| treeType = = DUAL_TREE_LUMA ) {<br>    if( ( IntraSubPartitionsSplitType = = ISP_NO_SPLIT && ((CuPredMode[ x0 ][ y0 ] = =<br>MODE_INTRA \| \| tu_cbf_cb[x0 ][ y0 ] \| \| tu cbf cr[ x0 ][ y0 ] ) \| \| (CbWidth[ x0 ][ y0 ] ><br>MaxTbSizeY \| \| CbHeight[ x0 ][ y0 ] > MaxTbSizeY )) ) \| \|( (IntraSubPartitionsSplitType !=<br>ISP_NO_SPLIT)      && ( subTuIndex < NumIntraSubPartitions − 1 \| \|<br>!InferTuCbfLuma ) ) )<br>    tu_cbf_luma[ x0 ][ y0 ] | ae(v) |
| . . .<br>} | |

A fifth aspect of the method according to the third aspect, wherein a transform unit syntax table is signaled according to following table: when the value of the cu_cbf flag is 1, and the value of the tu_cbf_cb flag is 0 and the value of the tu_cbf_cr flag

| | Descriptor |
|---|---|
| transform_unit( x0, y0, tbWidth, tbHeight, treeType, subTuIndex ) {<br>  if( ( treeType = = SINGLE_TREE \| \| treeType = = DUAL_TREE_CHROMA ) {<br>    if( ( IntraSubPartitionsSplitType = = ISP_NO_SPLIT && ) \| \| (<br>      IntraSubPartitionsSplitType != ISP_NO_SPLIT && ( subTuIndex = =<br>      NumIntraSubPartitions − 1 ) ) ) { | |
|     tu_cbf_cb[ x0 ][ y0 ] | ae(v) |
|     tu_cbf_cr[ x0 ][ y0 ] | ae(v) |
|   }<br>}<br>if( treeType = = SINGLE_TREE \| \| treeType = = DUAL_TREE_LUMA ) {<br>  if(IntraSubPartitionsSplitType = = ISP_NO_SPLIT){<br>    if ((CuPredMode[ x0 ][ y0 ] = = MODE_INTRA \| \| tu_cbf_cb[x0 ][ y0 ] \| \|<br>    tu_cbf_cr[ x0 ][ y0 ] ) \| \|<br>    (CbWidth[ x0 ][ y0 ] > MaxTbSizeY \| \| CbHeight[ x0 ][ y0 ] > MaxTbSizeY )) )<br>      tu_cbf_luma[ x0 ][ y0 ] | ae(v) |
|   }<br>  else<br>    if ( subTuIndex < NumIntraSubPartitions − 1 \| \| !InferTuCbfLuma )<br>      tu_cbf_luma[ x0 ][ y0 ] | ae(v) |
| . . .<br>} | |

A sixth aspect of the method according to the first or second aspect, when the current transform unit is split by SBT, the value of the tu_cbf_luma flag for the sub-transform unit, which allows non-zero cbf flags, is derived according to following condition: is 0, then the value of the tu_cbf_luma flag for the current sub-transform unit is derived to 1.

A seventh aspect of the method of any one of the first to sixth aspects, wherein a transform unit syntax table is signaled according to following table

| | Descriptor |
|---|---|
| transform_unit( x0, y0, tbWidth, tbHeight, treeType, subTuIndex ) {<br>  if( ( treeType = = SINGLE_TREE \| \| treeType = = DUAL_TREE_CHROMA ) {<br>    if( ( IntraSubPartitionsSplitType = = ISP_NO_SPLIT && !( cu_sbt_flag &&<br>      ( ( subTuIndex = = 0 && cu_sbt_pos_flag ) \| \|<br>      ( subTuIndex = = 1 && !cu_sbt_pos_flag ) ) ) ) \| \|<br>    ( IntraSubPartitionsSplitType != ISP_NO_SPLIT &&<br>      ( subTuIndex = = NumIntraSubPartitions − 1 ) ) ) { | |
|     tu_cbf_cb[ x0 ][ y0 ] | ae(v) |
|     tu_cbf_cr[ x0 ][ y0 ] | ae(v) |
|   }<br>}<br>if( treeType = = SINGLE_TREE \| \| treeType = = DUAL_TREE_LUMA ) {<br>  if( ( IntraSubPartitionsSplitType = = ISP_NO_SPLIT && !( cu_sbt_flag &&<br>    ( ( subTuIndex = = 0 && cu_sbt_pos_flag ) \| \|<br>    ( subTuIndex = = 1 && !cu_sbt_pos_flag ) ) ) &&<br>    ((CuPredMode[ x0 ][ y0 ] = = MODE_INTRA \| \| tu_cbf_cb [x0 ][ y0 ] \| \|<br>tu_cbf_cr[ x0 ][ y0 ]) \| \| (CbWidth[ x0 ][ y0 ] > MaxTbSizeY \| \| CbHeight[ x0 ][ y0 ] ><br>MaxTbSizeY )) )<br>  \| \|( (IntraSubPartitionsSplitType != ISP_NO_SPLIT) &&<br>    ( subTuIndex < NumIntraSubPartitions − 1 \| \| !InferTuCbfLuma ) )<br>    tu_cbf_luma[ x0 ][ y0 ] | ae(v) |
| . . . | |

|                                                                 | Descriptor |
| --------------------------------------------------------------- | ---------- |
| }                                                               |            |

An eighth aspect of the method of the first to sixth aspects, wherein a transform unit syntax table is signaled according to following table

|                                                                 | Descriptor |
| --------------------------------------------------------------- | ---------- |
| transform_unit( x0, y0, tbWidth, tbHeight, treeType, subTuIndex ) { |         |
|   if( ( treeType = = SINGLE_TREE \|\| treeType = = DUAL_TREE_CHROMA ) { |  |
|     if( ( IntraSubPartitionsSplitType = = ISP_NO_SPLIT && ) \|\| ( |     |
|       IntraSubPartitionsSplitType != ISP_NO_SPLIT && ( subTuIndex = = |  |
|       NumIntraSubPartitions − 1 ) ) ) { |         |
|       tu_cbf_cb[ x0 ][ y0 ]       | ae(v)      |
|       tu_cbf_cr[ x0 ][ y0 ]       | ae(v)      |
|     }                                       |            |
|   }                                                   |            |
|   if( treeType = = SINGLE_TREE \|\| treeType = = DUAL_TREE_LUMA ) { |    |
|     if(IntraSubPartitionsSplitType = = ISP_NO_SPLIT){ |        |
|       if !( cu_sbt_flag &&        |            |
|         ( ( subTuIndex = = 0 && cu_sbt_pos_flag ) \|\| |  |
|         ( subTuIndex = = 1 && !cu_sbt_pos_flag ) ) ) |  |
|       if ((CuPredMode[ x0 ][ y0 ] = = MODE_INTRA \|\| tu_cbf_cb[x0 ][ Y0 ] \|\| |  |
|         tu_cbf_cr[ x0 ][ Y0 ] ) \|\| |        |
|         (CbWidth[ x0 ][ y0 ] > MaxTbSizeY \|\| CbHeight[ x0 ][ y0 ] > MaxTbSizeY )) ) |  |
|         tu_cbf_luma[ x0 ][ y0 ] | ae(v)  |
|     }                                       |            |
|     else                                    |            |
|       if ( subTuIndex < NumIntraSubPartitions − 1 \|\| !InferTuCbfLuma ) |  |
|         tu_cbf_luma[ x0 ][ y0 ] | ae(v) |
|   . . .                                               |            |
| }                                                               |            |

A ninth aspect of the method of any one of the first to eighth aspects, wherein a coding unit syntax table and a transform tree syntax table are signaled according to following tables.

|                                                                 | Descriptor |
| --------------------------------------------------------------- | ---------- |
| coding_unit( x0, y0, cbWidth, cbHeight, treeType ) {            |            |
|   . . .                                               |            |
|   SubTuIdx = 0                                        |            |
|   transform_tree( x0, y0, cbWidth, cbHeight,          |            |

|                                                                 | Descriptor |
| --------------------------------------------------------------- | ---------- |
|   treeType )                                          |            |
|   . . .                                               |            |
| }                                                               |            |

|                                                                 | Descriptor |
| --------------------------------------------------------------- | ---------- |
| transform_tree( x0, y0, tbWidth, tbHeight , treeType) {         |            |
|   InferTuCbfLuma = 1                                  |            |
|   if( IntraSubPartSplitType = = NO_ISP_SPLIT ) {      |            |
|     if( tbWidth > MaxTbSizeY \|\| tbHeight > MaxTbSizeY ) { |  |
|       trafoWidth = ( tbWidth > MaxTbSizeY ) ? (tbWidth / 2) : tbWidth |  |
|       trafoHeight = ( tbHeight > MaxTbSizeY ) ? (tbHeight / 2) : tbHeight |  |
|       transform_tree( x0, y0, trafoWidth, trafoHeight) |  |
|       if( tbWidth > MaxTbSizeY )  |            |
|         transform_tree( x0 + trafoWidth, y0, trafoWidth, trafoHeight, treeType ) |  |
|       if( tbHeight > MaxTbSizeY ) |            |
|         transform_tree( x0, y0 + trafoHeight, trafoWidth, trafoHeight, treeType ) |  |
|       if( tbWidth > MaxTbSizeY && tbHeight > MaxTbSizeY ) |  |
|         transform_tree( x0 + trafoWidth, y0 + trafoHeight, trafoWidth, trafoHeight, treeType ) |  |
|     } else {                                |            |
|       transform_unit( x0, y0, tbWidth, tbHeight, treeType, SubTuIdx++ ) |  |
|     }                                       |            |
|   } else if( cu_sbt_flag ) {                          |            |
|     if( !cu_sbt_horizontal_flag ) {         |            |
|       trafoWidth = tbWidth * SbtNumFourthsTb0 / 4 |  |
|       transform_unit( x0, y0, trafoWidth, tbHeight, treeType , 0) |  |

```
        transform_unit( x0 + trafoWidth, y0, tbWidth − trafoWidth , tbHeight, treeType , 1 )
      } else {
        trafoHeight = tbHeight * SbtNumFourthsTb0 / 4
        transform_unit( x0, y0, tbWidth, trafoHeight, treeType , 0 )
        transform_unit( x0, y0 + trafoHeight, tbWidth, tbHeight − trafoHeight, treeType , 1)
      }
  } else if( IntraSubPartitionsSplitType = = ISP_HOR_SPLIT ) {
    trafoHeight = tbHeight /NumIntraSubPartitions
    for( partIdx = 0; partIdx < NumIntraSubPartitions; partIdx++ )
      transform_unit( x0, y0 + trafoHeight * partIdx, tbWidth, trafoHeight, treeType, partIdx )
  } else if( IntraSubPartitionsSplitType = = ISP_VER_SPLIT ) {
    trafoWidth = tbWidth / NumIntraSubPartitions
    for( partIdx = 0; partIdx < NumIntraSubPartitions; partIdx++ )
      transform_unit( x0 + trafoWidth * partIdx, y0, trafoWidth, tbHeight, treeType, partIdx )
  }
}
```

A tenth aspect of the method of any one of the first to ninth aspects, wherein if the value of tu_cbf_luma[x0][y0] is not present, and the value of tu_cbf_luma[x0][y0] is derived according to following conditions:
when tu_cbf_luma[x0][y0] is not present in the current TU, its value is inferred as follows:
—If cu_sbt_flag is equal to 1 and any of the following conditions is true, tu_cbf_luma[x0][y0] is inferred to be equal to 0.
subTuIndex is equal to 0 and cu_sbt_pos_flag is equal to 1;
subTuIndex is equal to 1 and cu_sbt_pos_flag is equal to 0;
—Otherwise, tu_cbf_luma[x0][y0] is inferred to be equal to 1.

An eleventh aspect of an encoder (20) comprising processing circuitry for carrying out the method according to any one of the first to tenth aspects.

A twelfth aspect of a decoder (30) comprising processing circuitry for carrying out the method according to any one of the first to tenth aspects.

A thirteenth aspect of a computer program product comprising a program code for performing the method according to any one of the first to tenth aspects.

A fourteenth aspect of a decoder or an encoder, comprising:
one or more processors; and
a non-transitory computer-readable storage medium coupled to the processors and storing programming for execution by the processors, wherein the programming, when executed by the processors, configures the decoder to carry out the method according to any one of the first to tenth aspects.

What is claimed is:
1. A method of video coding implemented by a decoding device, the method comprising:
obtaining a bitstream comprising a transform unit syntax;
obtaining, according to the transform unit syntax, values of at least two chroma coded block flags (cbf flags) for chroma blocks corresponding to a current transform unit or a current sub-transform unit within the current transform unit, wherein a chroma cbf flag of the at least two chroma cbf flags specifies whether a correspondent block includes a residue in a correspondent color plane; and
deriving a value of a luma cbf flag at least based on a value of a coding unit cbf flag (cu_cbf flag) and the values of the at least two chroma cbf flags.

2. The method of claim 1, wherein the value of the luma cbf flag is further derived based on a location of the current sub-transform unit within the current transform unit.

3. The method of claim 1, wherein the transform unit syntax comprises the at least two chroma cbf flags, the obtaining, according to the transform unit syntax, values of at least two chroma cbf flags comprises:
obtaining values of at least two chroma cbf flags from the transform unit syntax.

4. The method of claim 1, wherein for the transform unit syntax, the transform unit syntax element is:
signaled for a whole block, or
signaled for multiple sub-transform units that are obtained by sub-block transform (SBT) for inter block, or
signaled in order to satisfy maximal transform unit size restrictions.

5. The method of claim 1, wherein the current transform unit or the current sub-transform unit include the at least two chroma cbf flags, with one flag for each chroma plane, respectively.

6. The method of claim 1, wherein if the current transform unit is not divided to sub-transform units, the cu_cbf flag is signaled in the bitstream and a value of the cu_cbf flag equals to 1, a value of tu_cbf_cb flag is 0 and a value of tu_cbf_cr flag is 0, then a value of tu_cbf_luma flag for the current transform unit is derived to 1.

7. The method of claim 1, wherein if the current transform unit is split by sub-block transform (SBT) a value of tu_cbf_luma flag for the current sub-transform unit, which allows non-zero cbf flags, is derived according to following condition:
if the value of the cu_cbf flag is 1, and a value of tu_cbf_cb flag is 0 and a value of tu_cbf_cr flag is 0, then a value of tu_cbf_luma flag for the current sub-transform unit is derived to be 1.

8. The method of claim 1, wherein
if tu_cbf_luma[x0][y0] is not present, its value is inferred as follows:
if cu_sbt_flag is equal to 1 and one of following conditions is true, tu_cbf_luma[x0][y0] is inferred to be equal to 0:
subTuIndex is equal to 0 and cu_sbt_pos_flag is equal to 1;
subTuIndex is equal to 1 and cu_sbt_pos_flag is equal to 0;
otherwise, if treeType is equal to DUAL_TREE_CHROMA, tu_cbf_luma[x0][y0] is inferred to be equal to 0;

otherwise, tu_cbf_luma[x0][y0] is inferred to be equal to 1.

9. A decoder comprising:
one or more processors; and
a non-transitory computer-readable storage medium coupled to the one or more processors and storing programming for execution by the one or more processors, wherein the programming, when executed by the one or more processors, configures the decoder to:
obtain a bitstream comprising a transform unit syntax;
obtain according to the transform unit syntax, values of at least two chroma coded block flags (cbf flags) for chroma blocks corresponding to a current transform unit or a current sub-transform unit within the current transform unit, wherein a chroma cbf flag of the at least two chroma cbf flags specifies whether a correspondent block includes a residue in a correspondent color plane; and
derive a value of a luma cbf flag at least based on
a value of a coding unit cbf flag (cu_cbf flag) and the values of the at least two chroma cbf flags.

10. The decoder of claim 9, wherein the value of the luma cbf flag is further derived based on a location of the current sub-transform unit within the current transform unit.

11. The decoder of claim 9, wherein the transform unit syntax comprises the at least two chroma cbf flags, the obtaining, according to the transform unit syntax, values of at least two chroma cbf flags comprises:
obtaining values of at least two chroma cbf flags from the transform unit syntax.

12. The decoder of claim 9, wherein for the transform unit syntax, the transform unit syntax element is:
signaled for a whole block, or
signaled for multiple sub-transform units that are obtained by sub-block transform (SBT) for inter block, or
signaled in order to satisfy maximal transform unit size restrictions.

13. The decoder according to claim 9, wherein the current transform unit or the current sub-transform unit include the at least two chroma cbf flags, with one flag for each chroma plane, respectively.

14. The decoder of any one of claim 9, wherein the value of the luma cbf flag is derived based on the value of the cu_cbf flag and the values of the at least two chroma cbf flags corresponding to the current transform unit.

15. The decoder of claim 9, wherein if the current transform unit is not divided to sub-transform units, the cu_cbf flag is signaled in the bitstream and a value of the cu_cbf flag equals to 1, a value of tu_cbf_cb flag is 0 and a value of tu_cbf_cr flag is 0, then a value of tu_cbf_luma flag for the current transform unit is derived to 1.

16. The decoder of claim 9, wherein if the current transform unit is split by Sub-Block Transform, SBT, a value of tu_cbf_luma flag for the current sub-transform unit, which allows non-zero cbf flags, is derived according to following condition:
if the value of the cu_cbf flag is 1, and a value of tu_cbf_cb flag is 0 and a value of tu_cbf_cr flag is 0, then a value of tu_cbf_luma flag for the current sub-transform unit is derived to be 1.

17. The decoder of claim 9, wherein
if tu_cbf_luma[x0][y0] is not present, its value is inferred as follows:
if cu_sbt_flag is equal to 1 and one of following conditions is true, tu_cbf_luma[x0][y0] is inferred to be equal to 0:
subTuIndex is equal to 0 and cu_sbt_pos_flag is equal to 1;
subTuIndex is equal to 1 and cu_sbt_pos_flag is equal to 0;
otherwise, if treeType is equal to DUAL_TREE_CHROMA, tu_cbf_luma[x0][y0] is inferred to be equal to 0;
otherwise, tu_cbf_luma[x0][y0] is inferred to be equal to 1.

18. A non-transitory storage medium comprising a bitstream decoded by a method comprising:
obtaining a bitstream comprising a transform unit syntax;
obtaining, according to the transform unit syntax, values of at least two chroma coded block flags (cbf flags) for chroma blocks corresponding to a current transform unit or a current sub-transform unit within the current transform unit, wherein a chroma cbf flag of the at least two chroma cbf flags specifies whether a correspondent block includes a residue in a correspondent color plane; and
deriving a value of a luma cbf flag at least based on
a value of a coding unit cbf flag, cu_cbf flag, and the values of the at least two chroma cbf flags.

19. The non-transitory storage medium of claim 18, wherein the value of the luma cbf flag is further derived based on a location of the current sub-transform unit within the current transform unit.

20. The non-transitory storage medium of claim 18, wherein the transform unit syntax comprises the at least two chroma cbf flags, the obtaining, according to the transform unit syntax, values of at least two chroma cbf flags comprises:
obtaining values of at least two chroma cbf flags from the transform unit syntax.

* * * * *